US 12,057,148 B2

(12) United States Patent
Nakao et al.

(10) Patent No.: US 12,057,148 B2
(45) Date of Patent: Aug. 6, 2024

(54) SIGNAL PROCESSING DEVICE, MAGNETIC TAPE DRIVE, MAGNETIC TAPE, MAGNETIC TAPE CARTRIDGE, PROGRAM, SIGNAL PROCESSING METHOD, AND MAGNETIC TAPE MANUFACTURING METHOD

(71) Applicant: FUJIFILM Corporation, Tokyo (JP)

(72) Inventors: Toru Nakao, Kanagawa (JP); Tetsuya Kaneko, Kanagawa (JP); Yoichi Akano, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 18/172,693

(22) Filed: Feb. 22, 2023

(65) Prior Publication Data

US 2023/0317108 A1  Oct. 5, 2023

(30) Foreign Application Priority Data

Mar. 29, 2022 (JP) .................. 2022-054514

(51) Int. Cl.
*G11B 5/584* (2006.01)
*G11B 5/008* (2006.01)
*G11B 5/56* (2006.01)

(52) U.S. Cl.
CPC ............ *G11B 5/56* (2013.01); *G11B 5/00821* (2013.01)

(58) Field of Classification Search
CPC .... G11B 5/09; G11B 5/02; G11B 5/54; G11B 5/584; G11B 5/5928; G11B 5/4893; G11B 5/56; G11B 5/00817; G11B 5/00813; G11B 5/59688; G11B 5/1278; G11B 27/36; G11B 5/588
See application file for complete search history.

(56) References Cited

U.S. PATENT DOCUMENTS

| | | | | |
|---|---|---|---|---|
| 8,054,576 | B2 * | 11/2011 | Bui ........................ | G11B 5/584 |
| | | | | 360/77.12 |
| 10,629,228 | B2 * | 4/2020 | Kaneko .............. | G11B 5/00813 |
| 11,551,715 | B2 * | 1/2023 | Tochikubo ............. | G06K 19/07 |
| 2011/0199701 | A1 | 8/2011 | Bui et al. | |
| 2015/0043101 | A1 | 2/2015 | Biskeborn et al. | |
| 2016/0329069 | A1 | 11/2016 | Biskeborn et al. | |
| 2021/0125633 | A1 | 4/2021 | Jurneke | |

FOREIGN PATENT DOCUMENTS

JP        2005-259241 A        9/2005

OTHER PUBLICATIONS

Extended European Search Report issued Aug. 22, 2023 in Application No. 23164151.5.

* cited by examiner

*Primary Examiner* — Nabil Z Hindi
(74) *Attorney, Agent, or Firm* — Sughrue Mion, PLLC

(57) ABSTRACT

A magnetic head includes a pair of servo reading elements corresponding to a pair of servo bands adjacent to each other in a width direction. A processor acquires a first signal based on a first result obtained by reading a servo pattern in a first servo band by a first servo reading element included in a pair of servo reading elements, acquires a second signal based on a second result obtained by reading the servo pattern in a second servo band by a second servo reading element included in the pair of servo reading elements, and outputs a deviation amount signal corresponding to a deviation amount in time between the first signal and the second signal.

22 Claims, 41 Drawing Sheets

SIGNAL PROCESSING DEVICE, MAGNETIC TAPE DRIVE, MAGNETIC TAPE, MAGNETIC TAPE CARTRIDGE, PROGRAM, SIGNAL PROCESSING METHOD, AND MAGNETIC TAPE MANUFACTURING METHOD

CROSS-REFERENCE TO RELATED APPLICATIONS

This application claims priority under 35 USC 119 from Japanese Patent Application No. 2022-054514 filed on Mar. 29, 2022, the disclosure of which is incorporated by reference herein.

BACKGROUND

1. Technical Field

The technology of the present disclosure relates to a signal processing device, a magnetic tape drive, a magnetic tape, a magnetic tape cartridge, a program, a signal processing method, and a magnetic tape manufacturing method.

2. Related Art

JP2005-259241A discloses a servo writer in which a head for recording or reproducing a servo signal on a traveling tape. The servo writer disclosed in JP2005-259241A comprises a base portion, and a support arm that is cantilevered and supported by the base portion and is provided with the head provided at a free end such that a position can be adjusted with respect to the tape. In addition, the servo writer disclosed in JP2005-259241A includes a detection unit that detects a position of an edge of the tape at a position in the vicinity of the head, a position adjustment unit that adjusts a relative position between the tape and the head, and a controller that controls the relative position by the position adjustment unit in accordance with the position of the edge detected by the detection unit.

SUMMARY

One embodiment according to the technology of the present disclosure provides a signal processing device, a magnetic tape drive, a magnetic tape, a magnetic tape cartridge, a program, a signal processing method, and a magnetic tape manufacturing method capable of easily specifying a deviation amount between servo patterns having a correspondence relationship between servo bands adjacent to each other in a width direction of the magnetic tape.

A first aspect according to the technology of the present disclosure relates to a signal processing device comprising a processor that acquires data read by a magnetic head from a magnetic tape including a plurality of servo bands formed therein, to process the acquired data, in which the plurality of servo bands are disposed at intervals in a width direction of the magnetic tape, a plurality of servo patterns are formed in each of the plurality of servo bands along a longitudinal direction of the magnetic tape, the magnetic head includes a pair of servo reading elements corresponding to a pair of servo bands adjacent to each other in the width direction among the plurality of servo bands, and the processor acquires a first signal based on a first result obtained by reading the servo pattern in a first servo band included in the pair of servo bands by a first servo reading element included in the pair of servo reading elements, acquires a second signal based on a second result obtained by reading the servo pattern in a second servo band included in the pair of servo bands by a second servo reading element included in the pair of servo reading elements, and acquires a deviation amount in time between the first signal and the second signal.

A second aspect according to the technology of the present disclosure relates to the signal processing device according to the first aspect. In the signal processing device according to the second aspect, the first result is a result obtained by reading the servo pattern in the first servo band by the first servo reading element while the first servo reading element is positioned on a BOT region of the magnetic tape, and the second result is a result obtained by reading the servo pattern in the second servo band by the second servo reading element while the second servo reading element is positioned on the BOT region.

A third aspect according to the technology of the present disclosure relates to the signal processing device according to the first or second aspect. In the signal processing device according to the third aspect, the servo pattern is a set of a plurality of linear magnetization regions, the linear magnetization region is a set of a plurality of magnetization straight lines, the first result is a first pulse signal group corresponding to the plurality of linear magnetization regions, the second result is a second pulse signal group corresponding to the plurality of linear magnetization regions, and in a case in which N is a natural number having the number of magnetization straight lines included in the plurality of linear magnetization regions as an upper limit value, the first signal is a signal corresponding to a designated Nth pulse signal included in the first pulse signal group, and the second signal is a signal corresponding to the Nth pulse signal included in the second pulse signal group.

A fourth aspect according to the technology of the present disclosure relates to the signal processing device according to the third aspect. In the signal processing device according to the fourth aspect, the Nth is the first.

A fifth aspect according to the technology of the present disclosure relates to the signal processing device according to the first or second aspect. In the signal processing device according to the fifth aspect, the servo pattern is a set of a plurality of linear magnetization regions, the first result is a first pulse signal group corresponding to the plurality of linear magnetization regions, the second result is a second pulse signal group corresponding to the plurality of linear magnetization regions, the first signal is a plurality of signals corresponding to a plurality of pulse signals included in the first pulse signal group, and the second signal is a plurality of signals corresponding to a plurality of pulse signals included in the second pulse signal group.

A sixth aspect according to the technology of the present disclosure relates to the signal processing device according to the fifth aspect. In the signal processing device according to the sixth aspect, the deviation amount is defined based on an average value, a median value, a most frequent value, a maximum value, or a minimum value of time differences between the plurality of signals corresponding to the plurality of pulse signals included in the first pulse signal group and the plurality of signals corresponding to the plurality of pulse signals included in the second pulse signal group.

A seventh aspect according to the technology of the present disclosure relates to the signal processing device according to any one of the first to sixth aspects. In the signal processing device according to the seventh aspect, the deviation amount is a statistic value of time differences between a plurality of the first signals obtained for a plurality of the servo patterns in the first servo band and a plurality of the second signals obtained for a plurality of the servo patterns in the second servo band.

An eighth aspect according to the technology of the present disclosure relates to the signal processing device according to any one of the first to seventh aspects. In the signal processing device according to the eighth aspect, the processor executes specific processing in accordance with the deviation amount.

A ninth aspect according to the technology of the present disclosure relates to the signal processing device according to the eighth aspect. In the signal processing device according to the ninth aspect, the processor controls a skew mechanism that skews the magnetic head, and the specific processing includes skew processing of causing the skew mechanism to skew the magnetic head at an angle based on the deviation amount.

A tenth aspect according to the technology of the present disclosure relates to the signal processing device according to any one of the first to ninth aspects. In the signal processing device according to the tenth aspect, the processor stores a signal corresponding to the deviation amount in a storage medium.

An eleventh aspect according to the technology of the present disclosure relates to the signal processing device according to the tenth aspect. In the signal processing device according to the eleventh aspect, the magnetic tape is accommodated in a magnetic tape cartridge, the magnetic tape cartridge is provided with a noncontact storage medium that is able to perform communication in a noncontact manner, and the storage medium includes the noncontact storage medium.

A twelfth aspect according to the technology of the present disclosure relates to the signal processing device according to the tenth or eleventh aspect. In the signal processing device according to the twelfth aspect, the storage medium includes a partial region of the magnetic tape.

A thirteenth aspect according to the technology of the present disclosure relates to a magnetic tape drive that executes processing in accordance with the deviation amount obtained from the signal processing device according to any one of the first to twelfth aspects.

A fourteenth aspect according to the technology of the present disclosure relates to a magnetic tape comprising a plurality of servo bands formed therein, in which the plurality of servo bands are disposed at intervals in a width direction of the magnetic tape, a plurality of servo patterns are formed in each of the plurality of servo bands along a longitudinal direction of the magnetic tape, and a deviation amount between the servo patterns having corresponding positions in the longitudinal direction of the magnetic tape between a pair of servo bands adjacent to each other in the width direction among the plurality of servo bands corresponds to the deviation amount obtained from the signal processing device according to any one of the first to twelfth aspects.

A fifteenth aspect according to the technology of the present disclosure relates to the magnetic tape according to the fourteenth aspect, in which a signal corresponding to the deviation amount is stored in a partial region of the magnetic tape.

A sixteenth aspect according to the technology of the present disclosure relates to a magnetic tape cartridge comprising the magnetic tape according to the fourteenth or fifteenth aspect accommodated therein.

A seventeenth aspect according to the technology of the present disclosure relates to the magnetic tape cartridge according to the sixteenth aspect further comprising a noncontact storage medium that is able to perform communication in a noncontact manner, in which a signal corresponding to the deviation amount obtained from the signal processing device according to any one of the first to twelfth aspects is stored in the noncontact storage medium.

An eighteenth aspect according to the technology of the present disclosure relates to a signal processing method comprising acquiring data read by a magnetic head from a magnetic tape including a plurality of servo bands formed therein, to process the acquired data, in which the plurality of servo bands are disposed at intervals in a width direction of the magnetic tape, a plurality of servo patterns are formed in each of the plurality of servo bands along a longitudinal direction of the magnetic tape, the magnetic head includes a pair of servo reading elements corresponding to a pair of servo bands adjacent to each other in the width direction among the plurality of servo bands, and the signal processing method further includes acquiring a first signal based on a result obtained by reading the servo pattern in a first servo band included in the pair of servo bands by a first servo reading element included in the pair of servo reading elements, acquiring a second signal based on a result obtained by reading the servo pattern in a second servo band included in the pair of servo bands by a second servo reading element included in the pair of servo reading elements, and acquiring a deviation amount in time between the first signal and the second signal.

A nineteenth aspect according to the technology of the present disclosure relates to a magnetic tape manufacturing method comprising recording a servo pattern in accordance with the deviation amount obtained from the signal processing device according to any one of the first to twelfth aspects.

A twentieth aspect according to the technology of the present disclosure relates to a magnetic tape in which a servo pattern is recorded in accordance with the deviation amount obtained by using the signal processing method according to the eighteenth aspect.

A twenty-first aspect according to the technology of the present disclosure relates to a magnetic tape manufacturing method comprising recording a servo pattern in a magnetic tape in accordance with the deviation amount obtained by using the signal processing method according to the eighteenth aspect.

A twenty-second aspect according to the technology of the present disclosure relates to a program causing a computer to execute signal processing comprising acquiring data read by a magnetic head from a magnetic tape including a plurality of servo bands formed therein, to process the acquired data, in which the plurality of servo bands are disposed at intervals in a width direction of the magnetic tape, a plurality of servo patterns are formed in each of the plurality of servo bands along a longitudinal direction of the magnetic tape, the magnetic head includes a pair of servo reading elements corresponding to a pair of servo bands adjacent to each other in the width direction among the plurality of servo bands, and the signal processing further includes acquiring a first signal based on a result obtained by reading the servo pattern in a first servo band included in the pair of servo bands by a first servo reading element included in the pair of servo reading elements, acquiring a second signal based on a result obtained by reading the servo pattern in a second servo band included in the pair of servo bands by a second servo reading element included in the pair of servo reading elements, and acquiring a deviation amount in time between the first signal and the second signal.

BRIEF DESCRIPTION OF THE DRAWINGS

Exemplary embodiments of the technology of the disclosure will be described in detail based on the following figures, wherein.

DETAILED DESCRIPTION

Hereinafter, examples of embodiments of a signal processing device, a magnetic tape drive, a magnetic tape, a magnetic tape cartridge, a program, a signal processing method, and a magnetic tape manufacturing method according to the technology of the present disclosure will be described with reference to the accompanying drawings.

First, the terms used in the following description will be described.

CPU refers to an abbreviation of "central processing unit". NVM refers to an abbreviation of "non-volatile memory". RAM refers to an abbreviation of "random access memory". EEPROM refers to an abbreviation of "electrically erasable and programmable read only memory". SSD refers to an abbreviation of "solid state drive". HDD refers to an abbreviation of "hard disk drive". ASIC refers to an abbreviation of "application specific integrated circuit". FPGA refers to an abbreviation of "field-programmable gate array". PLC refers to an abbreviation of "programmable logic controller". SoC refers to an abbreviation of "system-on-a-chip". IC refers to an abbreviation of "integrated circuit". RFID refers to an abbreviation of "radio frequency identifier". BOT refers to an abbreviation of "beginning of tape". EOT refers to an abbreviation of "end of tape". UI refers to an abbreviation of "user interface". WAN refers to an abbreviation of "wide area network". LAN refers to an abbreviation of "local area network". In addition, in the following description, the geometrical characteristic refers to a generally recognized geometrical characteristic, such as a length, a shape, an orientation, and/or a position.

Figure 1:
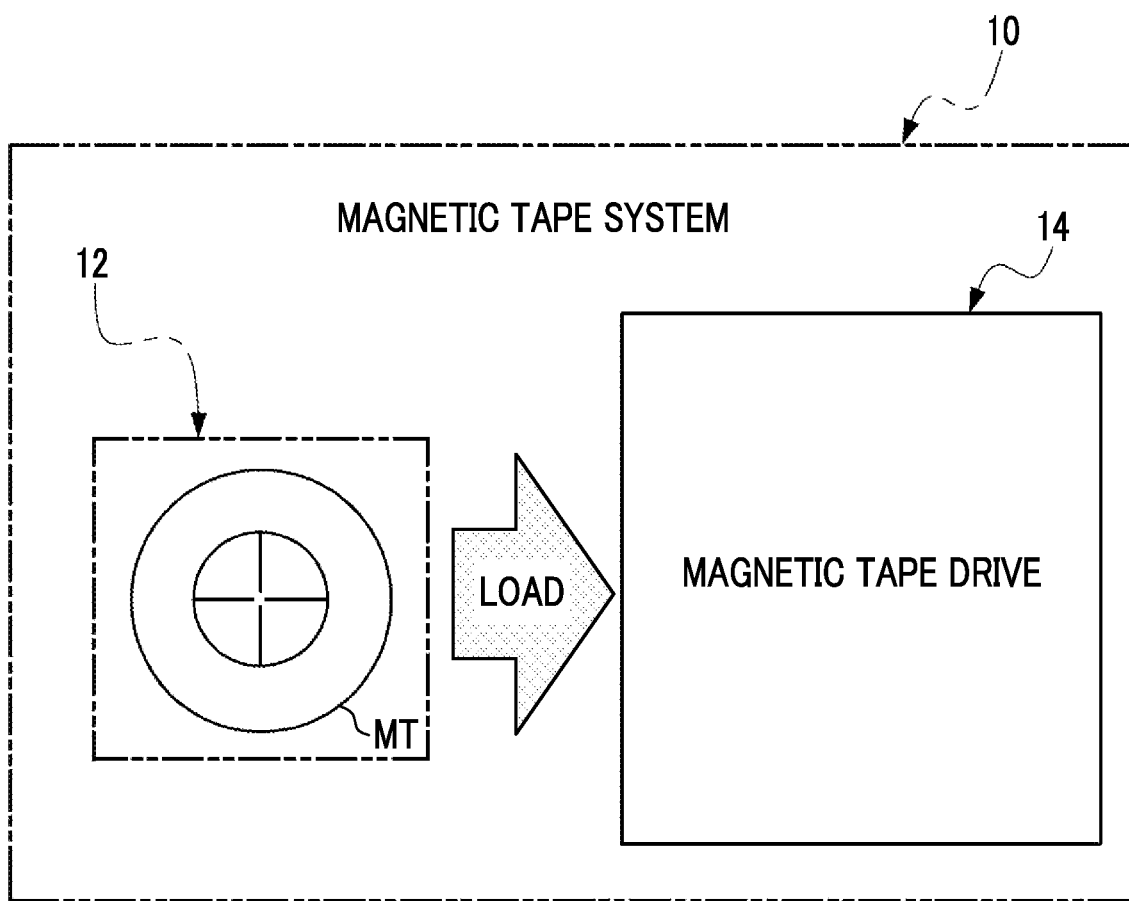
FIG. 1 is a block diagram showing an example of a configuration of a magnetic tape system.

As an example, as shown in FIG. 1, a magnetic tape system 10 comprises a magnetic tape cartridge 12 and a magnetic tape drive 14. A magnetic tape cartridge 12 is loaded into the magnetic tape drive 14. The magnetic tape cartridge 12 accommodates the magnetic tape MT. The magnetic tape drive 14 pulls out the magnetic tape MT from the loaded magnetic tape cartridge 12, and records data in the magnetic tape MT and reads data from the magnetic tape MT while causing the pulled out magnetic tape MT to travel.

In the present embodiment, the magnetic tape MT is an example of a "magnetic tape" according to the technology of the present disclosure. In addition, in the present embodiment, the magnetic tape drive 14 is an example of a "magnetic tape drive" according to the technology of the present disclosure. In addition, in the present embodiment, the magnetic tape cartridge 12 is an example of a "magnetic tape cartridge" according to the technology of the present disclosure.

Next, an example of a configuration of the magnetic tape cartridge 12 will be described with reference to FIGS. 2 to 4. It should be noted that, in the following description, for convenience of description, in FIGS. 2 to 4, a loading direction of the magnetic tape cartridge 12 into the magnetic tape drive 14 is indicated by an arrow A, a direction of the arrow A is defined as a front direction of the magnetic tape cartridge 12, and a side of the magnetic tape cartridge 12 in the front direction is defined as a front side of the magnetic tape cartridge 12. In the following description of the structure, "front" refers to the front side of the magnetic tape cartridge 12.

In addition, in the following description, for convenience of description, in FIGS. 2 to 4, a direction of an arrow B orthogonal to the direction of the arrow A is defined as a right direction, and a side of the magnetic tape cartridge 12 in the right direction is defined as a right side of the magnetic tape cartridge 12. In the following description of the structure, "right" refers to the right side of the magnetic tape cartridge 12.

In addition, in the following description, for convenience of description, in FIGS. 2 to 4, a direction opposite to the direction of the arrow B is defined as a left direction, and a side of the magnetic tape cartridge 12 in the left direction is defined as a left side of the magnetic tape cartridge 12. In the following description of the structure, "left" refers to the left side of the magnetic tape cartridge 12.

In addition, in the following description, for convenience of description, in FIGS. 2 to 4, a direction orthogonal to the direction of the arrow A and the direction of the arrow B is indicated by an arrow C, a direction of the arrow C is defined as an upper direction of the magnetic tape cartridge 12, and a side of the magnetic tape cartridge 12 in the upper direction is defined as an upper side of the magnetic tape cartridge 12. In the following description of the structure, "upper" refers to the upper side of the magnetic tape cartridge 12.

In addition, in the following description, for convenience of description, in FIGS. 2 to 4, a direction opposite to the front direction of the magnetic tape cartridge 12 is defined as a rear direction of the magnetic tape cartridge 12, and a side of the magnetic tape cartridge 12 in the rear direction is defined as a rear side of the magnetic tape cartridge 12. In the following description of the structure, "rear" refers to the rear side of the magnetic tape cartridge 12.

In addition, in the following description, for convenience of description, in FIGS. 2 to 4, a direction opposite to the upper direction of the magnetic tape cartridge 12 is defined as a lower direction of the magnetic tape cartridge 12, and a side of the magnetic tape cartridge 12 in the lower direction is defined as a lower side of the magnetic tape cartridge 12. In the following description of the structure, "lower" refers to the lower side of the magnetic tape cartridge 12.

Figure 2:
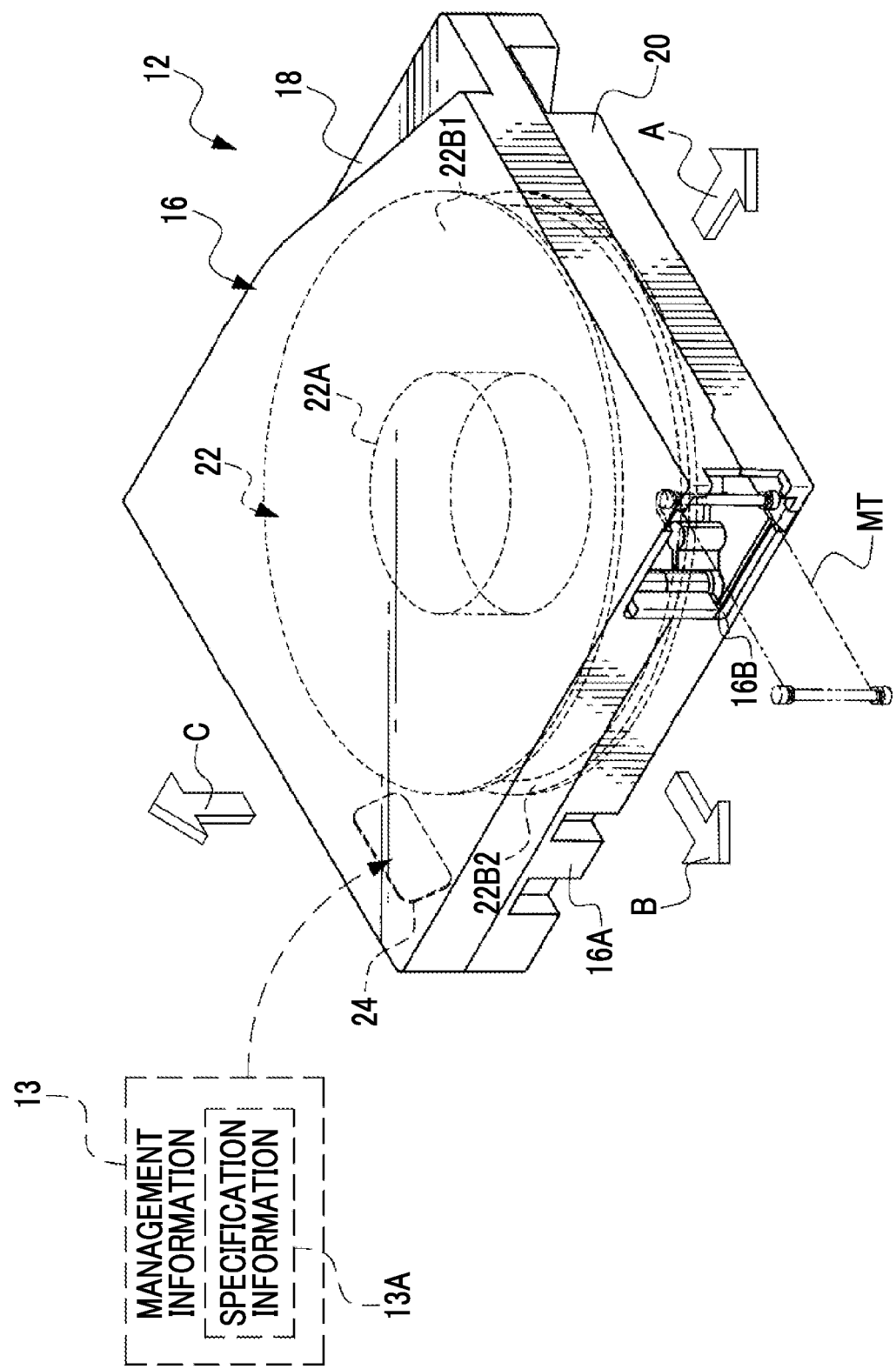
FIG. 2 is a schematic perspective view of an example of an appearance of a magnetic tape cartridge.

As an example, as shown in FIG. 2, the magnetic tape cartridge 12 has a substantially rectangular shape in a plan view, and comprises a box-shaped case 16. The magnetic tape MT is accommodated in the case 16. The case 16 is made of resin, such as polycarbonate, and comprises an upper case 18 and a lower case 20. The upper case 18 and the lower case 20 are bonded by welding (for example, ultrasound welding) and screwing in a state in which a lower peripheral edge surface of the upper case 18 and an upper peripheral edge surface of the lower case 20 are brought into contact with each other. The bonding method is not limited to welding and screwing, and other bonding methods may be used.

A sending reel 22 is rotatably accommodated inside the case 16. The sending reel 22 comprises a reel hub 22A, an upper flange 22B1, and a lower flange 22B2. The reel hub 22A is formed in a cylindrical shape. The reel hub 22A is formed in an axial center portion of the sending reel 22, has an axial center direction along an up-down direction of the case 16, and is disposed in a center portion of the case 16. Each of the upper flange 22B1 and the lower flange 22B2 is formed in an annular shape. A center portion of the upper flange 22B1 in a plan view is fixed to an upper end portion of the reel hub 22A, and a center portion of the lower flange 22B2 in a plan view is fixed to a lower end portion of the reel hub 22A.

It should be noted that the reel hub 22A and the lower flange 22B2 may be integrally molded.

The magnetic tape MT is wound around an outer peripheral surface of the reel hub 22A, and an end portion of the magnetic tape MT in a width direction is held by the upper flange 22B1 and the lower flange 22B2.

An opening 16B is formed on a front side of a right wall 16A of the case 16. The magnetic tape MT is pulled out from the opening 16B.

A cartridge memory 24 is provided in the lower case 20. Specifically, the cartridge memory 24 is accommodated in a right rear end portion of the lower case 20. The cartridge memory 24 is a memory that can perform communication in a noncontact manner. An IC chip including an NVM is mounted on the cartridge memory 24. In the present embodiment, a so-called passive RFID tag is adopted as the cartridge memory 24, and the read/write of various pieces of information is performed with respect to the cartridge memory 24 in a noncontact manner. It should be noted that, in the present embodiment, the form example has been described in which the cartridge memory 24 is provided in the lower case 20, but the technology of the present disclosure is not limited to this, and the cartridge memory 24 need only be provided in the case 16 at a position at which various pieces of information can be read and written in a noncontact manner.

The cartridge memory 24 stores management information 13 for managing the magnetic tape cartridge 12. The management information 13 includes, for example, information on the cartridge memory 24 (for example, information for specifying the magnetic tape cartridge 12), information on the magnetic tape MT, and information on the magnetic tape drive 14 (for example, information that indicates specifications of the magnetic tape drive 14 and a signal used in the magnetic tape drive 14). The information on the magnetic tape MT includes specification information 13A. The specification information 13A is information for specifying the specifications of the magnetic tape MT. In addition, the information on the magnetic tape MT also includes information that indicates an outline of the data recorded in the magnetic tape MT, information that indicates an item of the data recorded in the magnetic tape MT, information that indicates a recording format of the data recorded in the magnetic tape MT, and the like. It should be noted that, in the present embodiment, the cartridge memory 24 is an example of a "storage medium" and a "noncontact storage medium" according to the technology of the present disclosure.

Figure 3:
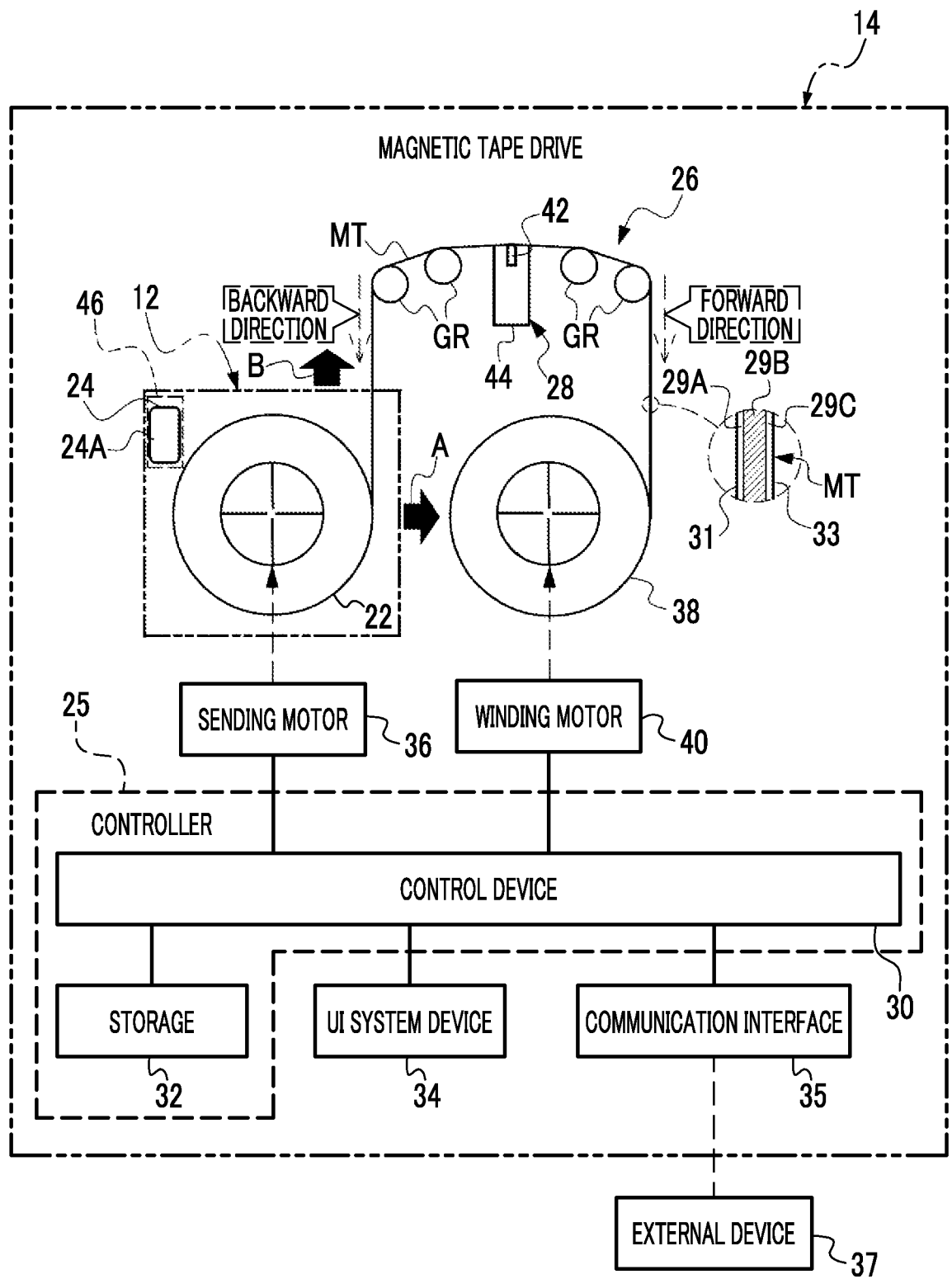
FIG. 3 is a schematic configuration diagram showing an example of a hardware configuration of a magnetic tape drive.

As an example, as shown in FIG. 3, the magnetic tape drive 14 comprises a controller 25, a transport device 26, a magnetic head 28, a UI system device 34, and a communication interface 35.

The controller 25 comprises a control device 30 and a storage 32. In the present embodiment, the controller 25 is an example of a "signal processing device". Further, the control device 30 is an example of a "processor" according to the technology of the present disclosure.

The magnetic tape drive 14 is loaded into the magnetic tape cartridge 12 along the direction of the arrow A. In the magnetic tape drive 14, the magnetic tape MT is pulled out from the magnetic tape cartridge 12 and used. The controller 25 controls the entire magnetic tape drive 14 (for example, the magnetic head 28 or the like) by using the management information 13 and the like stored in the cartridge memory 24.

The magnetic tape MT has a magnetic layer 29A, a base film 29B, and a back coating layer 29C. The magnetic layer 29A is formed on one surface side of the base film 29B, and the back coating layer 29C is formed on the other surface side of the base film 29B. The data is recorded in the magnetic layer 29A. The magnetic layer 29A contains ferromagnetic powder. As the ferromagnetic powder, for example, ferromagnetic powder generally used in the magnetic layer of various magnetic recording media is used. Preferable specific examples of the ferromagnetic powder include hexagonal ferrite powder. Examples of the hexagonal ferrite powder include hexagonal strontium ferrite powder and hexagonal barium ferrite powder. The back coating layer 29C is a layer containing non-magnetic powder, such as carbon black. The base film 29B is also referred to as a support, and is made of, for example, polyethylene terephthalate, polyethylene naphthalate, or polyamide. It should be noted that a non-magnetic layer may be formed between the base film 29B and the magnetic layer 29A. In the magnetic tape MT, a surface on which the magnetic layer 29A is formed is a front surface 31 of the magnetic tape MT, and a surface on which the back coating layer 29C is formed is a back surface 33 of the magnetic tape MT.

The magnetic tape drive 14 performs magnetic processing on the front surface 31 of the magnetic tape MT by using the magnetic head 28 in a state in which the magnetic tape MT is made to travel. Here, the magnetic processing refers to recording the data (that is, writing the data) in the front surface 31 of the magnetic tape MT and reading the data (that is, reproducing the data) from the front surface 31 of the magnetic tape MT. In the present embodiment, the magnetic tape drive 14 selectively records the data in the front surface 31 of the magnetic tape MT and reads the data from the front surface 31 of the magnetic tape MT by using the magnetic head 28. That is, the magnetic tape drive 14 pulls out the magnetic tape MT from the magnetic tape cartridge 12, records the data in the front surface 31 of the pulled out magnetic tape MT by using the magnetic head 28, or reads the data from the front surface 31 of the pulled out magnetic tape MT by using the magnetic head 28.

The control device 30 controls the entire magnetic tape drive 14. In the present embodiment, although the control device 30 is realized by an ASIC, the technology of the present disclosure is not limited to this. For example, the control device 30 may be realized by an FPGA and/or a PLC. In addition, the control device 30 may be realized by the computer including a CPU, a flash memory (for example, an EEPROM and/or an SSD), and a RAM. In addition, the control device 30 may be realized by combining two or more of an ASIC, an FPGA, a PLC, and a computer. That is, the control device 30 may be realized by a combination of a hardware configuration and a software configuration.

The storage 32 is connected to the control device 30, and the control device 30 writes various pieces of information to the storage 32 and reads out various pieces of information from the storage 32. Examples of the storage 32 include a flash memory and/or an HDD. The flash memory and the HDD are merely examples, and any memory may be used as long as the memory is a non-volatile memory that can be mounted on the magnetic tape drive 14.

The UI system device 34 is a device having the reception function of receiving a command signal indicating a command from a user and the presentation function of presenting the information to the user. The reception function is realized by a touch panel, a hard key (for example, a keyboard), and/or a mouse, for example. The presentation function is realized by a display, a printer, and/or a speaker, for example. The UI system device 34 is connected to the control device 30. The control device 30 acquires the command signal received by the UI system device 34. The UI system device 34 presents various pieces of information to the user under the control of the control device 30.

The communication interface 35 is connected to the control device 30. In addition, the communication interface 35 is connected to an external device 37 via a communication network (not shown), such as a WAN and/or a LAN. The communication interface 35 controls the exchange of various pieces of information (for example, the data to be recorded in the magnetic tape MT, the data read from the magnetic tape MT, and/or a command signal given to the control device 30) between the control device 30 and the external device 37. It should be noted that examples of the external device 37 include a personal computer and a mainframe.

The transport device 26 is a device that selectively transports the magnetic tape MT along a predetermined path in a forward direction and a backward direction, and comprises a sending motor 36, a winding reel 38, a winding motor 40, and a plurality of guide rollers GR. It should be noted that, here, the forward direction refers to a sending direction of the magnetic tape MT, and the backward direction refers to a rewinding direction of the magnetic tape MT.

The sending motor 36 rotates the sending reel 22 in the magnetic tape cartridge 12 under the control of the control device 30. The control device 30 controls the sending motor 36 to control a rotation direction, a rotation speed, a rotation torque, and the like of the sending reel 22.

The winding motor 40 rotates the winding reel 38 under the control of the control device 30. The control device 30 controls the winding motor 40 to control a rotation direction, a rotation speed, a rotation torque, and the like of the winding reel 38.

In a case in which the magnetic tape MT is wound by the winding reel 38, the control device 30 rotates the sending motor 36 and the winding motor 40 such that the magnetic tape MT travels along the predetermined path in the forward direction. The rotation speed, the rotation torque, and the like of the sending motor 36 and the winding motor 40 are adjusted in accordance with a speed at which the magnetic tape MT is wound around the winding reel 38. In addition, by adjusting the rotation speed, the rotation torque, and the like of each of the sending motor 36 and the winding motor 40 by the control device 30, the tension is applied to the magnetic tape MT. In addition, the tension applied to the magnetic tape MT is controlled by adjusting the rotation speed, the rotation torque, and the like of each of the sending motor 36 and the winding motor 40 by the control device 30.

It should be noted that, in a case in which the magnetic tape MT is rewound to the sending reel 22, the control device 30 rotates the sending motor 36 and the winding motor 40 such that the magnetic tape MT travels along the predetermined path in the backward direction.

In the present embodiment, the tension applied to the magnetic tape MT is controlled by controlling the rotation speed, the rotation torque, and the like of the sending motor 36 and the winding motor 40, but the technology of the present disclosure is not limited to this. For example, the tension applied to the magnetic tape MT may be controlled by using a dancer roller, or may be controlled by drawing the magnetic tape MT into a vacuum chamber.

Each of the plurality of guide rollers GR is a roller which guides the magnetic tape MT. The predetermined path, that is, a traveling path of the magnetic tape MT is determined by separately disposing the plurality of guide rollers GR at positions straddling the magnetic head 28 between the magnetic tape cartridge 12 and the winding reel 38.

The magnetic head 28 comprises a magnetic element unit 42 and a holder 44. The magnetic element unit 42 is held by the holder 44 to come into contact with the traveling magnetic tape MT. The magnetic element unit 42 includes a plurality of magnetic elements.

The magnetic element unit 42 records the data in the magnetic tape MT transported by the transport device 26, and reads the data from the magnetic tape MT transported by the transport device 26. Here, the data refers to, for example, a servo pattern 52 (see FIG. 6) and the data other than the servo pattern 52, that is, the data recorded in a data band DB (see FIG. 6). The data used herein is an example of "data" according to the technology of the present disclosure.

The magnetic tape drive 14 comprises a noncontact read/write device 46. The noncontact read/write device 46 is disposed to face a back surface 24A of the cartridge memory 24 on the lower side of the magnetic tape cartridge 12 in a state in which the magnetic tape cartridge 12 is loaded, and performs the read/write of the information with respect to the cartridge memory 24 in a noncontact manner.

Figure 4:
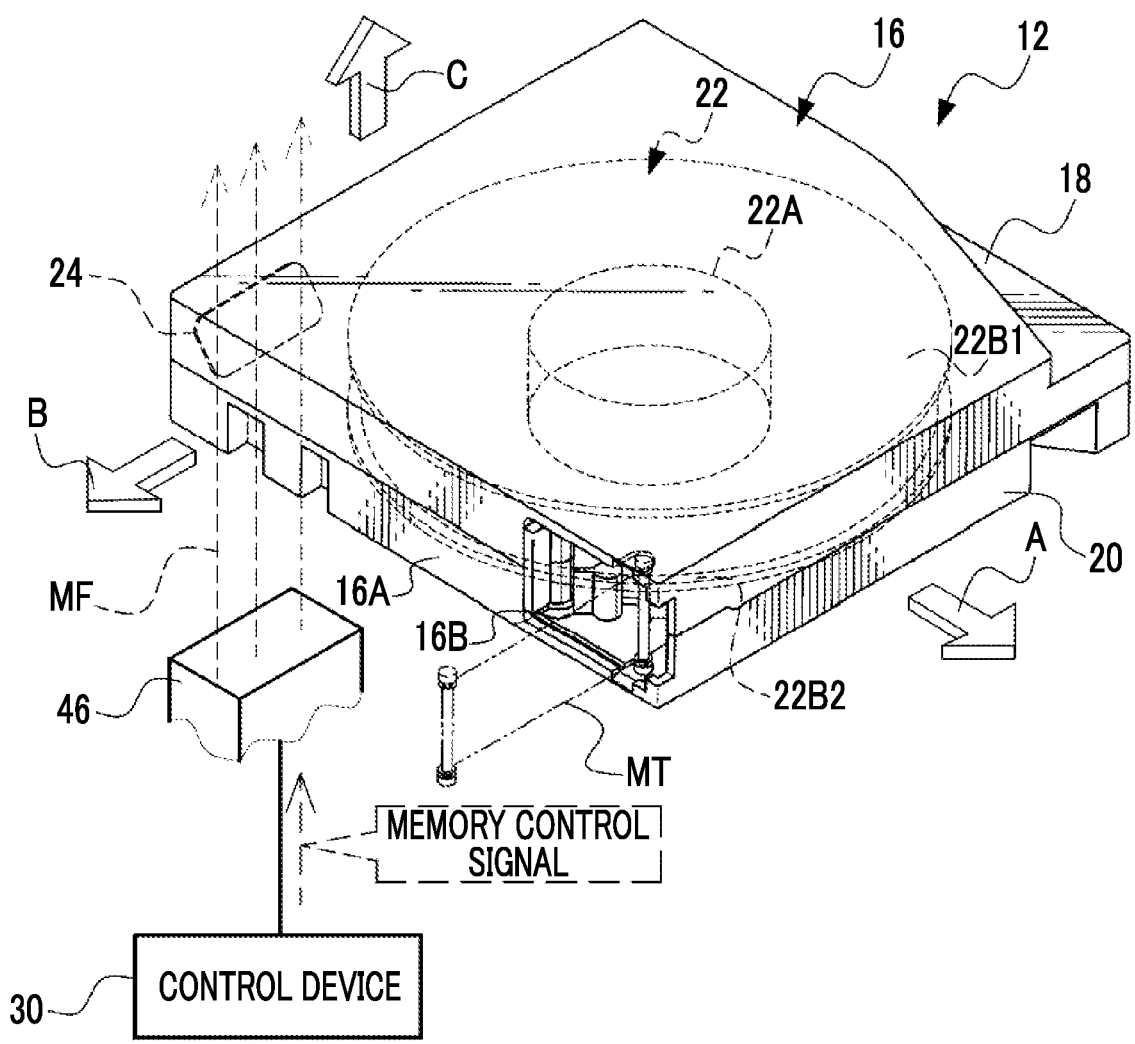
FIG. 4 is a schematic perspective view showing an example of an aspect in which a magnetic field is released by a noncontact read/write device from a lower side of the magnetic tape cartridge.

As an example, as shown in FIG. 4, the noncontact read/write device 46 releases a magnetic field MF from the lower side of the magnetic tape cartridge 12 toward the cartridge memory 24. The magnetic field MF passes through the cartridge memory 24.

The noncontact read/write device 46 is connected to the control device 30. The control device 30 outputs a memory control signal to the noncontact read/write device 46. The memory control signal is a signal for controlling the cartridge memory 24. The noncontact read/write device 46 generates the magnetic field MF in response to the memory control signal input from the control device 30, and releases the generated magnetic field MF toward the cartridge memory 24.

The noncontact read/write device 46 performs noncontact communication with the cartridge memory 24 via the magnetic field MF to perform processing on the cartridge memory 24 in response to the memory control signal. For example, the noncontact read/write device 46 selectively performs, under the control of the control device 30, processing of reading the information from the cartridge memory 24 and processing of storing the information in the cartridge memory 24 (that is, processing of writing the information to the cartridge memory 24). In other words, the control device 30 reads the information from the cartridge memory 24 and stores the information in the cartridge memory 24 by performing communication with the cartridge memory 24 via the noncontact read/write device 46 in a noncontact manner.

Figure 5:
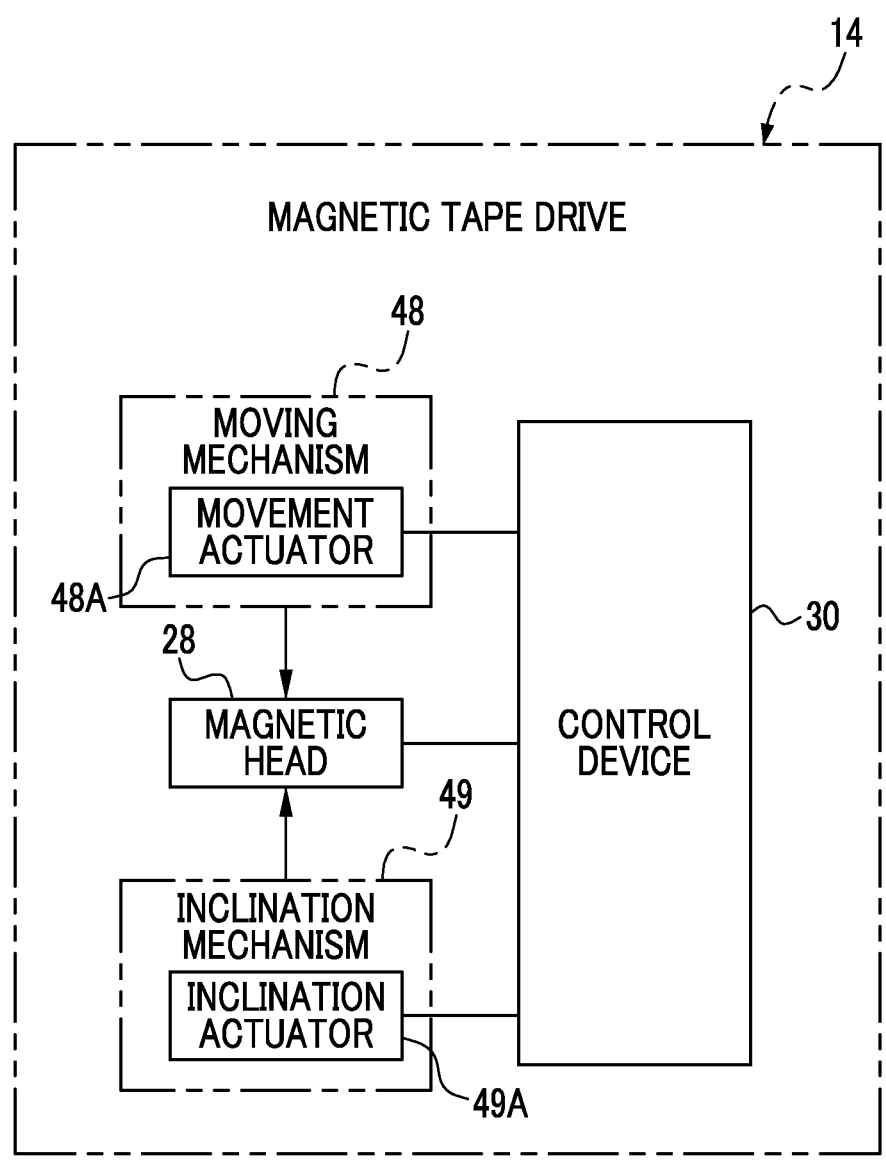
FIG. 5 is a schematic configuration diagram showing an example of the hardware configuration of the magnetic tape drive.

As an example, as shown in FIG. 5, the magnetic tape drive 14 comprises a moving mechanism 48. The moving mechanism 48 includes a movement actuator 48A. Examples of the movement actuator 48A include a voice coil motor and/or a piezo actuator. The movement actuator 48A is connected to the control device 30, and the control device 30 controls the movement actuator 48A. The movement actuator 48A generates power under the control of the control device 30. The moving mechanism 48 moves the magnetic head 28 in a width direction WD (see FIG. 6) of the magnetic tape MT by receiving the power generated by the movement actuator 48A.

The magnetic tape drive 14 comprises an inclination mechanism 49. The inclination mechanism 49 is an example of an "skew mechanism" according to the technology of the present disclosure. The inclination mechanism 49 includes an inclination actuator 49A. Examples of the inclination actuator 49A include a voice coil motor and/or a piezo actuator. The inclination actuator 49A is connected to the control device 30, and the control device 30 controls the inclination actuator 49A. The inclination actuator 49A generates power under the control of the control device 30. The inclination mechanism 49 inclines the magnetic head 28 to a longitudinal direction LD side of the magnetic tape MT with respect to a width direction WD of the magnetic tape MT by receiving the power generated by the inclination actuator 49A (see FIG. 10). That is, the magnetic head 28 is skewed on the magnetic tape MT by applying power from the inclination mechanism 49 under the control of the control device 30.

Figure 6:
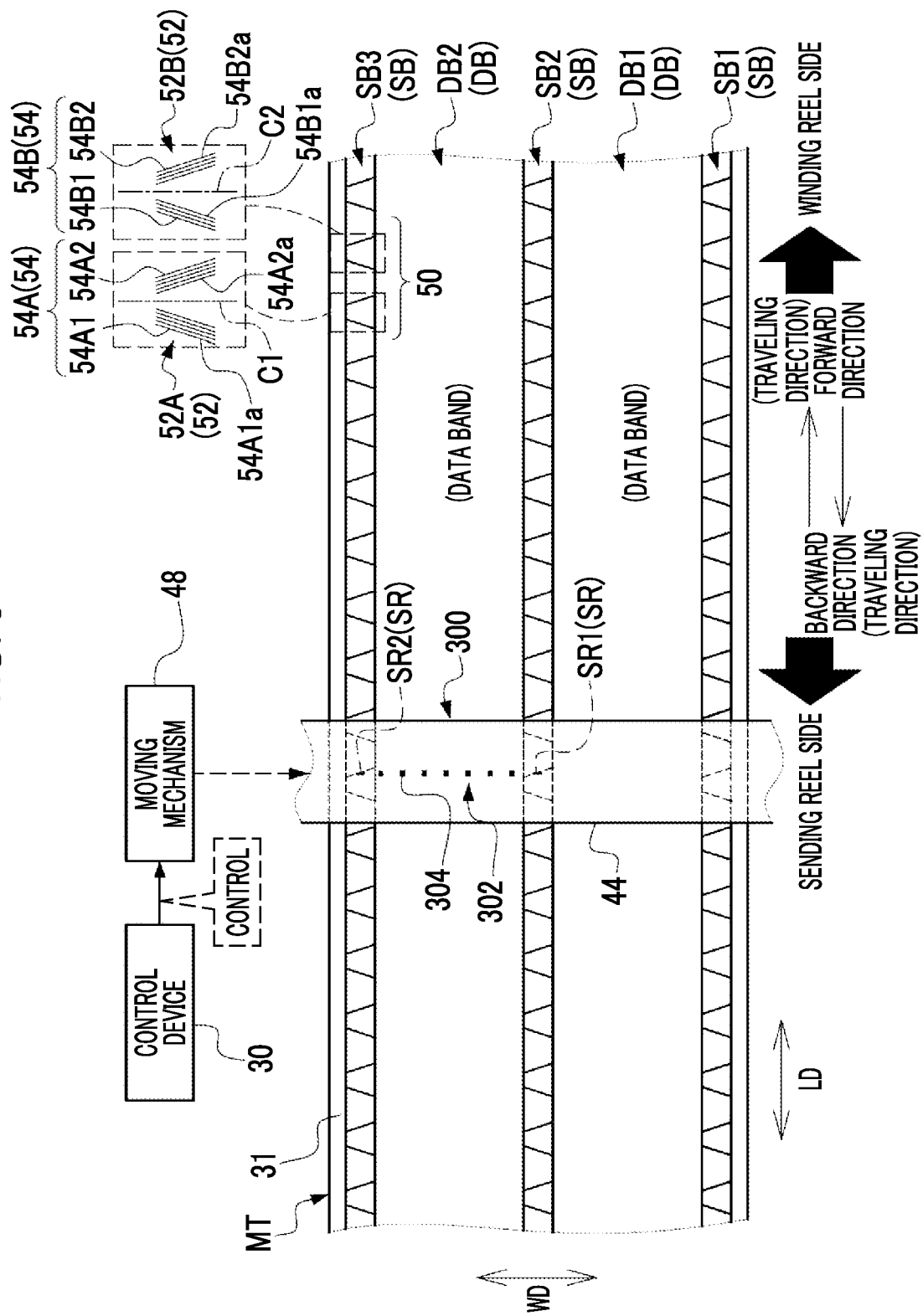
FIG. 6 is a conceptual diagram showing an example of a relative relationship between a magnetic tape and a magnetic head in a case in which data is recorded in a data band or a signal in the data band is reproduced while the magnetic head travels on the magnetic tape.

As an example, as shown in FIG. 6, on the front surface 31 of the magnetic tape MT, servo bands SB1, SB2, and SB3 are data bands DB1 and DB2 are formed. It should be noted that, in the following, for convenience of description, in a case in which the distinction is not specifically needed, the servo bands SB1 to SB3 are referred to as a servo band SB, and the data bands DB1 and DB2 are referred to as the data band DB.

The servo bands SB1 to SB3 and the data bands DB1 and DB2 are formed along the longitudinal direction LD (that is, a total length direction) of the magnetic tape MT. Here, the total length direction of the magnetic tape MT refers to the traveling direction of the magnetic tape MT, in other words. The traveling direction of the magnetic tape MT is defined in two directions of the forward direction which is a direction in which the magnetic tape MT travels from the sending reel 22 side to the winding reel 38 side (hereinafter, also simply referred to as "forward direction"), and the backward direction which is a direction in which the magnetic tape MT travels from the winding reel 38 side to the sending reel 22 side (hereinafter, also simply referred to as "backward direction").

The servo bands SB1 to SB3 are arranged at positions spaced in the width direction WD of the magnetic tape MT (hereinafter, also simply referred to as "width direction WD"). For example, the servo bands SB1 to SB3 are arranged at equal intervals along the width direction WD. It should be noted that, in the present embodiment, "equal interval" refers to the equal interval in the sense of including an error generally allowed in the technical field to which the technology of the present disclosure belongs, that is the error to the extent that it does not contradict the purpose of the technology of the present disclosure, in addition to the exact equal interval.

The data band DB1 is disposed between the servo band SB1 and the servo band SB2, and the data band DB2 is disposed between a servo band SB2 and a servo band SB3. That is, the servo bands SB and the data bands DB are arranged alternately along the width direction WD.

It should be noted that, in the example shown in FIG. 6, for convenience of description, three servo bands SB and two data bands DB are shown, but these are merely examples, and two servo bands SB and one data band DB may be used, and the technology of the present disclosure is established even in a case in which four or more servo bands SB and three or more data bands DB are used.

A plurality of servo patterns 52 are formed in the servo band SB along the longitudinal direction LD of the magnetic tape MT. The servo patterns 52 are classified into a servo pattern 52A and a servo pattern 52B. The plurality of servo patterns 52 are disposed at regular intervals along the longitudinal direction LD of the magnetic tape MT. It should be noted that, in the present embodiment, "regular" refers to the regularity in the sense of including an error generally allowed in the technical field to which the technology of the present disclosure belongs, which is the error to the extent that it does not contradict the purpose of the technology of the present disclosure, in addition to the exact regularity.

The servo band SB is divided by a plurality of frames 50 along the longitudinal direction LD of the magnetic tape MT. The frame 50 is defined by one set of servo patterns 52. In the example shown in FIG. 6, the servo patterns 52A and 52B are shown as an example of the set of servo patterns 52. The servo patterns 52A and 52B are adjacent to each other along the longitudinal direction LD of the magnetic tape MT, and the servo pattern 52A is positioned on the upstream side in the forward direction in the frame 50, and the servo pattern 52B is positioned on the downstream side in the forward direction.

The servo pattern 52 consists of a linear magnetization region pair 54. The linear magnetization region pair 54 is classified into a linear magnetization region pair 54A and a linear magnetization region pair 54B.

The servo pattern 52A consists of the linear magnetization region pair 54A. In the example shown in FIG. 6, a pair of linear magnetization regions 54A1 and 54A2 is shown as an example of the linear magnetization region pair 54A. Each of the linear magnetization regions 54A1 and 54A2 is a linearly magnetized region.

The linear magnetization regions 54A1 and 54A2 are inclined in opposite directions with respect to an imaginary straight line C1 which is an imaginary straight line along the width direction WD. In the example shown in FIG. 6, the linear magnetization regions 54A1 and 54A2 are inclined line-symmetrically with respect to the imaginary straight line C1. More specifically, the linear magnetization regions 54A1 and 54A2 are formed in a state of being not parallel to each other and being inclined at a predetermined angle (for example, 5 degrees) in opposite directions on the longitudinal direction LD side of the magnetic tape MT with the imaginary straight line C1 as the symmetry axis.

The linear magnetization region 54A1 is a set of magnetization straight lines 54A1a, which are five magnetized straight lines. The linear magnetization region 54A2 is a set of magnetization straight lines 54A2a, which are five magnetized straight lines. The set of the magnetization straight lines 54A1a and the set of the magnetization straight lines 54A2a are examples of a "set of a plurality of magnetization straight lines" according to the technology of the present disclosure.

The servo pattern 52B consists of the linear magnetization region pair 54B. In the example shown in FIG. 6, a pair of linear magnetization regions 54B1 and 54B2 is shown as an example of the linear magnetization region pair 54B. Each of the linear magnetization regions 54B1 and 54B2 is a linearly magnetized region.

The linear magnetization regions 54B1 and 54B2 are inclined in opposite directions with respect to an imaginary straight line C2 which is an imaginary straight line along the width direction WD. In the example shown in FIG. 6, the linear magnetization regions 54B1 and 54B2 are inclined line-symmetrically with respect to the imaginary straight line C2. More specifically, the linear magnetization regions 54B1 and 54B2 are formed in a state of being not parallel to each other and being inclined at a predetermined angle (for example, 5 degrees) in opposite directions on the longitudinal direction LD side of the magnetic tape MT with the imaginary straight line C2 as the symmetry axis.

The linear magnetization region 54B1 is a set of magnetization straight lines 54B1a, which are four magnetized straight lines. The linear magnetization region 54B2 is a set of magnetization straight lines 54B2a, which are four magnetized straight lines. The set of the magnetization straight lines 54B1a and the set of the magnetization straight lines 54B2a are examples of a "set of a plurality of magnetization straight lines" according to the technology of the present disclosure.

The magnetic head 28 is disposed on the front surface 31 side of the magnetic tape MT configured as described above. The holder 44 is formed in a rectangular parallelepiped shape, and is disposed to cross the front surface 31 of the magnetic tape MT along the width direction WD. The plurality of magnetic elements of the magnetic element unit 42 are arranged in a straight line along the longitudinal direction of the holder 44. The magnetic element unit 42 has a pair of servo reading elements SR and a plurality of data read/write elements DRW as the plurality of magnetic elements. In the present embodiment, the pair of servo reading elements SR is an example of a "pair of servo reading elements" according to the technology of the present disclosure.

A length of the holder 44 in the longitudinal direction is sufficiently long with respect to the width of the magnetic tape MT. For example, the length of the holder 44 in the longitudinal direction is set to a length exceeding the width of the magnetic tape MT even in a case in which the magnetic element unit 42 is disposed at any position on the magnetic tape MT.

The pair of servo reading elements SR are mounted on the magnetic head 28. In the magnetic head 28, a relative positional relationship between the holder 44 and the pair of servo reading elements SR is fixed. The pair of servo reading elements SR consists of servo reading elements SR1 and SR2. The servo reading element SR1 is disposed at one end of the magnetic element unit 42, and the servo reading element SR2 is disposed at the other end of the magnetic element unit 42. In the example shown in FIG. 6, the servo reading element SR1 is provided at a position corresponding to the servo band SB2, and the servo reading element SR2 is provided at a position corresponding to the servo band SB3. In the present embodiment, the servo reading element SR1 is an example of a "first servo reading element" according to the technology of the present disclosure, and the servo reading element SR2 is an example of a "second servo reading element" according to the technology of the present disclosure.

The plurality of data read/write elements DRW are disposed in a straight line between the servo reading element SR1 and the servo reading element SR2. The plurality of data read/write elements DRW are disposed at intervals along the longitudinal direction of the magnetic head 28 (for example, are disposed at equal intervals along the longitudinal direction of the magnetic head 28). In the example shown in FIG. 6, the plurality of data read/write elements DRW are provided at positions corresponding to the data band DB2.

The control device 30 acquires a servo pattern signal which is a result obtained by reading the servo pattern 52 by the servo reading element SR, and performs a tracking control (also referred to as "servo control") in response to the acquired servo pattern signal. Here, the tracking control refers to a control (that is, a control of adjusting the position of the magnetic head 28 such that the on-track occurs) of positioning the magnetic head 28 to a designated portion by moving the magnetic head 28 in the width direction WD of the magnetic tape MT via the moving mechanism 48 in accordance with the servo pattern 52 read by the servo reading element SR.

By performing the tracking control, the plurality of data read/write elements DRW are positioned on a designated region in the data band DB, and perform the magnetic processing on the designated region in the data band DB in this state. In the example shown in FIG. 6, the plurality of data read/write elements DRW perform the magnetic processing on the designated region in the data band DB2.

In addition, in a case in which the data band DB of which the data is to be read by the magnetic element unit 42 is changed (in the example shown in FIG. 6, the data band DB of which the data is to be read by the magnetic element unit 42 is changed from the data band DB2 to the data band DB1), the moving mechanism 48 moves, under the control of the control device 30, the magnetic head 28 in the width direction WD to change the position of the pair of servo reading elements SR. That is, by moving the magnetic head 28 in the width direction WD, the moving mechanism 48 moves the servo reading element SR1 to a position corresponding to the servo band SB1 and moves the servo reading element SR2 to the position corresponding to the servo band SB2. As a result, the positions of the plurality of data read/write elements DRW are changed from the data band DB2 to the data band DB1, and the plurality of data read/write elements DRW perform the magnetic processing on the data band DB1.

Figure 7:
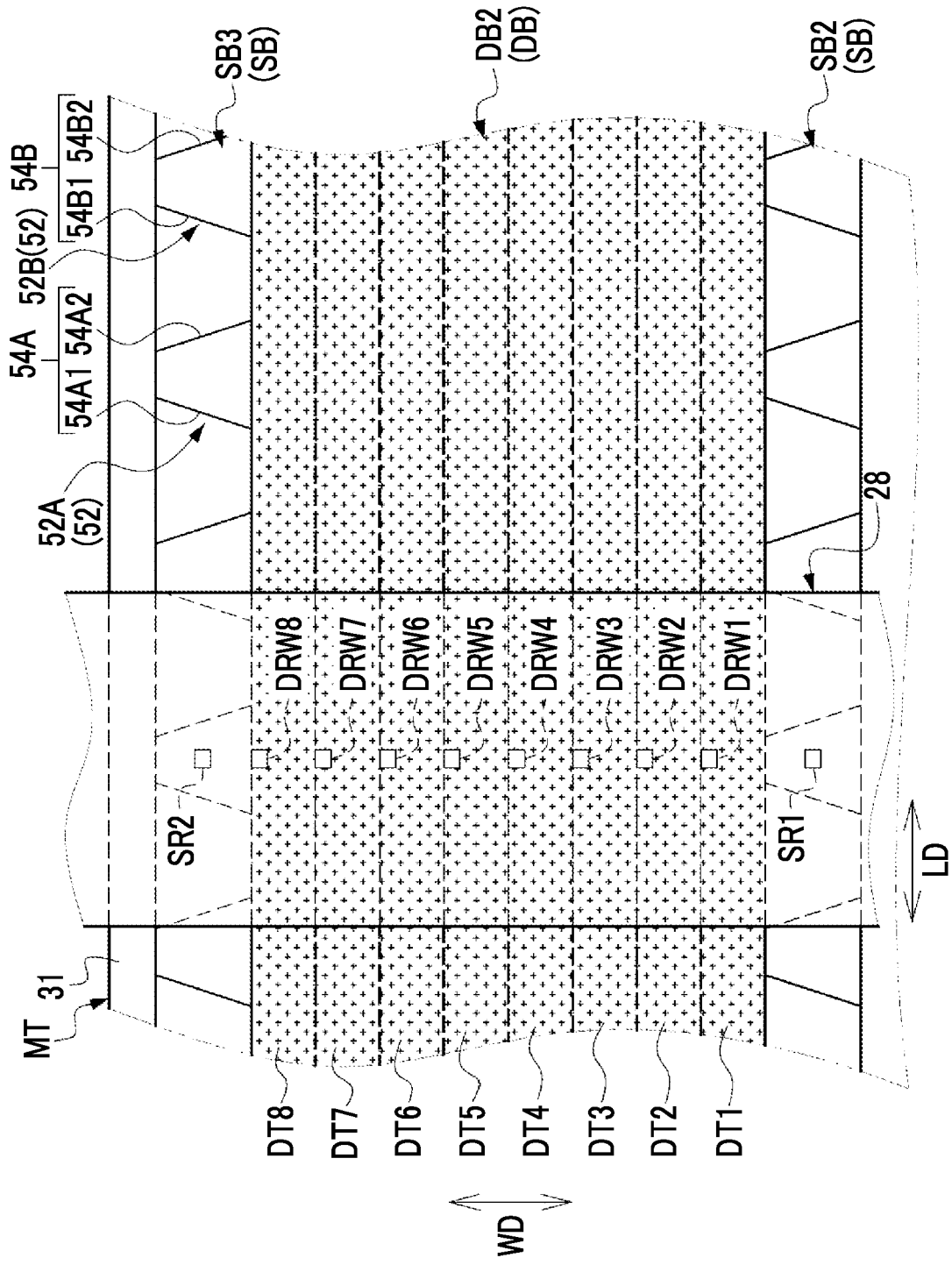
FIG. 7 is a conceptual diagram showing an example of a configuration of a data band formed on a front surface of the magnetic tape.

As an example, as shown in FIG. 7, in the data band DB2, as a plurality of division areas obtained by dividing the data band DB2 in the width direction WD, data tracks DT1, DT2, DT3, DT4, DT5, DT6, DT7, and DT8 are formed from the servo band SB2 side to the servo band SB3 side.

The magnetic head 28 includes, as the plurality of data read/write elements DRW, data read/write elements DRW1, DRW2, DRW3, DRW4, DRW5, DRW6, DRW7, and DRW8 between the servo reading element SR1 and the servo reading element SR2 along the width direction WD. The data read/write elements DRW1 to DRW8 have a one-to-one correspondence with the data tracks DT1 to DT8, and can read (that is, reproduce) data from the data tracks DT1 to DT8 and record (that is, write) the data in the data tracks DT1 to DT8.

In addition, although not shown, a plurality of data tracks DT corresponding to the data tracks DT1, DT2, DT3, DT4, DT5, DT6, DT7, and DT8 are formed in the data band DB1 (see FIG. 6).

It should be noted that, in the following, in a case in which the distinction is not specifically needed, the data tracks DT1, DT2, DT3, DT4, DT5, DT6, DT7, and DT8 are referred to as a "data track DT".

In addition, in the following, in a case in which the distinction is not specifically needed, the data read/write elements DRW1, DRW2, DRW3, DRW4, DRW5, DRW6, DRW7, and DRW8 are referred to as the "data read/write element DRW".

Figure 8:
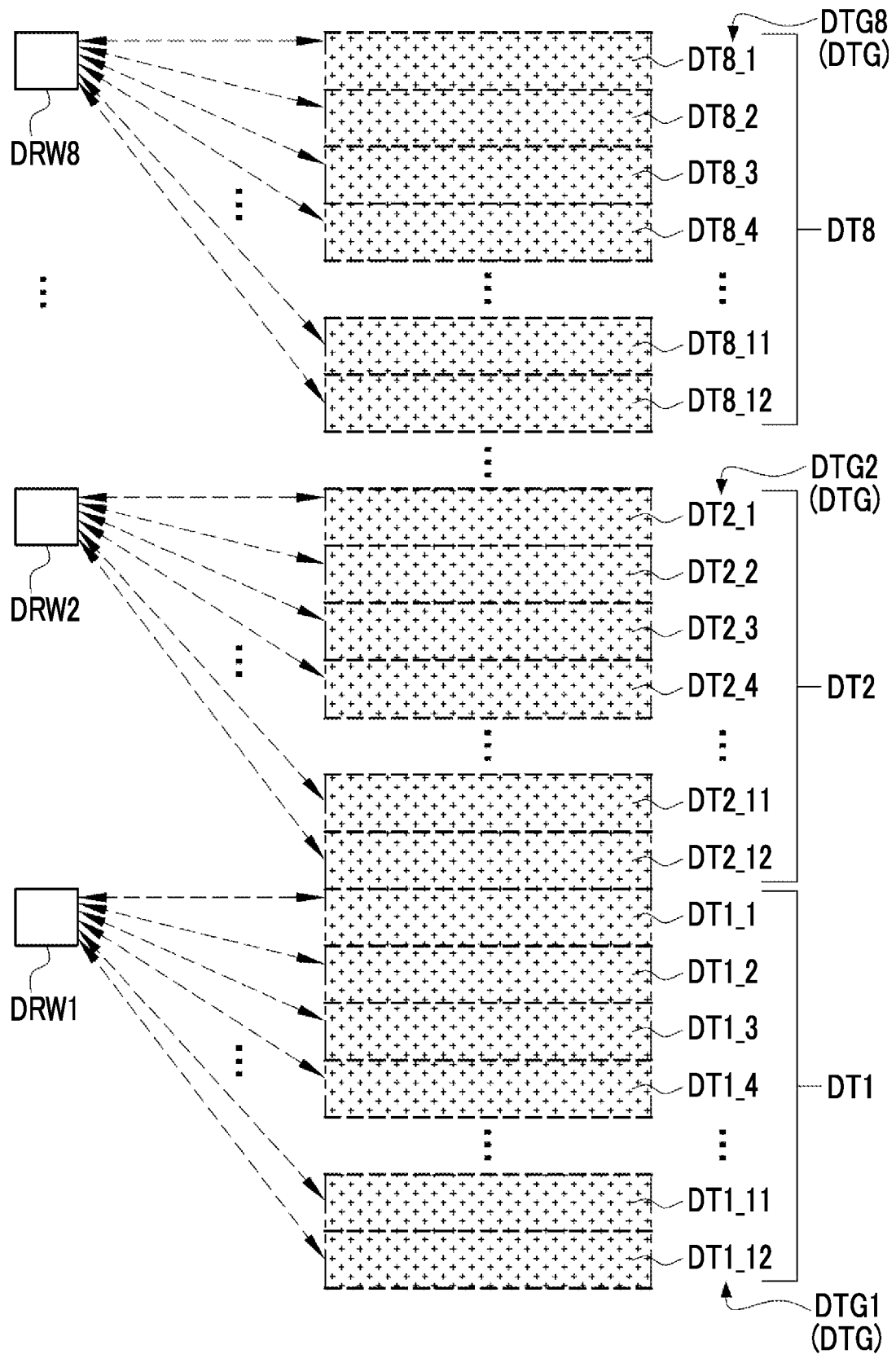
FIG. 8 is a conceptual diagram showing an example of a correspondence relationship between a data read/write element and a data track.

As shown in FIG. 8 as an example, the data track DT includes a division data track group DTG. The data tracks DT1 to DT8 correspond to the division data track groups DTG1 to DTG8. In the following, in a case in which the distinction is not specifically needed, the division data track groups DTG1 to DTG8 are referred to as the "division data track group DTG".

The division data track group DTG1 is a set of a plurality of division data tracks obtained by dividing the data track DT in the width direction WD. In the example shown in FIG. 8, as an example of the division data track group DTG1, the division data tracks DT1_1, DT1_2, DT1_3, DT1_4, ..., DT1_11, and DT1_12 obtained by dividing the data track DT into 12 equal parts in the width direction WD are shown. The data read/write element DRW1 is responsible for the magnetic processing of the division data track group DTG1. That is, the data read/write element DRW1 is responsible for recording the data in the division data tracks DT1_1, DT1_2, DT1_3, DT1_4, ..., DT1_11, and DT1_12, and reading the data from the division data tracks DT1_1, DT1_2, DT1_3, DT1_4, ..., DT1_11, and DT1_12.

Each of the data read/write elements DRW2 to DRW8 is also responsible for the magnetic processing of the division data track group DTG of the data track DT corresponding to each data read/write element DRW, similarly to the data read/write element DRW1.

The data read/write element DRW is moved to a position corresponding to one designated data track DT among the plurality of data tracks DT with the movement of the magnetic head 28 by the moving mechanism 48 (see FIG. 6) in the width direction WD. The data read/write element DRW is fixed at a position corresponding to one designated data track DT by the tracking control using the servo pattern 52 (see FIGS. 6 and 7).

By the way, in recent years, research on a technology of reducing the influence of transverse dimensional stability (TDS) has been advanced. It has been known that the TDS is affected by a temperature, humidity, a pressure at which the magnetic tape is wound around the reel, temporal deterioration, or the like, the TDS is increased in a case in which no measures are taken, and off-track (that is, misregistration of the data read/write element DRW with respect to the track in the data band DB) occurs in a scene in which the magnetic processing is performed on the data band DB.

Figure 9:
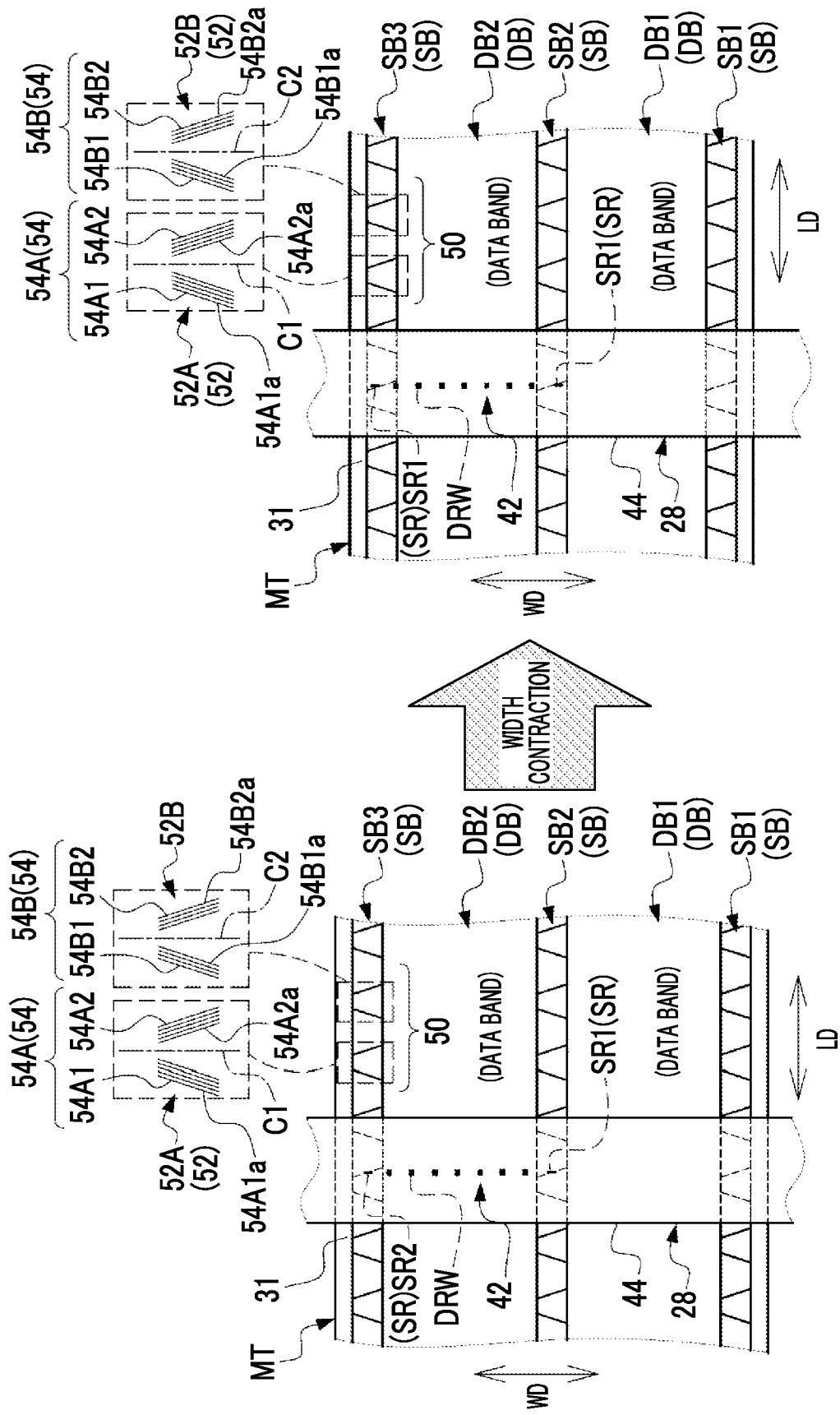
FIG. 9 is a conceptual diagram showing an example of an aspect in which the magnetic tape before and after a width of the magnetic tape contracts is observed from a front surface side of the magnetic tape.

In the example shown in FIG. 9, an aspect is shown in which the width of the magnetic tape MT contracts with the elapse of time. In this case, the off-track occurs. The off-track refers to a state in which the data read/write element DRW is not positioned on the designated division data track among the division data tracks DT1_1, DT1_2, DT1_3, DT1_4, ..., DT1_11, and DT1_12 (that is, a state in which the position of the designated division data track and the position of the data read/write element DRW deviate from each other in the width direction WD) included in the division data track group DTG.

In some cases, the width of the magnetic tape MT expands, and the off-track occurs in this case as well. That is, in a case in which the width of the magnetic tape MT contracts or expands with the elapse of time, the position of the servo reading element SR with respect to the servo pattern 52 diverges from a predetermined position (that is, a predetermined position determined in design with respect to each of the linear magnetization regions 54A1, 54A2, 54B1, and 54B2) determined in design in the width direction WD. In a case in which the position of the servo reading element SR with respect to the servo pattern 52 diverges from the predetermined position determined in design in the width direction WD, the accuracy of the tracking control is deteriorated, and the position of the track (for example, the designated division data track among the division data tracks DT1_1, DT1_2, DT1_3, DT1_4, ..., DT1_11, and DT1_12) in the data band DB and the position of the data read/write element DRW deviate from each other. Then, an originally planned track will not be subjected to the magnetic processing.

Figure 10:
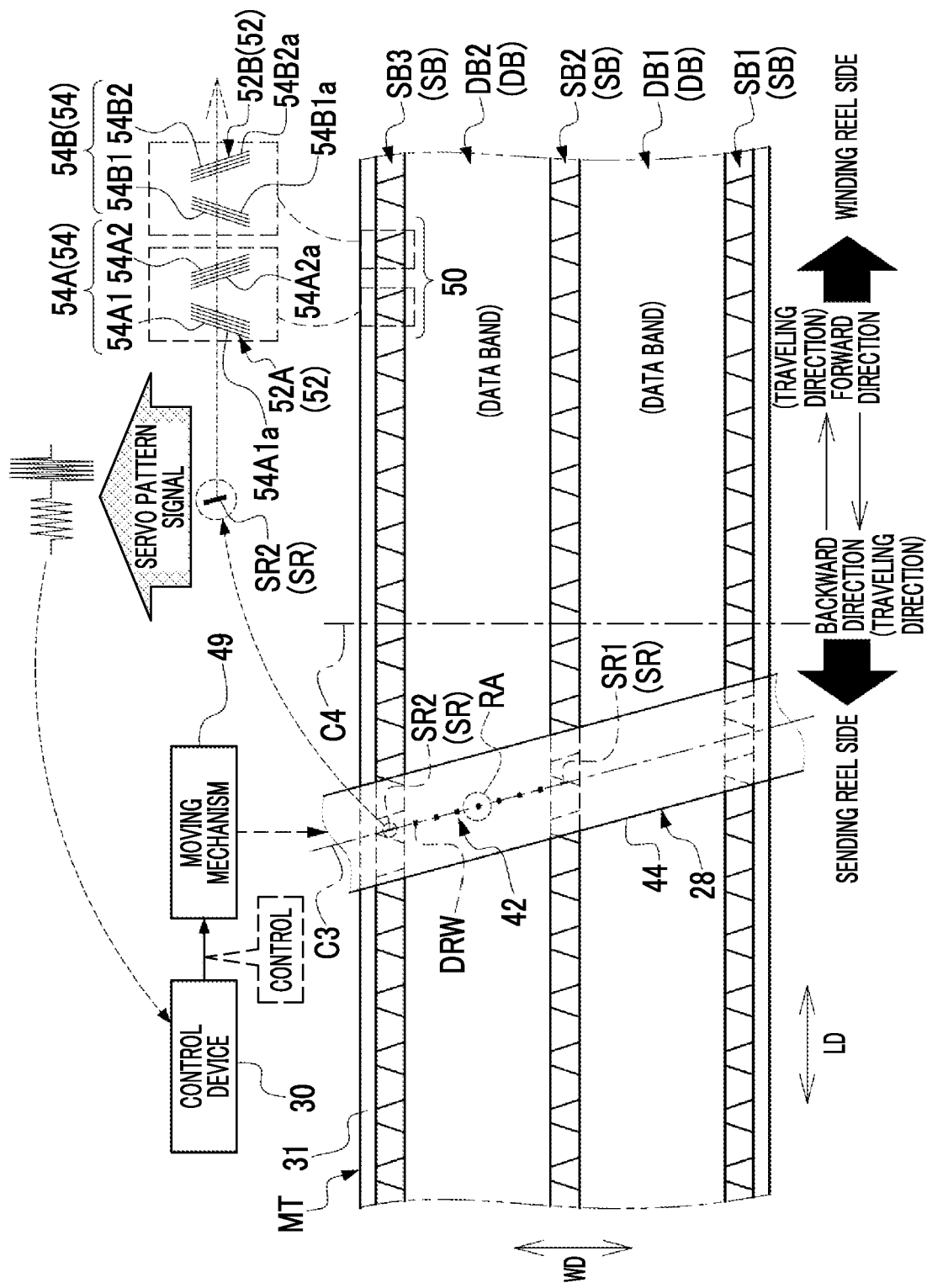
FIG. 10 is a conceptual diagram showing an example of an aspect in which a state in which the magnetic head is skewed on the magnetic tape is observed from the front surface side of the magnetic tape.

As a method of reducing the influence of the TDS, a method of adjusting the width of the magnetic tape MT by adjusting the tension applied to the magnetic tape MT is considered. However, in a case in which an amount of deformation of the magnetic tape MT in the width direction WD is too large, the off-track may not be eliminated even in a case in which the tension applied to the magnetic tape MT is adjusted. In addition, in a case in which the tension applied to the magnetic tape MT is increased, the load applied to the magnetic tape MT is also increased, which may lead to shortening the life of the magnetic tape MT. Further, in a case in which the tension applied to the magnetic tape MT is too weak, the contact state between the magnetic head 28 and the magnetic tape MT is unstable, and it is difficult for the magnetic head 28 to perform the magnetic processing on the magnetic tape MT. As a method of reducing the influence of the TDS other than the method of adjusting the tension applied to the magnetic tape MT, as shown in FIG. 10 as an example, a method of holding the position of the servo reading element SR with respect to the servo pattern 52 at the predetermined position determined in design by skewing the magnetic head 28 on the magnetic tape MT is known.

The magnetic head 28 comprises a rotation axis RA. The rotation axis RA is provided at a position corresponding to a center portion of the magnetic element unit 42 provided in the magnetic head 28 in a plan view. The magnetic head 28 is rotatably held by the inclination mechanism 49 via the rotation axis RA. It should be noted that, in the present embodiment, the operation of inclining the magnetic head 28 with respect to the width direction WD by rotating the magnetic head 28 on the front surface 31 with the rotation axis RA as a central axis along the front surface 31 is referred to as "skew".

An imaginary straight line C3 which is an imaginary center line is provided in the magnetic head 28. The imaginary straight line C3 is a straight line that passes through the rotation axis RA and extends in the longitudinal direction of the magnetic head 28 in a plan view (that is, the direction in which the plurality of data read/write elements DRW are arranged). The magnetic head 28 is disposed in an inclined posture with respect to the width direction WD along the front surface 31 (in other words, a posture in which the imaginary straight line C3 is inclined with respect to the imaginary straight line C4 along the front surface 31). In the example shown in FIG. 10, the magnetic head 28 is held by the inclination mechanism 49 to have a posture in which the imaginary straight line C3 is inclined to the longitudinal direction LD side of the magnetic tape MT with respect to an imaginary straight line C4 which is an imaginary straight line along the width direction WD. In the example shown in FIG. 10, the magnetic head 28 is held by the inclination mechanism 49 in a posture in which the imaginary straight line C3 is inclined toward the sending reel 22 side with respect to the imaginary straight line C4 (that is, a posture inclined counterclockwise as viewed from a paper surface side of FIG. 10). An angle formed by the imaginary straight line C3 and the imaginary straight line C4 corresponds to an angle at which the magnetic head 28 is inclined with respect to the width direction WD by rotating the magnetic head 28 on the front surface 31 with the rotation axis RA as a central axis along the front surface 31. It should be noted that, in the following, the angle formed by the imaginary straight line C3 and the imaginary straight line C4 is also referred to as a "skew angle" or a "skew angle of the magnetic head 28". The skew angle is an angle defined such that the counterclockwise direction as viewed from the paper surface side of FIG. 10 is positive, and the clockwise direction as viewed from the paper surface side of FIG. 10 is negative.

The inclination mechanism 49 receives the power from the inclination actuator 49A (see FIG. 5) to rotate the magnetic head 28 around the rotation axis RA on the front surface 31 of the magnetic tape MT. The inclination mechanism 49 rotates, under the control of the control device 30, the magnetic head 28 around the rotation axis RA on the front surface 31 of the magnetic tape MT to change the direction of the inclination of the imaginary straight line C3 with respect to the imaginary straight line C4 (that is, azimuth) and the inclined angle. The change the direction of the inclination and the inclined angle of the imaginary straight line C3 with respect to the imaginary straight line C4 is realized by changing an angle at which the magnetic head 28 is inclined with respect to the width direction WD along the front surface 31, that is, the skew angle of the magnetic head 28. In the present embodiment, the direction of the inclination and the inclined angle of the imaginary straight line C3 with respect to the imaginary straight line C4 are represented by the skew angle of the magnetic head 28.

By changing the direction of the inclination of the imaginary straight line C3 with respect to the imaginary straight line C4 and the inclined angle, that is, the skew angle in accordance with the temperature, the humidity, the pressure at which the magnetic tape MT is wound around the reel, the temporal deterioration, and the like, or expansion and contraction of the magnetic tape MT in the width direction WD due to these, the position of the servo reading element SR with respect to the servo pattern 52 is held at the predetermined position determined in design. In this case, the on-track occurs. The on-track refers to a state in which the data read/write element DRW is positioned on the designated division data track among the division data tracks DT1_1, DT1_2, DT1_3, DT1_4, ..., DT1_11, and DT1_12 (that is, a state in which the position of the designated division data track and the position of the data read/write element DRW match in the width direction WD) included in the division data track group DTG.

The servo reading element SR reads the servo pattern 52 and outputs the servo pattern signal indicating a reading result. The servo reading element SR is formed in a straight line along the imaginary straight line C3. Therefore, in a case in which the servo pattern 52A is read by the servo reading element SR, in the linear magnetization region pair 54A, an angle formed by the linear magnetization region 54A1 and the servo reading element SR and an angle formed by the linear magnetization region 54A2 and the servo reading element SR are different. In a case in which the angles are different in this way, a variation due to an azimuth loss (for example, variation in signal level and waveform distortion) occurs between the servo pattern signal derived from the linear magnetization region 54A1 (that is, the servo pattern signal obtained by reading the linear magnetization region 54A1 by the servo reading element SR) and the servo pattern signal derived from the linear magnetization region 54A2 (that is, the servo pattern signal obtained by reading the linear magnetization region 54A2 by the servo reading element SR).

In the example shown in FIG. 10, since the angle formed by the servo reading element SR and the linear magnetization region 54A1 is larger than the angle formed by the servo reading element SR and the linear magnetization region 54A2, the output of the servo pattern signal is small, and the waveform also spreads, so that the variation occurs in the servo pattern signal obtained by being read by the servo reading element SR across the servo band SB in a state in which the magnetic tape MT travels. In addition, also in a case in which the servo pattern 52B is read by the servo reading element SR, the variation due to the azimuth loss occurs between the servo pattern signal derived from the linear magnetization region 54B1 and the servo pattern signal derived from the linear magnetization region 54B2.

Details will be described below, but in the present embodiment, a method of detecting the servo pattern signal using an autocorrelation coefficient is used as a method of detecting the servo pattern signal in which the variation occurs due to the azimuth loss as described above (see FIG. 15).

Next, an example of contents of specific processing performed by the control device 30 will be described with reference to FIGS. 11 to 17.

Figure 11:
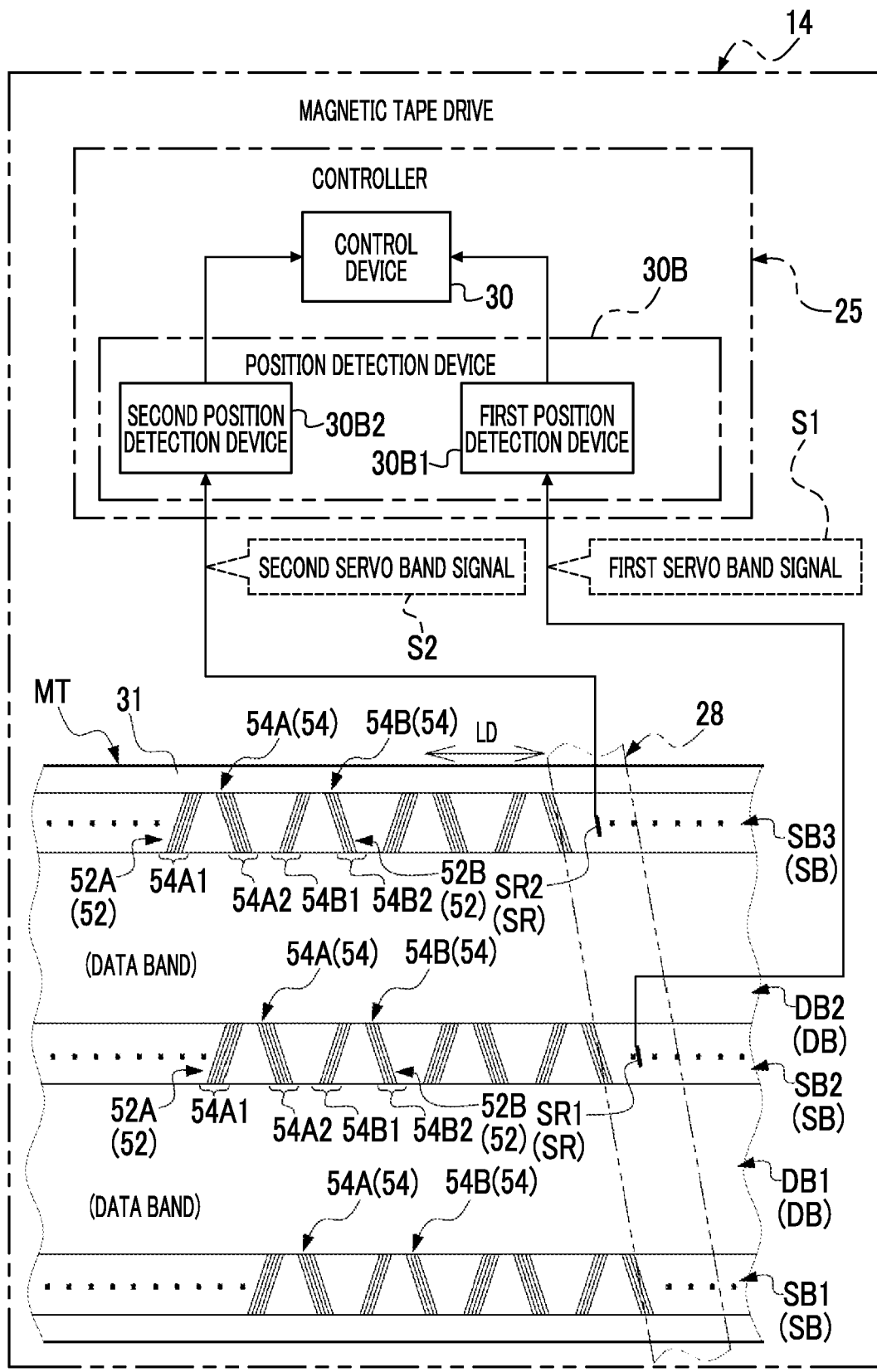
FIG. 11 is a conceptual diagram showing an example of a function of a controller provided in the magnetic tape drive according to the embodiment.

As shown in FIG. 11 as an example, the controller 25 comprises a position detection device 30B in addition to the control device 30. In the example shown in FIG. 11, the position detection device 30B is separated from the control device 30, but this is merely an example. The position detection device 30B may be integrated with the control device 30 by incorporating the position detection device 30B into the control device 30.

The position detection device 30B includes a first position detection device 30B1 and a second position detection device 30B2. The position detection device 30B acquires a servo band signal that is a result obtained by reading the servo band SB by the servo reading element SR, and detects the position of the magnetic head 28 on the magnetic tape MT based on the acquired servo band signal. The servo band signal includes a signal (for example, noise) unnecessary for the tracking control in addition to the servo pattern signal which is the result obtained by reading the servo pattern 52.

The position detection device 30B acquires the servo band signal from the magnetic head 28. The servo band signal is classified into a first servo band signal 51 and a second servo band signal S2. The first servo band signal 51 is a signal indicating the result obtained by reading the servo pattern 52 in the servo band SB by the servo reading element SR1. The second servo band signal S2 is a signal indicating the result obtained by reading the servo pattern 52 in the servo band SB by the servo reading element SR2.

The result obtained by reading the servo pattern 52 in the servo band SB by the servo reading element SR1 refers to, for example, a result obtained by reading the linear magnetization regions 54A1, 54A2, 54B1, and 54B2 included one servo pattern 52 by the servo reading element SR1. Five magnetization straight lines 54A1a are included in the linear magnetization region 54A1. In addition, five magnetization straight lines 54A2a are included in the linear magnetization region 54A2. In addition, four magnetization straight lines 54B1a are included in the linear magnetization region 54B1. In addition, four magnetization straight lines 54B2a are included in the linear magnetization region 54B2. Therefore, the result obtained by reading the servo pattern 52 by the servo reading element SR1 is obtained as a pulse signal group (hereinafter, also referred to as a "first pulse signal group") consisting of 18 pulse signals corresponding to the linear magnetization regions 54A1, 54A2, 54B1 and 54B2.

In the example shown in FIG. 11, the first pulse signal group is a set of time-series pulse signals corresponding to the linear magnetization regions 54A1, 54A2, 54B1 and 54B2 in the servo band SB2. In addition, in the present embodiment, the first pulse signal group is the first servo band signal S1.

Here, as the first pulse signal group, a set of time-series pulse signals corresponding to the linear magnetization regions 54A1, 54A2, 54B1 and 54B2 in the servo band SB2 has been described, but this is merely an example. For example, the first pulse signal group may be a set of time-series pulse signals corresponding to the linear magnetization regions 54A1 and 54A2 in the servo band SB2 or a set of time-series pulse signals corresponding to the linear magnetization regions 54B1 and 54B2 in the servo band SB2.

The result obtained by reading the servo pattern 52 in the servo band SB by the servo reading element SR2 refers to, for example, a result obtained by reading the linear magnetization regions 54A1, 54A2, 54B1, and 54B2 included one servo pattern 52 by the servo reading element SR2. Therefore, the result obtained by reading the servo pattern 52 by the servo reading element SR2 is obtained as a pulse signal group (hereinafter, also referred to as a "second pulse signal group") consisting of 18 pulse signals corresponding to the linear magnetization regions 54A1, 54A2, 54B1 and 54B2. In addition, in the present embodiment, the second pulse signal group is the second servo band signal S2.

In the example shown in FIG. 11, the second pulse signal group is a set of time-series pulse signals corresponding to the linear magnetization regions 54A1, 54A2, 54B1 and 54B2 in the servo band SB3. In addition, in the present embodiment, the second pulse signal group is the second servo band signal S2.

Here, as the second pulse signal group, a set of time-series pulse signals corresponding to the linear magnetization regions 54A1, 54A2, 54B1 and 54B2 in the servo band SB3 has been described, but this is merely an example. For example, the second pulse signal group may be a set of time-series pulse signals corresponding to the linear magnetization regions 54A1 and 54A2 in the servo band SB3 or a set of time-series pulse signals corresponding to the linear magnetization regions 54B1 and 54B2 in the servo band SB3.

It should be noted that, in the present embodiment, the result obtained by reading the servo pattern 52 in the servo band SB by the servo reading element SR1 is an example of a "first result" and a "first pulse signal group" according to the technology of the present disclosure. The first servo band signal S1 is an example of a "first signal" according to the technology of the present disclosure. The result obtained by reading the servo pattern 52 in the servo band SB by the servo reading element SR2 is an example of a "second result" and a "second pulse signal group" according to the technology of the present disclosure. The second servo band signal S2 is an example of a "second signal" according to the technology of the present disclosure.

The first position detection device 30B1 acquires the first servo band signal S1, and the second position detection device 30B2 acquires the second servo band signal S2. In the example shown in FIG. 11, the signal obtained by reading the servo band SB2 by the servo reading element SR1 is shown as an example of the first servo band signal S1, and the signal obtained by reading the servo band SB3 by the servo reading element SR2 is shown as an example of the second servo band signal S2. It should be noted that, in the present embodiment, for convenience of description, in a case in which the distinction is not specifically needed, the first servo band signal S1 and the second servo band signal S2 will be referred to as a "servo band signal" without reference numerals.

Figure 12:
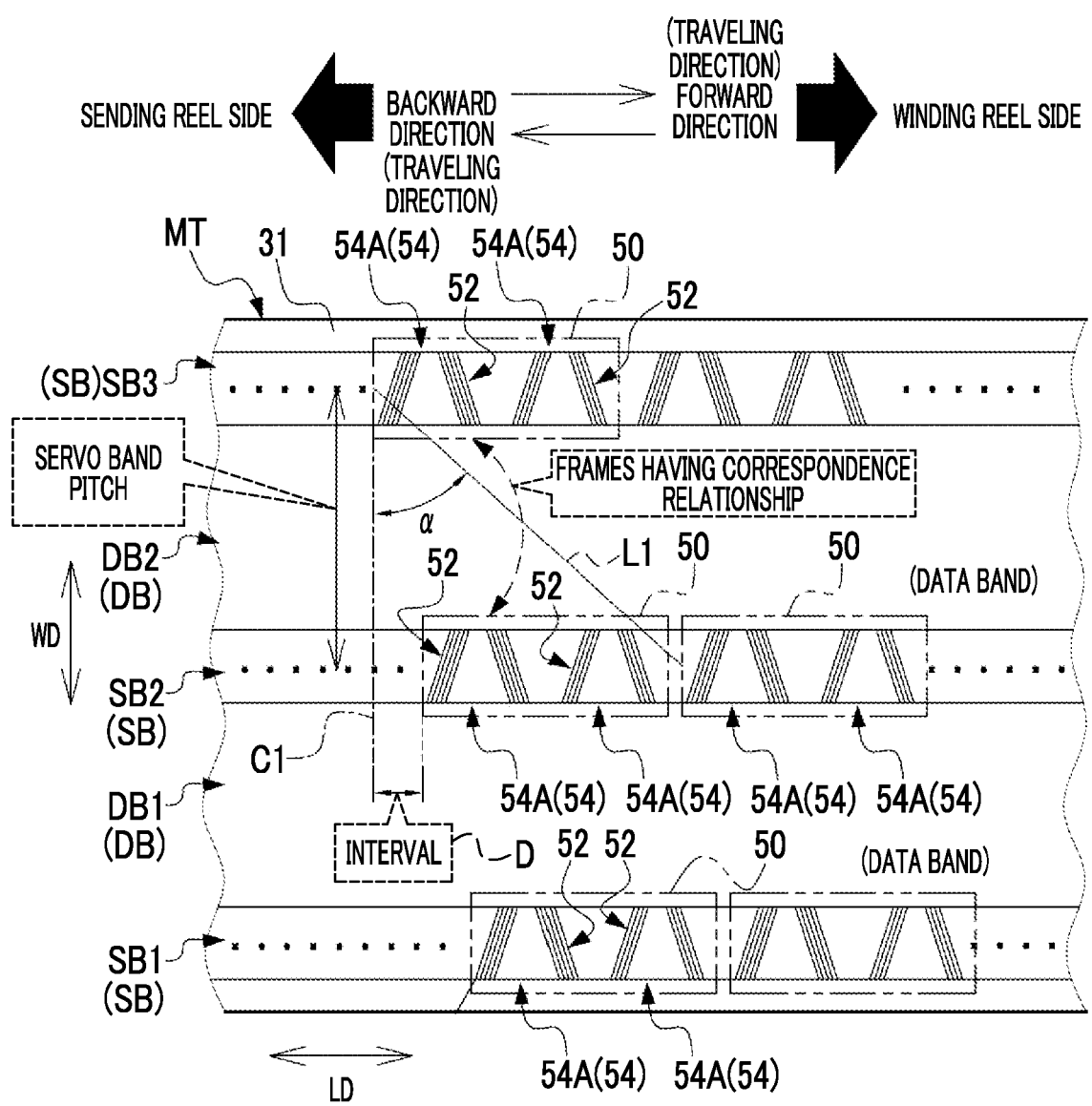
FIG. 12 is a conceptual diagram showing an example of an aspect in which a state in which frames corresponding to each other between the servo bands adjacent to each other in a width direction of the magnetic tape deviate from each other at a predetermined interval is observed from the front surface side of the magnetic tape.

As an example, as shown in FIG. 12, the plurality of servo bands SB are formed on the magnetic tape MT in the width direction WD, and the frames 50 having a correspondence relationship between the servo bands SB deviate from each other at intervals D in the longitudinal direction LD, between the servo bands SB adjacent to each other in the width direction WD of the magnetic tape MT. The above description means that the servo patterns 52 having a correspondence relationship between the servo bands SB deviate from each other at the intervals D in the longitudinal direction LD between the servo bands SB adjacent to each other in the width direction WD of the magnetic tape MT.

The interval D is defined based on an angle $\alpha$, a pitch between the servo bands SB adjacent to each other in the width direction WD (hereinafter, also referred to as a "servo band pitch"), and a frame length. In the example shown in FIG. 12, the angle $\alpha$ is exaggerated in order to make it easier to visually grasp the angle $\alpha$, but in reality, the angle $\alpha$ is, for example, about 15 degrees. The angle $\alpha$ is an angle formed by the frames 50 having no correspondence relationship between the servo bands SB adjacent to each other in the width direction WD and the imaginary straight line C1. In the example shown in FIG. 12, as an example of the angle α, an angle formed by an interval (in the example shown in FIG. 12, a line segment L1) between one frame 50 of a pair of frames 50 having a correspondence relationship between the servo bands SB adjacent to each other in the width direction WD (in the example shown in FIG. 12, one frame 50 of the servo band SB3) and the frame 50 adjacent to the other frame 50 of the pair of frames 50 (in the example shown in FIG. 12, the frame 50 having a correspondence relationship with one frame 50 of the servo band SB3 among a plurality of frames 50 in the servo band SB2), and the imaginary straight line C1 is shown. In this case, the frame length refers to the total length of the frame 50 with respect to the longitudinal direction LD of the magnetic tape MT. The interval D is defined by Expression (1). It should be noted that Mod (A/B) means a remainder generated in a case in which "A" is divided by "B".

(Interval $D$)=Mod {(Servo band pitch×tan α)/(Frame length)} (1)

It should be noted that, in the example shown in FIG. 12, the angle formed by the interval between one frame 50 of the pair of frames 50 having a correspondence relationship between the servo bands SB adjacent to each other in the width direction WD (hereinafter, also referred to as "first frame") and the frame 50 adjacent to the other frame 50 of the pair of frames 50 (hereinafter, also referred to as "second frame"), and the imaginary straight line C1 has been described as the angle α, but the technology of the present disclosure is not limited to this. For example, as the angle α, an angle formed by an interval between the first frame and the frame 50 away from the second frame by two or more frames (hereinafter, also referred to as "third frame") in the same servo band SB as the second frame, and the imaginary straight line C1 may be used. In this case, the "frame length" used in Expression (1) is the pitch between the second frame and the third frame in the longitudinal direction LD of the magnetic tape MT (for example, a distance from the distal end of the second frame to the distal end of the third frame).

Incidentally, in the magnetic tape drive 14, the tracking control and off-track suppression control (hereinafter, also referred to as "various controls") are performed. The off-track suppression control is a control of suppressing the occurrence of the off-track. Examples of the off-track suppression control include a tension control of controlling the tension applied to the magnetic tape MT and skew control of skewing the magnetic head 28. The off-track suppression control is an example of "specific processing" and "processing in accordance with a deviation amount obtained from the signal processing device" according to the technology of the present disclosure.

The off-track suppression control is a control performed based on the servo band pitch. The servo band pitch is calculated based on the first servo band signal S1 and the second servo band signal S2. Therefore, in a case in which the interval D of the frames 50 between the adjacent servo bands SB (that is, the interval between the corresponding servo patterns 52 in the longitudinal direction LD) varies, the calculation of the servo band pitch is also affected by at least the variation, and the accuracy of various controls is also decreased along with this.

The servo pattern 52 is recorded by a servo writer. Various servo writers are used for recording the servo pattern 52, and there is a manufacturing error and/or an attachment error between the servo writers. The manufacturing error and/or the attachment error between the servo writers appears as a physical deviation amount (hereinafter, also referred to as a "physical deviation amount") between the servo patterns 52 having a correspondence relationship in the adjacent servo band SB. That is, the physical deviation amount appears as a variation in the interval D.

In a case in which the physical deviation amount can be measured, it is possible to perform various controls in consideration of the physical deviation amount. As a method of measuring the physical deviation amount, a measuring method using a microscope can be considered. In this case, the measurement accuracy of the physical deviation amount depends on the accuracy (that is, the resolution) of the moving stage of the microscope. However, as the density of the magnetic tape MT is increased, the accuracy of the moving stage of the microscope should also be increased. For example, a level of 0.5 um to 1 um is required for the accuracy of the moving stage of the microscope. It is costly to prepare such a microscope, and it is also troublesome to perform the measurement using the microscope.

Figure 13:
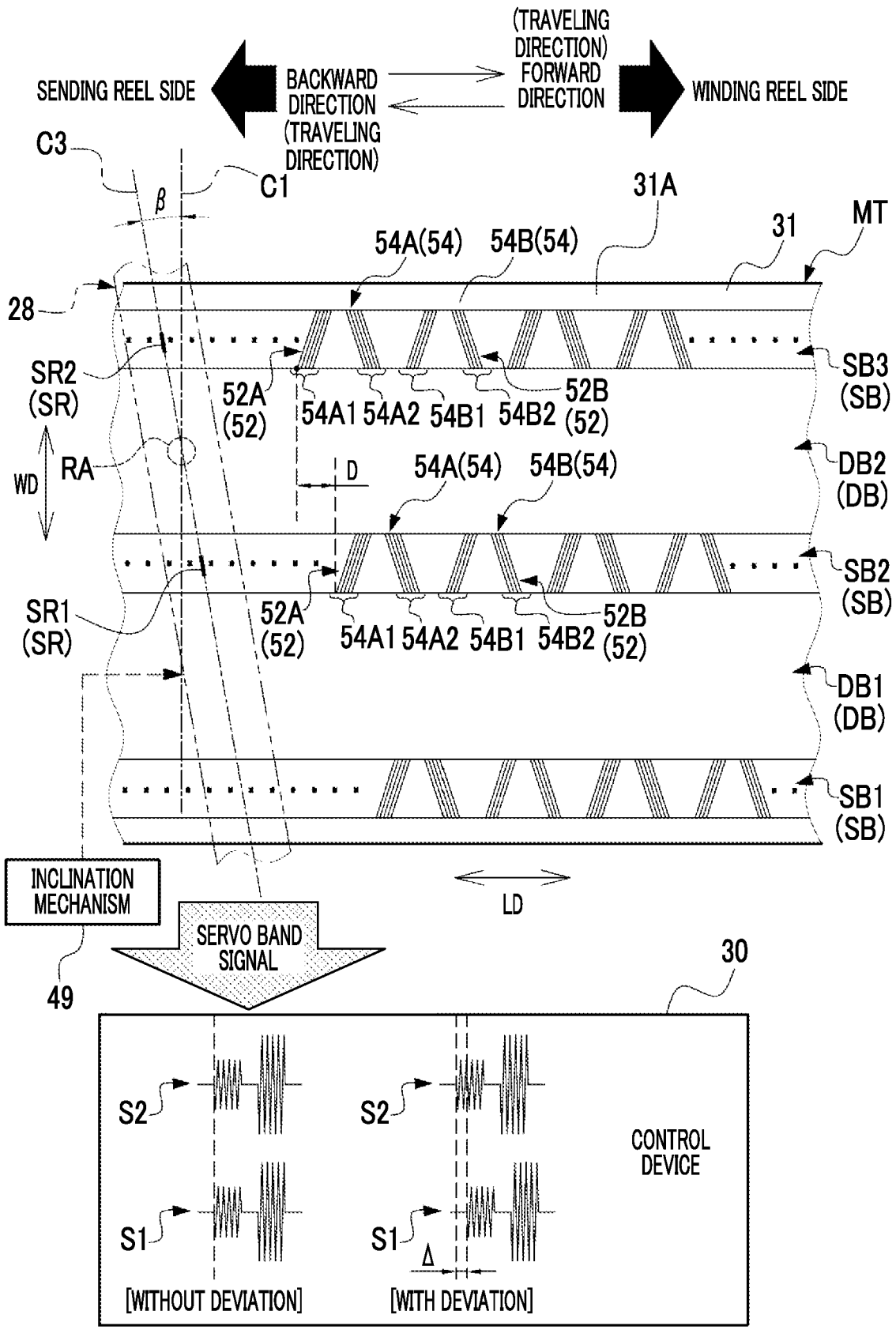
FIG. 13 is a conceptual diagram showing an example of an aspect of a first servo band signal and a second servo band signal output from the magnetic head.

Therefore, in view of such matters, in the magnetic tape system 10, as shown in FIG. 13 as an example, a deviation amount Δ in time between the first servo band signal 51 and the second servo band signal S2 is acquired by the control device 30. The deviation amount Δ is a physical quantity in which the physical deviation amount is expressed as a temporal deviation amount. That is, the deviation amount Δ corresponds to the deviation amount of the positions of the pair of servo patterns 52 between the frames 50 having a correspondence relationship between the servo band SB2 and the servo band SB3.

The deviation amount Δ is calculated from the first servo band signal 51 and the second servo band signal S2 obtained by the magnetic head 28 in a state of being skewed on the BOT region 31A of the magnetic tape MT. The example shown in FIG. 13 shows a state in which the magnetic head 28 is skewed on the BOT region 31A of the magnetic tape MT around the rotation axis RA such that the imaginary straight line C3 is inclined with respect to the imaginary straight line C1 to the upstream side in the forward direction at an angle β (that is, the angle β counterclockwise as viewed from the paper surface side of FIG. 13). The angle β is an angle corresponding to the interval D (see FIG. 12) and is determined in advance as the skew angle on the BOT region 31A. For example, the angle β is included in the management information 13 (see FIG. 2), and is acquired by the control device 30. The control device 30 operates the inclination mechanism 49 (see FIGS. 5 and 10) to skew the magnetic head 28 on the BOT region 31A such that the skew angle is the angle β. The above description means that the magnetic head 28 is skewed on the BOT region 31A by the deviation amount Δ. In a state in which the skew angle of the angle β is maintained, the control device 30 acquires the first servo band signal S1 from the servo reading element SR1, and acquires the second servo band signal S2 from the servo reading element SR2.

Here, the control device 30 determines that no physical deviation amount has occurred between the servo patterns 52 having a correspondence relationship in the adjacent servo band SB in a case in which the deviation amount Δ is "0", and the control device 30 determines that the physical deviation amount has occurred in a case in which the deviation amount Δ is a value other than "0". It should be noted that the determination result of whether or not the physical deviation amount has occurred may be stored in a storage device or the like of the storage 32, or may be displayed on a display. In addition, in the present embodiment, "0" refers to "0" in the sense of including an error generally allowed in the technical field to which the technology of the present disclosure belongs, which is the error to the extent that it does not contradict the purpose of the technology of the present disclosure, in addition to exact "0".

Figure 14:
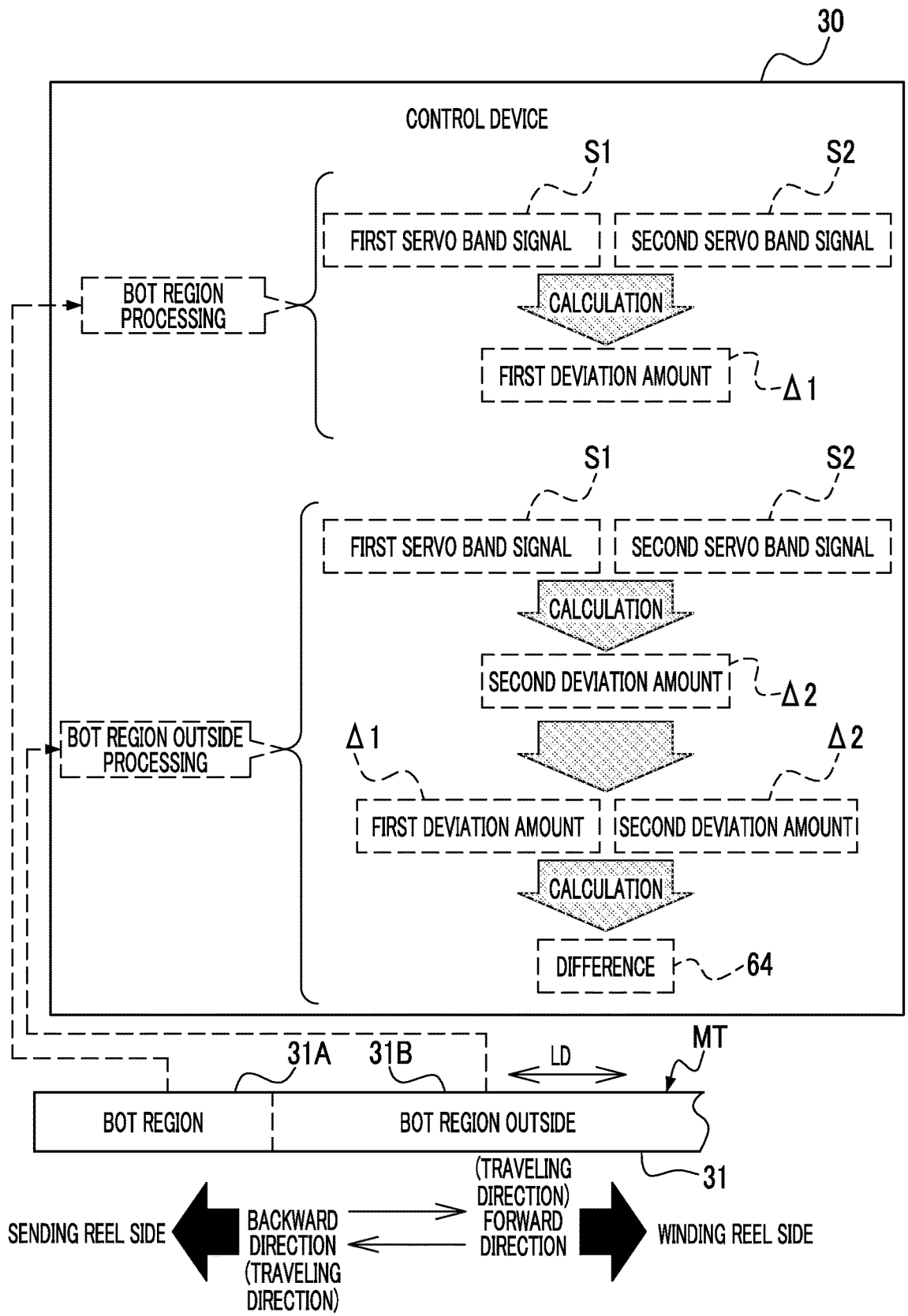
FIG. 14 is a conceptual diagram showing an example of BOT region processing and BOT region outside processing performed by a control device.

As shown in FIG. 14 as an example, the front surface 31 of the magnetic tape MT is roughly divided into the BOT region 31A and a BOT region outside 31B. The BOT region outside 31B refers to a region other than the BOT region 31A in the front surface 31. In the present embodiment, the BOT region 31A is an example of a "storage medium", a "BOT region", and a "partial region of the magnetic tape" according to the technology of the present disclosure.

The control device 30 performs BOT region processing and BOT region outside processing in a state in which the magnetic tape MT is made to travel in one direction (for example, in the forward direction) at a regular speed. The BOT region processing is processing performed in a state in which the magnetic head 28 is skewed at the angle β on the BOT region 31A. The BOT region outside processing is processing performed in a state in which the magnetic head 28 is skewed at the angle β on the BOT region outside 31B.

In the BOT region processing, the control device 30 acquires the first servo band signal S1 from the servo reading element SR1, and acquires the second servo band signal S2 from the servo reading element SR2. Moreover, the control device 30 acquires a first deviation amount Δ1 as the deviation amount Δ. The first deviation amount Δ1 is a deviation amount in time (for example, a time difference) between the first servo band signal S1 and the second servo band signal S2 acquired by the control device 30 in the BOT region processing.

In the BOT region outside processing, the control device 30 acquires the first servo band signal S1 from the servo reading element SR1, and acquires the second servo band signal S2 from the servo reading element SR2. Moreover, the control device 30 acquires a second deviation amount Δ2 as the deviation amount Δ. The second deviation amount Δ2 is a deviation amount in time (for example, a time difference) between the first servo band signal S1 and the second servo band signal S2 acquired by the control device 30 in the BOT region outside processing.

In the BOT region outside processing, the control device 30 calculates a difference 64 between the first deviation amount Δ1 and the second deviation amount Δ2. Examples of the difference 64 include a value obtained by subtracting the first deviation amount Δ1 from the second deviation amount Δ2. It should be noted that this is merely an example, and a value obtained by subtracting the second deviation amount Δ2 from the first deviation amount Δ1 may be adopted. In addition, a ratio of the first deviation amount Δ1 to the second deviation amount Δ2 or a ratio of the second deviation amount Δ2 to the first deviation amount Δ1 may be adopted. As described above, any value may be used as long as a degree of difference between the first deviation amount Δ1 and the second deviation amount Δ2 can be specified.

Figure 15:
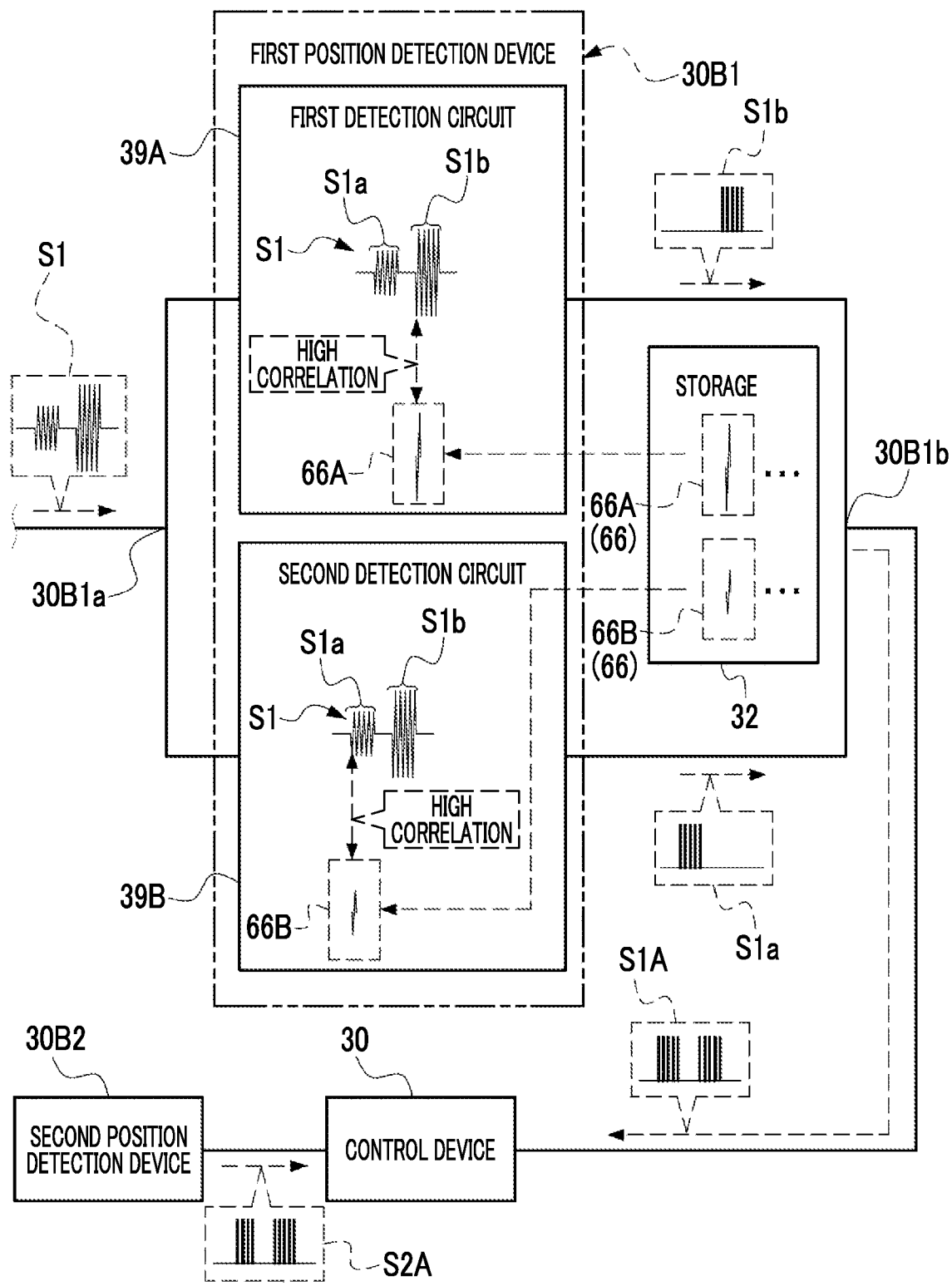
FIG. 15 is a conceptual diagram showing an example of processing contents of a position detection device provided in the controller provided in the magnetic tape drive.

As an example, as shown in FIG. 15, the first position detection device 30B1 includes a first detection circuit 39A and a second detection circuit 39B. The first detection circuit 39A and the second detection circuit 39B are connected in parallel and comprise an input terminal 30B1$a$ and an output terminal 30B1$b$ common to each other. In the example shown in FIG. 15, an aspect example is shown in which the first servo band signal S1 is input to the input terminal 30B1$a$. The first servo band signal S1 includes a first linear magnetization region signal S1$a$ and a second linear magnetization region signal S1$b$. The first linear magnetization region signal S1$a$ and the second linear magnetization region signal S1$b$ are the servo pattern signals (that is, analog servo pattern signals) indicating the results read by the servo reading element SR1 (see FIG. 11). The same applied to the second servo band signal S2 (see FIG. 11) as in the first servo band signal S1. That is, the servo pattern signal includes the first linear magnetization region signal S1$a$ and the second linear magnetization region signal S1$b$.

One ideal waveform signal 66 is stored in advance in the storage 32, for each frame 50. The ideal waveform signal 66 is, for example, individually associated with each of all the frames 50 from the beginning to the end of the magnetic tape MT. In a case in which the servo pattern 52 included in each frame 50 is read by the servo reading element SR from the beginning to the end of the magnetic tape MT, the first position detection device 30B1 acquires the ideal waveform signal 66 corresponding to each frame 50 from the storage 32 for each time the servo pattern 52 included in each frame 50 is read by the servo reading element SR (for example, in synchronization with a timing at which reading of the servo pattern 52 by the servo reading element SR is started), and uses the acquired ideal waveform signal 66 for the comparison with the first servo band signal S1.

The ideal waveform signal 66 is a signal indicating the ideal waveform of the servo pattern signal (that is, the analog servo pattern signal) indicating a result obtained by reading the servo pattern 52 (see FIG. 11) recorded in the servo band SB of the magnetic tape MT by the servo reading element SR. The ideal waveform signal 66 can be said to be a sample signal compared with the first servo band signal S1.

The ideal waveform signal 66 is classified into a first ideal waveform signal 66A and a second ideal waveform signal 66B. The first ideal waveform signal 66A corresponds to a signal derived from the linear magnetization region 54A2 or 54B2, that is, the second linear magnetization region signal S1$b$, and is a signal indicating the ideal waveform of the second linear magnetization region signal S1$b$. The second ideal waveform signal 66B corresponds to a signal derived from the linear magnetization region 54A1 or 54B1, that is, the first linear magnetization region signal S1$a$, and is a signal indicating the ideal waveform of the first linear magnetization region signal S1$a$.

More specifically, for example, the first ideal waveform signal 66A is a signal indicating a single ideal waveform (that is, for one wavelength) included in the second linear magnetization region signal S1$b$ (for example, an ideal signal which is a result obtained by reading one of an ideal magnetization straight lines included in the servo pattern 52 by the servo reading element SR). In addition, for example, the second ideal waveform signal 66B is a signal indicating a single ideal waveform (that is, one wavelength) included in the first linear magnetization region signal S1$a$ (for example, an ideal signal which is a result obtained by reading one of an ideal magnetization straight lines included in the servo pattern 52 by the servo reading element SR).

An ideal waveform indicated by a first ideal waveform signal 66A is a waveform determined in accordance with an orientation of the magnetic head 28 on the magnetic tape MT. A relative positional relationship between the holder 44 (see FIG. 10) of the magnetic head 28 and the servo reading element SR is fixed. Therefore, the ideal waveform indicated by the first ideal waveform signal 66A can be said to be a waveform determined in accordance with the orientation of the servo reading element SR on the magnetic tape MT. For example, the ideal waveform indicated by the first ideal waveform signal 66A is a waveform determined in accordance with a geometrical characteristic of the linear magnetization region 54A2 of the servo pattern 52A (for example, a geometrical characteristic of the magnetization straight line 54A2a) and the orientation of the magnetic head 28 on the magnetic tape MT.

As described above, since the relative positional relationship between the holder 44 (see FIG. 10) of the magnetic head 28 and the servo reading element SR is fixed, the ideal waveform indicated by the first ideal waveform signal 66A can be said to be a waveform determined in accordance with the geometrical characteristic of the linear magnetization region 54A2 of the servo pattern 52A (for example, geometrical characteristic of the magnetization straight line 54A2a) and the orientation of the servo reading element SR on the magnetic tape MT. Here, the orientation of the magnetic head 28 on the magnetic tape MT refers to, for example, an angle formed by the linear magnetization region 54A2 and the magnetic head 28 on the magnetic tape MT. In addition, the orientation of the servo reading element SR on the magnetic tape MT refers to, for example, an angle formed by the linear magnetization region 54A2 and the servo reading element SR on the magnetic tape MT.

It should be noted that the ideal waveform indicated by the first ideal waveform signal 66A may be determined by also adding the characteristics of the servo reading element SR itself (material, size, shape, and/or use history), the characteristics of the magnetic tape MT (material and/or use history), and/or the use environment of the magnetic head 28 in addition to the elements described above.

Similarly to the ideal waveform indicated by the first ideal waveform signal 66A, an ideal waveform indicated by a second ideal waveform signal 66B is also a waveform determined in accordance with the orientation of the magnetic head 28 on the magnetic tape MT, that is, a waveform determined in accordance with the orientation of the servo reading element SR on the magnetic tape MT. For example, the ideal waveform indicated by the second ideal waveform signal 66B is a waveform determined in accordance with the geometrical characteristic of the linear magnetization region 54A1 of the servo pattern 52A (for example, geometrical characteristic of the magnetization straight line 54A1a) and the orientation of the magnetic head 28 on the magnetic tape MT, that is, a waveform determined in accordance with the geometrical characteristic of the linear magnetization region 54A1 of the servo pattern 52A (for example, geometrical characteristic of the magnetization straight line 54A1a) and the orientation of the servo reading element SR on the magnetic tape MT. Here, the orientation of the magnetic head 28 on the magnetic tape MT refers to, for example, an angle formed by the linear magnetization region 54A1 and the magnetic head 28 on the magnetic tape MT. In addition, the orientation of the servo reading element SR on the magnetic tape MT refers to, for example, an angle formed by the linear magnetization region 54A1 and the servo reading element SR on the magnetic tape MT.

It should be noted that, similarly to the ideal waveform indicated by the first ideal waveform signal 66A the ideal waveform indicated by the second ideal waveform signal 66B may be determined by also adding the characteristics of the servo reading element SR itself (material, size, shape, and/or use history), the characteristics of the magnetic tape MT (material and/or use history), and/or the use environment of the magnetic head 28 in addition to the elements described above.

The first position detection device 30B1 acquires the first servo band signal 51 and compares the acquired first servo band signal 51 with the ideal waveform signal 66 to detect a servo pattern signal S1A. In the example shown in FIG. 12, the first position detection device 30B1 detects the servo pattern signal S1A by using the first detection circuit 39A and the second detection circuit 39B.

The first servo band signal S1 is input to the first detection circuit 39A via the input terminal 30B1a. The first detection circuit 39A detects the second linear magnetization region signal S1b from the input first servo band signal S1 by using an autocorrelation coefficient.

The autocorrelation coefficient used by the first detection circuit 39A is a coefficient indicating a degree of correlation between the first servo band signal S1 and the first ideal waveform signal 66A. The first detection circuit 39A acquires the first ideal waveform signal 66A from the storage 32 to compare the acquired first ideal waveform signal 66A with the first servo band signal S1. Moreover, the first detection circuit 39A calculates the autocorrelation coefficient based on the comparison result. The first detection circuit 39A detects a position at which the correlation between the first servo band signal S1 and the first ideal waveform signal 66A is high (for example, position at which the first servo band signal S1 and the first ideal waveform signal 66A match) on the servo band SB (for example, servo band SB2 shown in FIG. 9) in accordance with the autocorrelation coefficient.

On the other hand, the first servo band signal S1 is also input to the second detection circuit 39B via the input terminal 30B1a. The second detection circuit 39B detects the first linear magnetization region signal S1a from the input first servo band signal S1 by using the autocorrelation coefficient.

The autocorrelation coefficient used by the second detection circuit 39B is a coefficient indicating a degree of correlation between the first servo band signal S1 and the second ideal waveform signal 66B. The second detection circuit 39B acquires the second ideal waveform signal 66B from the storage 32 to compare the acquired second ideal waveform signal 66B with the first servo band signal S1. Moreover, the second detection circuit 39B calculates the autocorrelation coefficient based on the comparison result. The second detection circuit 39B detects a position at which the correlation between the first servo band signal S1 and the second ideal waveform signal 66B is high (for example, position at which the first servo band signal S1 and the second ideal waveform signal 66B match) on the servo band SB (for example, servo band SB2 shown in FIG. 9) in accordance with the autocorrelation coefficient.

The first position detection device 30B1 detects the servo pattern signal S1A based on a detection result by the first detection circuit 39A and a detection result by the second detection circuit 39B. The first position detection device 30B1 outputs the servo pattern signal S1A from the output terminal 30B1b to the control device 30. The servo pattern signal S1A is a signal indicating a logical sum of the second linear magnetization region signal S1b detected by the first detection circuit 39A and the first linear magnetization region signal S1a detected by the second detection circuit 39B (for example, digital signal).

The position of the servo reading element SR with respect to the servo band SB is detected based on, for example, an interval between the servo patterns 52A and 52B in the longitudinal direction LD. For example, the interval between the servo patterns 52A and 52B in the longitudinal direction LD is detected in accordance with the autocorrelation coefficient. In a case in which the servo reading element SR is positioned on the upper side of the servo pattern 52 (that is, the upper side in the front view of the paper in FIG. 11), an interval between the linear magnetization region 54A1 and the linear magnetization region 54A2 is narrowed, and an interval between the linear magnetization region 54B1 and the linear magnetization region 54B2 is also narrowed. On the other hand, in a case in which the servo reading element SR is positioned on the lower side of the servo pattern 52 (that is, the lower side in the front view of the paper in FIG. 11), the interval between the linear magnetization region 54A1 and the linear magnetization region 54A2 is widened, and the interval between the linear magnetization region 54B1 and the linear magnetization region 54B2 is also widened. As described above, the first position detection device 30B1 detects the position of the servo reading element SR with respect to the servo band SB by using the interval between the linear magnetization region 54A1 and the linear magnetization region 54A2 and the interval between the linear magnetization region 54B1 and the linear magnetization region 54B2 detected in accordance with the autocorrelation coefficient.

In the example shown in FIG. 15, the form example has been described in which the first position detection device 30B1 detects the servo pattern signal S1A by comparing the first servo band signal S1 with the ideal waveform signal 66, similarly, the second position detection device 30B2 also detects the servo pattern signal S2A by comparing the second servo band signal S2 with the ideal waveform signal 66, and outputs the detected servo pattern signal S2A to the control device 30.

It should be noted that, in the present embodiment, the form example has been described in which the first linear magnetization region signal S1$a$ and the second linear magnetization region signal S1$b$ are detected by using the autocorrelation coefficient, but the technology of the present disclosure is not limited to this, and the first linear magnetization region signal S1$a$ and the second linear magnetization region signal S1$b$ may be detected by using a plurality of threshold values. Examples of the plurality of threshold values include a first threshold value and a second threshold value. A magnitude relationship between the first threshold value and the second threshold value is "first threshold value>second threshold value". The first threshold value is a value derived in advance based on an amplitude expected as the amplitude of the waveform of the second linear magnetization region signal S1$b$, and is used to detect the second linear magnetization region signal S1$b$. The second threshold value is a value derived in advance based on an amplitude expected as the amplitude of the waveform of the first linear magnetization region signal S1$a$ and the amplitude expected as the amplitude of the waveform of the second linear magnetization region signal S1$b$. The first threshold value and the second threshold value are used to detect the first linear magnetization region signal S1$a$.

Figure 16:
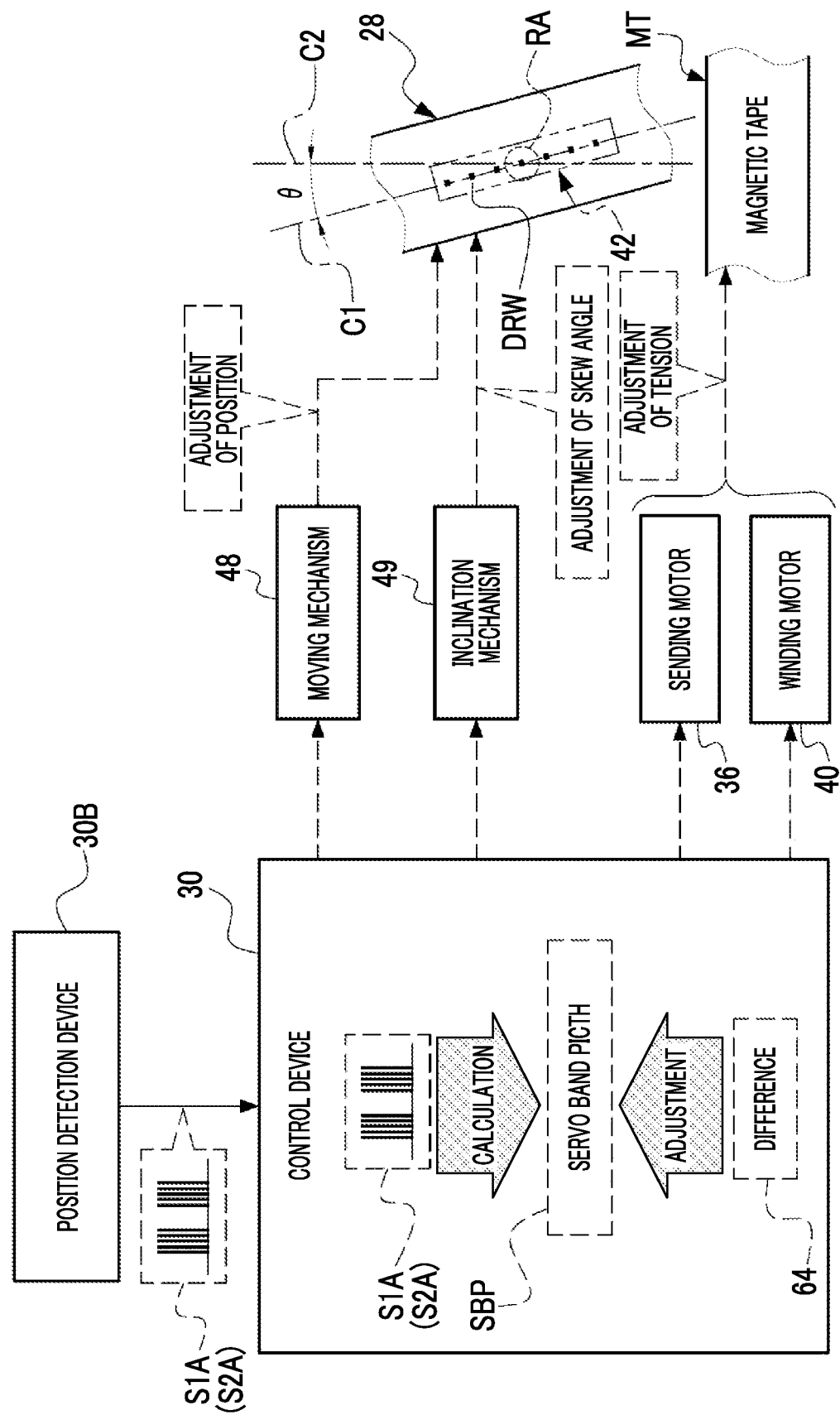
FIG. 16 is a conceptual diagram showing an example of processing contents of the control device provided in the controller provided in the magnetic tape drive.

As shown in FIG. 16 as an example, the control device 30 performs various controls based on the result of the position detection by the position detection device 30B (that is, the servo pattern signals S1A and S2A). For example, the control device 30 performs the tracking control based on the result of the position detection by the position detection device 30B. The control device 30 adjusts the position of the magnetic head 28 by operating the moving mechanism 48 based on the result of the position detection by the position detection device 30B.

In addition, the control device 30 performs the off-track suppression control as the control of reducing the influence of the TDS. The control device 30 calculates a servo band pitch SBP from the servo pattern signals S1A and S2A in order to perform the off-track suppression control.

Here, the control device 30 adjusts the calculated servo band pitch SBP based on the difference 64. That is, in a case in which the physical deviation amount has occurred, the servo band pitch SBP is also deviated by the physical deviation amount, so that the servo band pitch SBP is adjusted based on the difference 64 corresponding to the physical deviation amount.

Examples of the method of adjusting the servo band pitch SBP include a method of adjusting the servo band pitch SBP by using an arithmetic expression in which the servo band pitch SBP before the adjustment and the difference 64 are used as independent variables and the servo band pitch SBP after the adjustment (that is, the servo band pitch SBP in which the deviation corresponding to the physical deviation amount is eliminated) is used as a dependent variable. In addition, other examples of the method include a method of adjusting the servo band pitch SBP by using a table in which the servo band pitch SBP before the adjustment and the difference 64 are used as input and the servo band pitch SBP after the adjustment is used as output.

The control device 30 performs the tension control or the skew control based on the first deviation amount $\Delta 1$ and the second deviation amount $\Delta 2$. For example, the control device 30 performs the tension control or the skew control in accordance with the servo band pitch SBP adjusted by using the difference 64 obtained from the first deviation amount $\Delta 1$ and the second deviation amount $\Delta 2$.

The tension control is realized by operating the sending motor 36 and the winding motor 40 such that the rotation speed, the rotation torque, and the like of each of the sending motor 36 and the winding motor 40 are the rotation speed, the rotation torque, and the like uniquely determined from the servo band pitch SBP adjusted by using the difference 64. The skew control is realized by operating the inclination mechanism 49 such that an angle formed by the imaginary straight line C1 and the imaginary straight line C2 is an angle $\theta$ uniquely determined from the servo band pitch SBP adjusted by using the difference 64.

Next, an action of the magnetic tape system 10 will be described with reference to FIG. 17.

Figure 17:
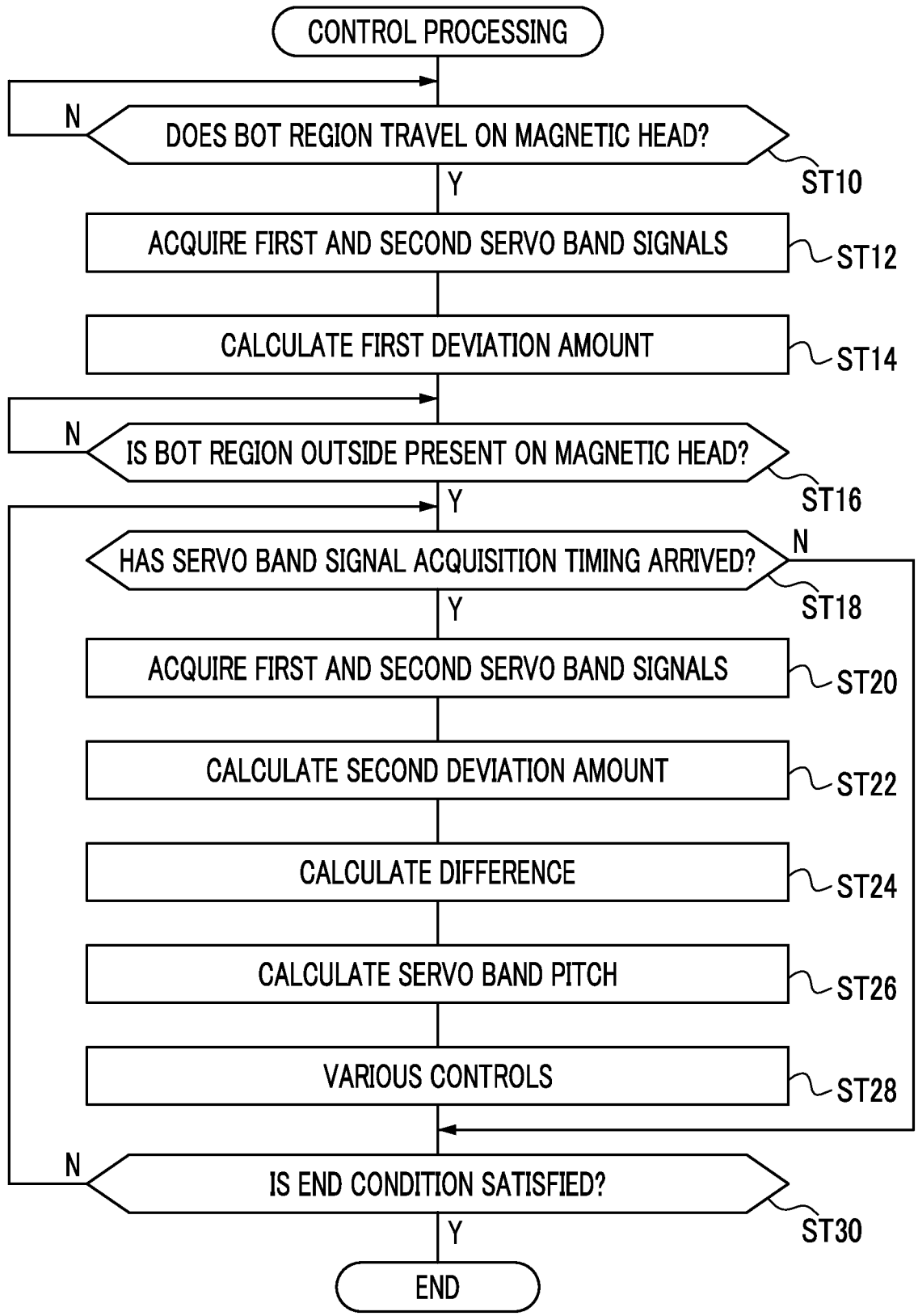
FIG. 17 is a flowchart showing an example of a flow of control processing.

FIG. 17 shows an example of a flow of the control processing executed by the control device 30 in a case in which the magnetic tape MT is made to travel in the forward direction from the BOT region 31A to an EOT region (not shown). The control processing is an example of "signal processing" according to the technology of the present disclosure. The control processing includes the BOT region processing and the BOT region outside processing. It should be noted that the flow of the flowchart shown in FIG. 17 is an example of a "signal processing method" according to the technology of the present disclosure.

In step ST10 shown in FIG. 17, the control device 30 determines whether or not the BOT region 31A travels on the magnetic head 28. In step ST10, in a case in which the BOT region 31A does not travel on the magnetic head 28, a negative determination is made, and the determination in step ST10 is made again. In step ST10, in a case in which the BOT region 31A travels on the magnetic head 28, a positive determination is made, and the control processing proceeds to step ST12.

In step ST12, the control device 30 acquires the first servo band signal 51 from the servo reading element SR1, and acquires the second servo band signal S2 from the servo reading element SR2. After executing the processing of step ST12, the control processing proceeds to step ST14.

In step ST14, the control device 30 calculates the first deviation amount Δ1 from the first servo band signal S1 and the second servo band signal S2 acquired in step ST12. After executing the processing of step ST14, the control processing proceeds to step ST16.

In step ST16, the control device 30 determines whether or not the BOT region outside 31B is present on the magnetic head 28. In step ST16, in a case in which the BOT region outside 31B is not present on the magnetic head 28, a negative determination is made, and the determination in step ST16 is made again. In step ST16, in a case in which the BOT region outside 31B is present on the magnetic head 28, a positive determination is made, and the control processing proceeds to step ST18.

In step ST18, the control device 30 determines whether or not a timing for acquiring the servo band signal (hereinafter, referred to as a "servo band signal acquisition timing") has arrived. A first example of the servo band signal acquisition timing is a timing at which the beginning of the frame 50 has reached on the magnetic element unit 42. As a second example of the servo band signal acquisition timing is a timing at which the beginning of the frame 50 has reached on the magnetic element unit 42 after a predetermined number of frames 50 (for example, a predetermined number within a range of tens to tens of millions) pass over the magnetic element unit 42. A third example of the servo band signal acquisition timing is a timing at which a certain time (for example, a time determined within a range of several milliseconds to several minutes) has elapsed since the processing of step ST18 is started.

In step ST18, in a case in which the servo band signal acquisition timing has not arrived, a negative determination is made, and the control processing proceeds to step ST30. In step ST18, in a case in which the servo band signal acquisition timing has arrived, a positive determination is made, and the control processing proceeds to step ST20.

In step ST20, the control device 30 acquires the first servo band signal S1 from the servo reading element SR1, and acquires the second servo band signal S2 from the servo reading element SR2. After executing the processing of step ST20, the control processing proceeds to step ST22.

In step ST22, the control device 30 calculates the second deviation amount Δ2 from the first servo band signal S1 and the second servo band signal S2 acquired in step ST20. After executing the processing of step ST22, the control processing proceeds to step ST24.

In step ST24, the control device 30 calculates the difference 64 from the first deviation amount Δ1 calculated in step ST14 and the second deviation amount Δ2 acquired in step ST22. After executing the processing of step ST24, the control processing proceeds to step ST26.

In step ST26, the control device 30 generates the servo pattern signals S1A and S2A based on the first servo band signal S1 and the second servo band signal S2 acquired in step ST20. Moreover, the control device 30 calculates the servo band pitch SBP from the generated servo pattern signals S1A and S2A. After executing the processing of step ST26, the control processing proceeds to step ST28.

In step ST28, the control device 30 performs the tracking control based on the servo pattern signals S1A and S2A used in the calculation of the servo band pitch SBP in the processing of step ST26. In addition, the control device 30 adjusts the servo band pitch SBP calculated in step ST26 by using the difference 64 calculated in step ST 24, and performs the tension control and the skew control based on the adjusted servo band pitch SBP. After executing the processing of step ST28, the control processing proceeds to step ST30.

In step ST30, the control device 30 determines whether or not a condition for ending the control processing (hereinafter, referred to as an "end condition") is satisfied. A first example of the end condition is a condition that a command to end the control processing is received by the UI system device 34. A second example of the end condition is a condition that the number of frames 50 passing over the magnetic element unit 42 has reached a predetermined number (for example, a number determined within a range of several to tens of thousands). A third example of the end condition is a condition that a predetermined time (for example, a time designated in advance) has elapsed since the execution of the control processing is started.

In step ST30, in a case in which the end condition is not satisfied, a negative determination is made, and the control processing proceeds to step ST18. In step ST30, in a case in which the end condition is satisfied, a positive determination is made, and the control processing ends.

It should be noted that, here, the form example has been described in which the first deviation amount Δ1 is calculated on the BOT region 31A (see step ST12 and step ST14), but this is merely an example. For example, in a case in which the first deviation amount Δ1 has already been stored in the storage medium, such as the cartridge memory 24 and/or the BOT region 31A, processing of "reading the first deviation amount Δ1 from the storage medium" may be applied instead of the processing of step ST12 and step ST14.

As described above, in the magnetic tape system 10, the magnetic head 28 of the magnetic tape drive 14 is provided with the servo reading elements SR1 and SR2. The servo reading element SR1 corresponds to the servo band SB2, and the servo reading element SR2 corresponds to the servo band SB3. The servo reading element SR1 outputs the first servo band signal S1 by reading the servo pattern 52 from the servo band SB2, and the servo reading element SR2 outputs the second servo band signal S2 by reading the servo pattern 52 from the servo band SB3.

The various controls performed by the control device 30 are controls based on the first servo band signal S1 and the second servo band signal S2. Therefore, in a case in which the interval D between the frames 50 between the adjacent servo bands SB varies, the accuracy of various controls is also decreased by at least the variation. Examples of the cause of the variation in the interval D include the manufacturing error and/or the attachment error between the servo writers. The manufacturing error and/or the attachment error between the servo writers appears as the physical deviation amount. The physical deviation amount appears as the variation in the interval D. In a case in which the physical deviation amount is measured by using the microscope, various controls can be performed in consideration of the physical deviation amount. However, the measurement accuracy of the physical deviation amount depends on the accuracy of the moving stage of the microscope. An expensive microscope is required to improve the accuracy of the moving stage of the microscope.

In the magnetic tape system 10, the first deviation amount Δ1 and the second deviation amount Δ2 are calculated by the control device 30. Each of the first deviation amount Δ1 and the second deviation amount Δ2 is the deviation amount in time between the first servo band signal S1 and the second servo band signal S2, and corresponds to the physical deviation amount. Therefore, it is possible to easily specify the deviation amount (that is, the variation of the interval D) between the servo patterns 52 having a correspondence relationship between the servo bands SB adjacent to each other in the width direction WD of the magnetic tape MT. For example, as compared with a case in which the measurement using the microscope is performed, it is possible to more easily specify the deviation amount between the servo patterns 52 having a correspondence relationship between the servo bands SB adjacent to each other in the width direction WD of the magnetic tape MT.

In addition, in the magnetic tape system 10, the first servo band signal S1 is obtained by reading the servo pattern 52 in the servo band SB2 by the servo reading element SR1 while the servo reading element SR1 is positioned on the BOT region 31A. In addition, the second servo band signal S2 is obtained by reading the servo pattern 52 in the servo band SB3 by the servo reading element SR2 while the servo reading element SR2 is positioned on the BOT region 31A. Moreover, the first deviation amount Δ1, which is the deviation amount in time between the first servo band signal S1 and the second servo band signal S2, is calculated. The first deviation amount Δ1 is the deviation amount in time between the first servo band signal S1 and the second servo band signal S2, and corresponds to the physical deviation amount. Therefore, it is possible to easily specify the deviation amount (that is, the variation of the interval D) between the servo patterns 52 having a correspondence relationship between the servo bands SB adjacent to each other in the width direction WD in the BOT region 31A of the magnetic tape MT. For example, as compared with a case in which the measurement using the microscope is performed, it is possible to easily specify the deviation amount (that is, the variation of the interval D) between the servo patterns 52 having a correspondence relationship between the servo bands SB adjacent to each other in the width direction WD in the BOT region 31A of the magnetic tape MT.

In addition, in the magnetic tape system 10, the off-track suppression control is performed in accordance with the first deviation amount Δ1 and the second deviation amount Δ2. That is, the off-track suppression control (that is, the tension control and the skew control) is performed in accordance with the servo band pitch SBP adjusted by using the difference 64 obtained from the first deviation amount Δ1 and the second deviation amount Δ2. Therefore, the occurrence of the off-track can be suppressed as compared with a case in which the off-track suppression control is performed in accordance with the servo band pitch SBP before the adjustment.

It should be noted that, in the embodiment described above, the form example has been described in which the servo band pitch SBP is adjusted by the difference 64, but the servo pattern signals S1A and S2A may be adjusted by the difference 64. In this case, it is not needed to adjust the servo band pitch SBP by the difference 64. In addition, it is possible to improve the accuracy of the tracking control performed by using the servo pattern signals S1A and S2A as compared with a case in which the tracking control is performed by using the servo pattern signals S1A and S2A before the adjustment. It should be noted that the tracking control in this case is an example of "specific processing" according to the technology of the present disclosure.

In addition, in the embodiment described above, the form example has been described in which the off-track suppression control is performed by using the difference 64 between the first deviation amount Δ1 and the second deviation amount Δ2 in the BOT region outside processing, but the technology of the present disclosure is not limited to this.

For example, the off-track suppression control in accordance with the first deviation amount Δ1 (that is, the control in which the off-track is eliminated in the BOT region 31A) may be performed in the BOT region processing, and the off-track suppression control in accordance with the second deviation amount Δ2 (that is, the control in which the off-track is eliminated in the BOT region outside 31B) may be performed in the BOT region outside processing. The off-track suppression control in accordance with the first deviation amount Δ1 refers to, for example, a control of applying the tension uniquely determined from the first deviation amount Δ1 to the magnetic tape MT and/or a control of obtaining the skew angle uniquely determined from the first deviation amount Δ1. In addition, the off-track suppression control in accordance with the second deviation amount Δ2 refers to, for example, a control of applying the tension uniquely determined from the second deviation amount Δ2 to the magnetic tape MT and/or a control of obtaining the skew angle uniquely determined from the second deviation amount Δ2.

First Modification Example

Figure 18:
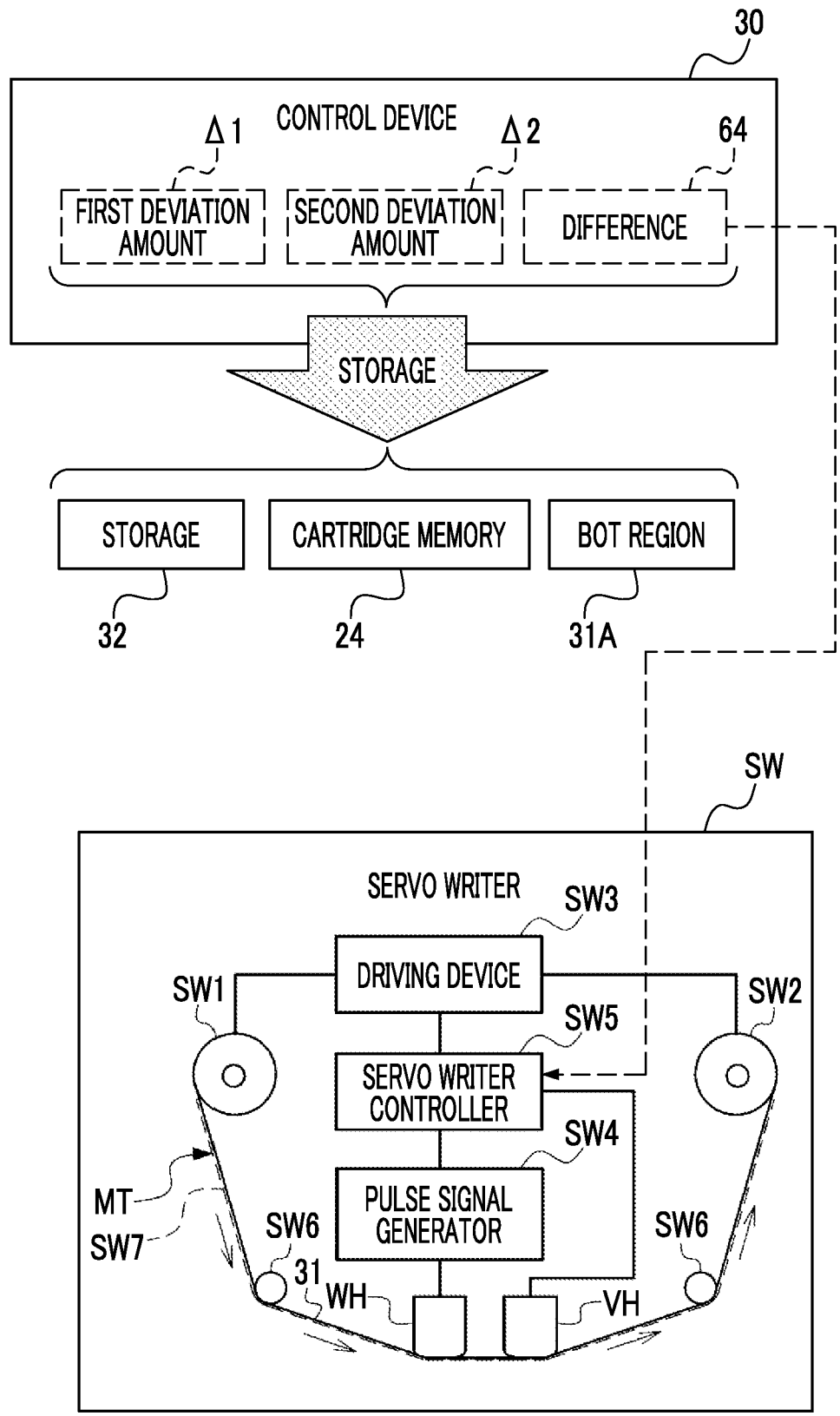
FIG. 18 is a conceptual diagram showing an example of processing contents by the control device provided in the magnetic tape system according to a first modification example.

In the embodiment described above, the form example has been described in which the off-track suppression control is performed based on the difference 64 obtained from the first deviation amount Δ1 and the second deviation amount Δ2, but the technology of the present disclosure is not limited to this. For example, as shown in FIG. 18, at least the first deviation amount Δ1 of the first deviation amount Δ1, the second deviation amount Δ2, or the difference 64 may be stored as the signal in the storage medium, such as the storage 32, the cartridge memory 24, and/or the BOT region 31A, by the control device 30. In this case, by referring to the signal stored in the storage medium, it is possible to estimate the deviation amount between the servo patterns 52 having a correspondence relationship between the servo bands SB adjacent to each other in the width direction WD of the magnetic tape MT.

In addition, at least the first deviation amount Δ1 of the first deviation amount Δ1, the second deviation amount Δ2, or the difference 64 may be output to the display and/or the speaker or the like. In this case, the user or the like can be made to perceive the deviation amount between the servo patterns 52 having a correspondence relationship between the servo bands SB adjacent to each other in the width direction WD of the magnetic tape MT.

In addition, the technology of the present disclosure can also be applied in a case in which the servo writer SW records the servo pattern 52 in the servo band SB of the magnetic tape MT. In the example shown in FIG. 18, the servo writer SW comprises a sending reel SW1, a winding reel SW2, a driving device SW3, a pulse signal generator SW4, a servo writer controller SW5, a plurality of guides SW6, a transport passage SW7, a servo pattern recording head WH, and a verification head VH. The servo writer controller SW5 incorporates a device corresponding to the controller 25 described above.

In a servo pattern recording step, the servo writer SW is used. The servo writer SW comprises a sending reel SW1, a winding reel SW2, a driving device SW3, a pulse signal generator SW4, a servo writer controller SW5, a plurality of guides SW6, a transport passage SW7, a servo pattern recording head WH, and a verification head VH. The servo writer controller SW5 incorporates a device corresponding to the controller 25 (see FIG. 3) described above.

The servo writer controller SW5 controls the entirety of the servo writer SW. In the present embodiment, although the servo writer controller SW5 is realized by an ASIC, the technology of the present disclosure is not limited to this. For example, the servo writer controller SW5 may be realized by an FPGA and/or a PLC. In addition, the servo writer controller SW5 may be realized by the computer including a CPU, a flash memory (for example, an EEPROM and/or an SSD), and a RAM. In addition, the control device 30 may be realized by combining two or more of an ASIC, an FPGA, a PLC, and a computer. That is, the servo writer controller SW5 may be realized by a combination of a hardware configuration and a software configuration.

A pancake is set in the sending reel SW1. The pancake refers to a large-diameter roll in which the magnetic tape MT cut into a product width from a wide web raw material before writing the servo pattern 52 is wound around a hub.

The driving device SW3 has a motor (not shown) and a gear (not shown), and is mechanically connected to the sending reel SW1 and the winding reel SW2. In a case in which the magnetic tape MT is wound by the winding reel SW2, the driving device SW3 generates power in accordance with the command from the servo writer controller SW5, and transmits the generated power to the sending reel SW1 and the winding reel SW2 to rotate the sending reel SW1 and the winding reel SW2. That is, the sending reel SW1 receives the power from the driving device SW3 and is rotated to send the magnetic tape MT to the predetermined transport passage SW7. The winding reel SW2 receives the power from the driving device SW3 and is rotated to wind the magnetic tape MT sent from the sending reel SW1. The rotation speed, the rotation torque, and the like of the sending reel SW1 and the winding reel SW2 are adjusted in accordance with a speed at which the magnetic tape MT is wound around the winding reel SW2. It should be noted that the rotation speed, rotation torque, and the like of the sending reel SW1 and the winding reel SW2 may be adjusted in the same manner as in the tension control in the embodiment described above.

The plurality of guides SW6 and the servo pattern recording head WH are disposed on the transport passage SW7. The servo pattern recording head WH is disposed on the front surface 31 side of the magnetic tape MT between the plurality of guides SW6. The magnetic tape MT sent from the sending reel SW1 to the transport passage SW7 is guided by the plurality of guides SW6 and is wound by the winding reel SW2 via the servo pattern recording head WH.

In the servo pattern recording step, the pulse signal generator SW4 generates the pulse signal under the control of the servo writer controller SW5, and supplies the generated pulse signal to the servo pattern recording head WH. In a state in which the magnetic tape MT travels on the transport passage SW7 at the regular speed, the servo pattern recording head WH records the servo pattern 52 in the servo band SB in response to the pulse signal supplied from the pulse signal generator SW4. As a result, for example, the plurality of servo patterns 52 are recorded in the servo band SB of the magnetic tape MT over the total length of the magnetic tape MT (see FIGS. 6 to 9).

It should be noted that a generation timing of the pulse signal by the pulse signal generator SW4 may be adjusted by using the first deviation amount $\Delta 1$ and the second deviation amount $\Delta 2$. For example, in a period in which the servo pattern 52 is recorded in the BOT region 31A, the generation timing of the pulse signal is adjusted by using the first deviation amount $\Delta 1$. In addition, for example, in a period in which the servo pattern 52 is recorded in the BOT region outside 31B, the generation timing of the pulse signal is adjusted by using the second deviation amount $\Delta 2$. As a result, it is possible to suppress the variation of the interval D determined by recording the servo pattern 52 in the servo band SB between the servo writer SW, as compared with a case in which the generation timing of the pulse signal is not adjusted.

In addition, here, the form example has been described in which the adjustment of the generation timing of the pulse signal by the first deviation amount $\Delta 1$ and the second deviation amount $\Delta 2$ is performed in real time, this is merely an example. For example, the generation timing of the pulse signal can be adjusted by using the first deviation amount $\Delta 1$ measured in advance with the magnetic tape MT in which the servo pattern 52 is recorded by the servo writer SW, and then the deviation amount $\Delta$ (see FIG. 13) in the magnetic tape MT subjected to the processing by the servo writer SW can be adjusted to be zero.

The manufacturing process of the magnetic tape MT includes a plurality of steps in addition to the servo pattern recording step. The plurality of steps include the inspection step and the winding step.

For example, the inspection step is a step of inspecting the servo band SB formed on the front surface 31 of the magnetic tape MT by the servo pattern recording head WH. The inspection of the servo band SB refers to, for example, processing of determining the correctness of the servo pattern 52 recorded in the servo band SB. The determination of the correctness of the servo pattern 52 refers to, for example, the determination (that is, verification of the servo pattern 52) whether or not the servo patterns 52A and 52B are recorded in a predetermined portion of the front surface 31 without excess or deficiency of the magnetization straight lines 54A1a, 54A2a, 54B1a, and 54B2a and within an allowable error.

The inspection step is performed by using the servo writer controller SW5 and the verification head VH. The verification head VH is disposed on the downstream side of the servo pattern recording head WH in a transport direction of the magnetic tape MT. In addition, the verification head VH includes a plurality of servo reading elements (not shown) similarly to the magnetic head 28, and the plurality of servo bands SB are read by the plurality of servo reading elements. It should be noted that, in this case, the tracking control and the tension control may be performed in the manner as described in the embodiment.

The verification head VH is connected to the servo writer controller SW5. The verification head VH is disposed at a position facing the servo band SB as viewed from the front surface 31 side of the magnetic tape MT (that is, the rear surface side of the verification head VH), and reads the servo pattern 52 recorded in the servo band SB, and outputs a reading result (hereinafter, referred to as "servo pattern reading result") to the servo writer controller SW5. The servo writer controller SW5 inspects the servo band SB (for example, determines the correctness of the servo pattern 52) based on the servo pattern reading result (for example, the servo pattern signal) input from the verification head VH. For example, since the servo writer controller SW5 incorporates the device corresponding to the controller 25 (see FIG. 3) described above, the servo writer controller SW5 acquires the position detection result from the servo pattern reading result, and inspects the servo band SB by determining the correctness of the servo pattern 52 by using the position detection result.

Here, for example, the servo writer controller SW5 acquires the position detection result from the servo pattern reading result by performing the servo pattern detection processing. The ideal waveform signal 66 used in the servo pattern detection processing by the servo writer controller SW5 is the ideal waveform signal 66 stored in the storage (not shown) in the servo writer controller SW5.

The servo writer controller SW5 outputs the information indicating the result obtained by inspecting the servo band SB (for example, the result obtained by determining the correctness of the servo pattern 52) to a predetermined output destination (for example, a storage, a display, a tablet terminal, a personal computer, and/or a server).

For example, in a case in which the inspection step is terminated, the winding step is then performed. The winding step is a step of winding the magnetic tape MT around the sending reel 22 (that is, the sending reel 22 (see FIGS. 2 to 4) accommodated in the magnetic tape cartridge 12 (see FIGS. 1 to 4)) used for each of the plurality of magnetic tape cartridges 12 (see FIGS. 1 to 4). In the winding step, the winding motor (not shown) is used. The winding motor is mechanically connected to the sending reel 22 via a gear and the like. The winding motor rotates the sending reel 22 by applying a rotation force to the sending reel 22 under the control of the processing device (not shown). The magnetic tape MT wound around the winding reel SW2 is wound around the sending reel 22 by the rotation of the sending reel 22. In the winding step, a cutting device (not shown) is used. In a case in which a required amount of the magnetic tape MT is wound around the sending reel 22 for each of the plurality of sending reels 22, the magnetic tape MT sent from the winding reel SW2 to the sending reel 22 is cut by the cutting device.

Second Modification Example

Figure 19:
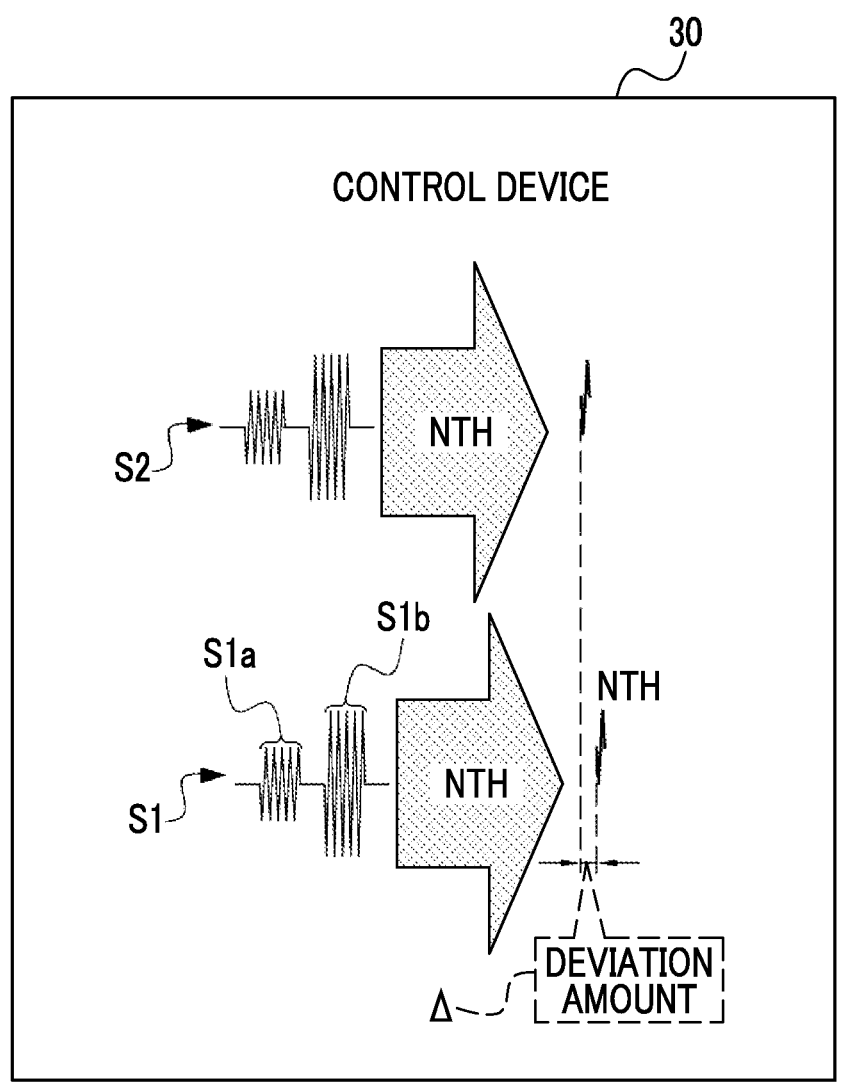
FIG. 19 is a conceptual diagram showing an example of processing contents by the control device provided in the magnetic tape system according to a second modification example.

In the embodiment described above, the form example has been described in which the deviation amount Δ is calculated as the deviation amount in time between the entire first servo band signal S1 and the entire second servo band signal S2, but the technology of the present disclosure is not limited to this. For example, as shown in FIG. 19 as an example, the control device 30 may calculate, as the deviation amount Δ, the deviation amount in time between the Nth (for example, first) pulse signal included in the first servo band signal S1 and the Nth pulse signal included in the second servo band signal S2. Here, N refers to any natural number having, as an upper limit value, "10" which is the number of the five magnetization straight lines 54A1a included in the linear magnetization region 54A1 and the five magnetization straight lines 54A2a included in the linear magnetization region 54A2. In this case, it is not necessary to calculate the deviation amount for all the pulse signals included in the servo band signal, so that the deviation amount Δ can be calculated quickly. In addition, the deviation amount Δ can be calculated more quickly by setting "N=1".

Third Modification Example

In the second modification example described above, the form example has been described in which the deviation amount Δ between the Nth pulse signals of the first servo band signal S1 and the second servo band signal S2 is calculated, but the technology of the present disclosure is not limited to this. For example, the deviation amount Δ may be defined based on an average value, a median value, a most frequent value, a maximum value, or a minimum value of the time difference between the plurality of pulse signals included in the first servo band signal S1 and the plurality of pulse signals included in the first servo band signal S2.

Figure 20:
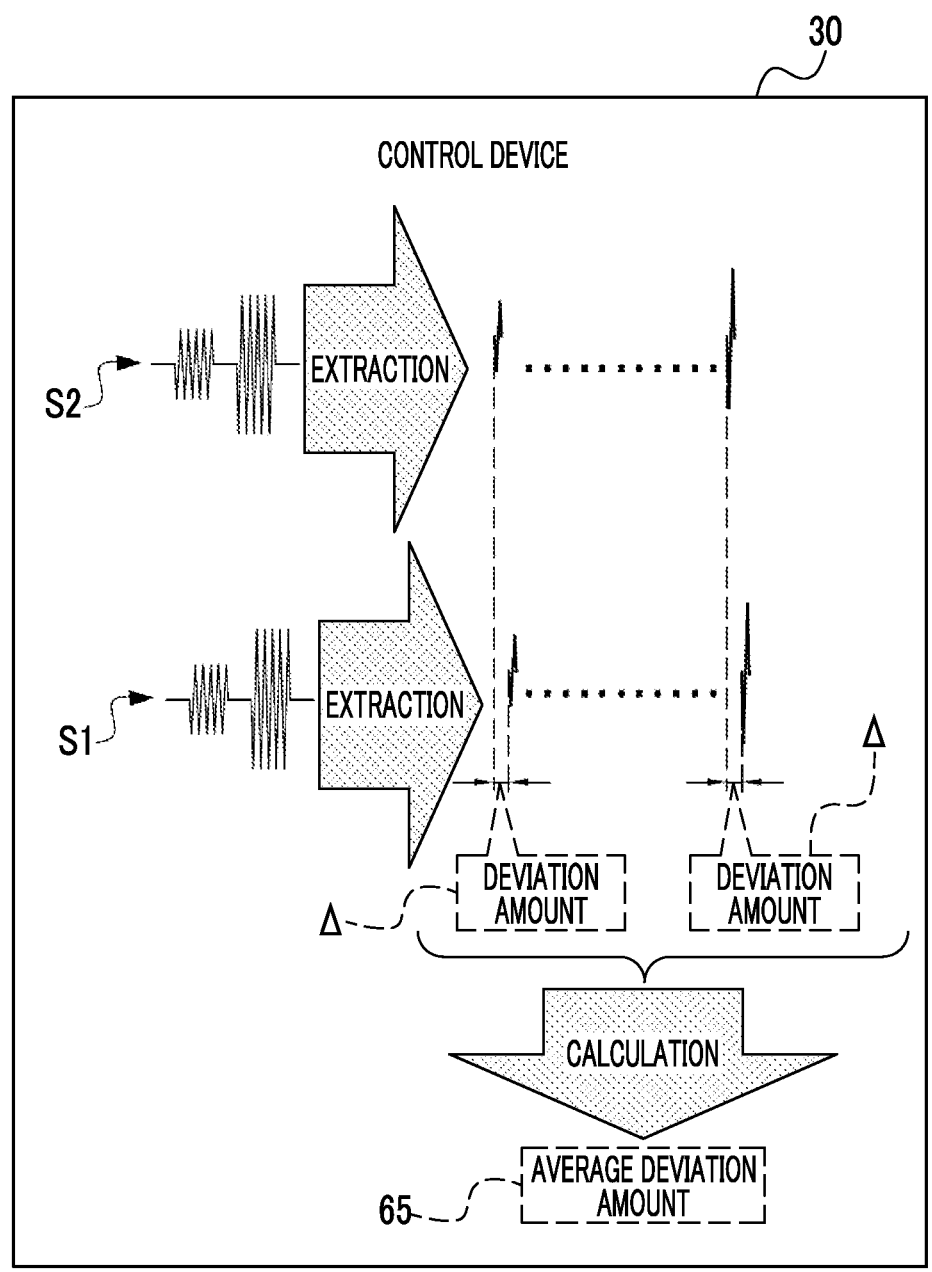
FIG. 20 is a conceptual diagram showing an example of processing contents by the control device provided in the magnetic tape system according to a third modification example.

In this case, for example, as shown in FIG. 20, the control device 30 calculates an average deviation amount 65 based on all the pulse signals included in the first servo band signal S1 and all the pulse signals included in the second servo band signal S2. For example, the average deviation amount 65 is an average value of all the deviation amounts Δ calculated by comparing all the pulse signals included in the first servo band signal S1 and all the pulse signals included in the second servo band signal S2 in order along the time series. In this way, according to the third modification example (for example, the example shown in FIG. 20), the deviation amount in which the variation between the deviation amounts Δ is suppressed (average deviation amount 65 in the example shown in FIG. 20) can be obtained.

It should be noted that, here, the average value has been described, a median value of all the deviation amounts Δ may be adopted, a most frequent value may be adopted, a maximum value may be adopted, or a minimum value may be adopted. In addition, a combination of two or more of the average value, the median value, the most frequent value, the maximum value, or the minimum value may be adopted. For example, the average value, the median value, the most frequent value, the maximum value, and/or the minimum value, and a combination of two or more of the average value, the median value, the most frequent value, the maximum value, or the minimum value may be stored in the storage medium, such as the cartridge memory 24.

In addition, here, all the pulse signals included in the servo band signal are used as the calculation target of the deviation amount Δ, but this is merely an example. For example, an even-th pulse signal, an odd-th pulse signal, a plurality of pulse signals in the first half of the time series, or a plurality of pulse signals in the second half of the time series may be used as the calculation target of the deviation amount Δ.

Fourth Modification Example

In the third modification example, the servo band signal corresponding to one servo pattern 52 in the servo band SB has been described, but the technology of the present disclosure is not limited to this. For example, a statistic value of a time difference between the servo band signal obtained for the plurality of servo patterns 52 in one servo band SB of the adjacent servo bands SB and the servo band signal obtained for the plurality of servo patterns 52 in the other servo band SB may be adopted.

Figure 21:
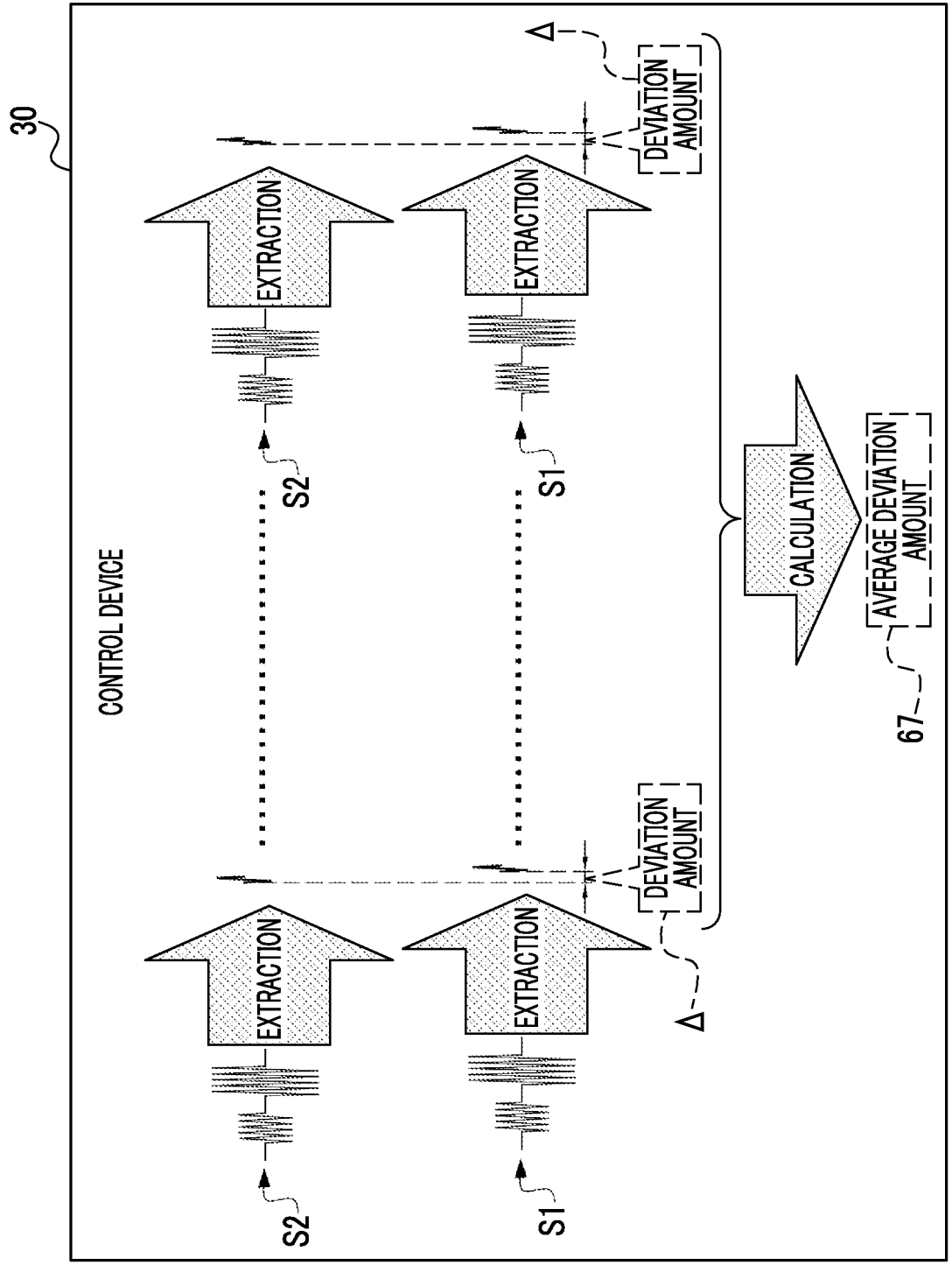
FIG. 21 is a conceptual diagram showing an example of processing contents by the control device provided in the magnetic tape system according to a fourth modification example.

In this case, for example, as shown in FIG. 21, the control device 30 calculates the deviation amount Δ in a unit of the servo pattern 52 in the same manner as in the second modification example (see FIG. 19) from the first servo band signal S1 and the second servo band signal S2 obtained by reading the plurality of servo patterns 52 by the servo reading elements SR1 and SR2. Moreover, the control device 30 calculates an average deviation amount 67. The average deviation amount 67 is an average value of a plurality of deviation amounts Δ calculated in a unit of the servo pattern 52. As described above, according to the fourth modification example (for example, the example shown in FIG. 21), the deviation amount in which the variation between the deviation amounts Δ calculated in a unit of the servo pattern 52 is suppressed (average deviation amount 67 in the example shown in FIG. 21) can be obtained.

It should be noted that, in the example shown in FIG. 21, the average deviation amount 67 which is the average value of the plurality of deviation amounts Δ calculated in a unit of the servo pattern 52, but this is merely an example, and a statistic value, such as a median value, a most frequent value, a maximum value, or a minimum value, may be adopted.

In addition, in the example shown in FIG. 21, the form example has been described in which the deviation amount Δ is calculated for each servo pattern 52 in the same manner as in the second modification example (see FIG. 19), but this is merely an example, and the average deviation amount 65 may be calculated for each servo pattern 52 and an average value of a plurality of average deviation amounts 65 may be calculated in the same manner as in the third modification example (see FIG. 20). It should be noted that, in this case as well, the average value is merely an example, and a statistic value, such as a median value, a most frequent value, a maximum value, or a minimum value, may be adopted.

In the above description, the servo pattern 52 is described as an example, but the servo pattern 52 is merely an example, and the technology of the present disclosure is established even in a case in which other types of servo patterns (that is, servo patterns having the geometrical characteristic different from the geometrical characteristic of the servo pattern 52) are used. In the following fifth modification example to twelfth modification example, an aspect example of the magnetic tape MT in which a servo pattern of a type different from that of the servo pattern 52 is recorded will be described.

Fifth Modification Example

Figure 22:
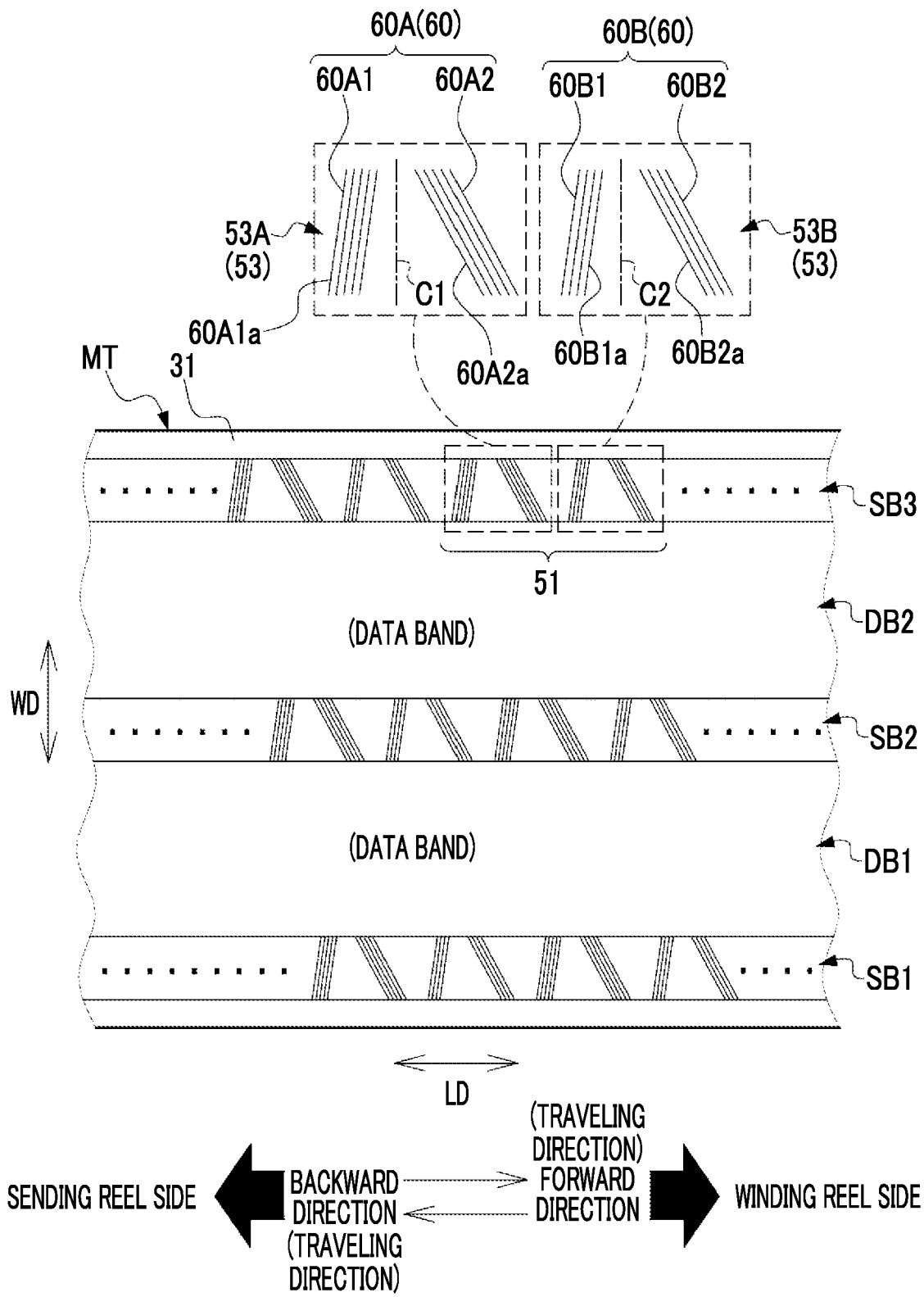
FIG. 22 is a conceptual diagram showing a fifth modification example, and is a conceptual diagram showing a modification example of the magnetic tape according to the embodiment (conceptual diagram showing an example of an aspect in which the magnetic tape is observed from the front surface side of the magnetic tape)

As shown in FIG. 22 as an example, the magnetic tape MT according to the fifth modification example is different from the magnetic tape MT shown in FIG. 6 in that a frame 51 is provided instead of the frame 50. The frame 51 is defined by a set of servo patterns 53. A plurality of servo patterns 53 are recorded in the servo band SB along the longitudinal direction LD of the magnetic tape MT. The plurality of servo patterns 53 are disposed at regular intervals along the longitudinal direction LD of the magnetic tape MT, similarly to the plurality of servo patterns 52 recorded in the magnetic tape MT shown in FIG. 6.

In the example shown in FIG. 22, servo patterns 53A and 53B are shown as an example of the set of servo patterns 53 included in the frame 51. The servo patterns 53A and 53B are adjacent to each other along the longitudinal direction LD of the magnetic tape MT, and the servo pattern 53A is positioned on the upstream side in the forward direction in the frame 51, and the servo pattern 53B is positioned on the downstream side in the forward direction.

The servo pattern 53 consists of a linear magnetization region pair 60. The linear magnetization region pair 60 is classified into a linear magnetization region pair 60A and a linear magnetization region pair 60B.

The servo pattern 53A consists of the linear magnetization region pair 60A. In the example shown in FIG. 22, a pair of linear magnetization regions 60A1 and 60A2 is shown as an example of the linear magnetization region pair 60A. Each of the linear magnetization regions 60A1 and 60A2 is a linearly magnetized region.

The linear magnetization regions 60A1 and 60A2 are inclined in opposite directions with respect to the imaginary straight line C1. The linear magnetization regions 60A1 and 60A2 are not parallel to each other and are inclined at different angles with respect to the imaginary straight line C1. The linear magnetization region 60A1 has a steeper inclined angle with respect to the imaginary straight line C1 than the linear magnetization region 60A2. Here, "steep" means that, for example, an angle of the linear magnetization region 60A1 with respect to the imaginary straight line C1 is smaller than an angle of the linear magnetization region 60A2 with respect to the imaginary straight line C1. In addition, a total length of the linear magnetization region 60A1 is shorter than a total length of the linear magnetization region 60A2.

In the servo pattern 53A, a plurality of magnetization straight lines 60A1a are included in the linear magnetization region 60A1, and a plurality of magnetization straight lines 60A2a are included in the linear magnetization region 60A2. The number of the magnetization straight lines 60A1a included in the linear magnetization region 60A1 is the same as the number of the magnetization straight lines 60A2a included in the linear magnetization region 60A2.

The linear magnetization region 60A1 is a set of magnetization straight lines 60A1a, which are five magnetized straight lines, and the linear magnetization region 60A2 is a set of magnetization straight lines 60A2a, which are five magnetized straight lines. In the servo band SB, the positions of both ends of the linear magnetization region 60A1 (that is, the positions of both ends of each of the five magnetization straight lines 60A1a) and the positions of both ends of the linear magnetization region 60A2 (that is, the positions of both ends of each of the five magnetization straight lines 60A2a) are aligned in the width direction WD. It should be noted that, here, the example has been described in which the positions of both ends of each of the five magnetization straight lines 60A1a and the positions of both ends of each of the five magnetization straight lines 60A2a are aligned, but this is merely an example, and the positions of both ends of one or more magnetization straight lines 60A1a among the five magnetization straight lines 60A1a and the positions of both ends of one or more magnetization straight lines 60A2a among of the five magnetization straight lines 60A2a need only be aligned. In addition, in the present embodiment, the concept of "aligned" also includes meaning of "aligned" including an error generally allowed in the technical field to which the technology of the present disclosure belongs, which is the error to the extent that it does not contradict the purpose of the technology of the present disclosure, in addition to the meaning of being exactly aligned.

The servo pattern 53B consists of the linear magnetization region pair 60B. In the example shown in FIG. 22, a pair of linear magnetization regions 60B1 and 60B2 is shown as an example of the linear magnetization region pair 60B. Each of the linear magnetization regions 60B1 and 60B2 is a linearly magnetized region.

The linear magnetization regions 60B1 and 60B2 are inclined in opposite directions with respect to the imaginary straight line C2. The linear magnetization regions 60B1 and 60B2 are not parallel to each other and are inclined at different angles with respect to the imaginary straight line C2. The linear magnetization region 60B1 has a steeper inclined angle with respect to the imaginary straight line C2 than the linear magnetization region 60B2. Here, "steep" means that, for example, an angle of the linear magnetization region 60B1 with respect to the imaginary straight line C2 is smaller than an angle of the linear magnetization region 60B2 with respect to the imaginary straight line C2.

In addition, a total length of the linear magnetization region 60B1 is shorter than a total length of the linear magnetization region 60B2.

In the servo pattern 53B, a plurality of magnetization straight lines 60B1a are included in the linear magnetization region 60B1, and a plurality of magnetization straight lines 60B2a are included in the linear magnetization region 60B2. The number of the magnetization straight lines 60B 1a included in the linear magnetization region 60B1 is the same as the number of the magnetization straight lines 60B2a included in the linear magnetization region 60B2.

The total number of the magnetization straight lines 60B 1a and 60B2a included in the servo pattern 53B is different from the total number of the magnetization straight lines 60A1a and 60A2a included in the servo pattern 53A. In the example shown in FIG. 22, the total number of the magnetization straight lines 60A1a and 60A2a included in the servo pattern 53A is ten, whereas the total number of the magnetization straight lines 60B1a and 60B2a included in the servo pattern 53B is eight.

The linear magnetization region 60B1 is a set of magnetization straight lines 60B1a, which are four magnetized straight lines, and the linear magnetization region 60B2 is a set of magnetization straight lines 60B2a, which are four magnetized straight lines. In the servo band SB, the positions of both ends of the linear magnetization region 60B1 (that is, the positions of both ends of each of the four magnetization straight lines 60B1a) and the positions of both ends of the linear magnetization region 60B2 (that is, the positions of both ends of each of the four magnetization straight lines 60B2a) are aligned in the width direction WD.

It should be noted that, here, the example has been described in which the positions of both ends of each of the four magnetization straight lines 60B1a and the positions of both ends of each of the four magnetization straight lines 60B2a are aligned, but this is merely an example, and the positions of both ends of one or more magnetization straight lines 60B1a among the four magnetization straight lines 60B1a and the positions of both ends of one or more magnetization straight lines 60B2a among of the four magnetization straight lines 60B2a need only be aligned.

In addition, here, the set of magnetization straight lines 60A1a, which are five magnetized straight lines, is described as an example of the linear magnetization region 60A1, the set of magnetization straight lines 60A2a, which are five magnetized straight lines, is described as an example of the linear magnetization region 60A2, the set of magnetization straight lines 60B 1a, which are four magnetized straight lines, is described as an example of the linear magnetization region 60B1, and the set of magnetization straight lines 60B2a, which are four magnetized straight lines, is described as an example of the linear magnetization region 60B2, but the technology of the present disclosure is not limited thereto. For example, the linear magnetization region 60A1 need only have the number of the magnetization straight lines 60A1a that contribute to specifying the position of the magnetic head 28 on the magnetic tape MT, the linear magnetization region 60A2 need only have the number of the magnetization straight lines 60A2a that contribute to specifying the position of the magnetic head 28 on the magnetic tape MT, the linear magnetization region 60B1 need only have the number of the magnetization straight lines 60B1a that contribute to specifying the position of the magnetic head 28 on the magnetic tape MT, and the linear magnetization region 60B2 need only have the number of the magnetization straight lines 60B2a that contribute to specifying the position of the magnetic head 28 on the magnetic tape MT.

Here, the geometrical characteristic of the linear magnetization region pair 60A on the magnetic tape MT will be described with reference to FIG. 23.

Figure 23:
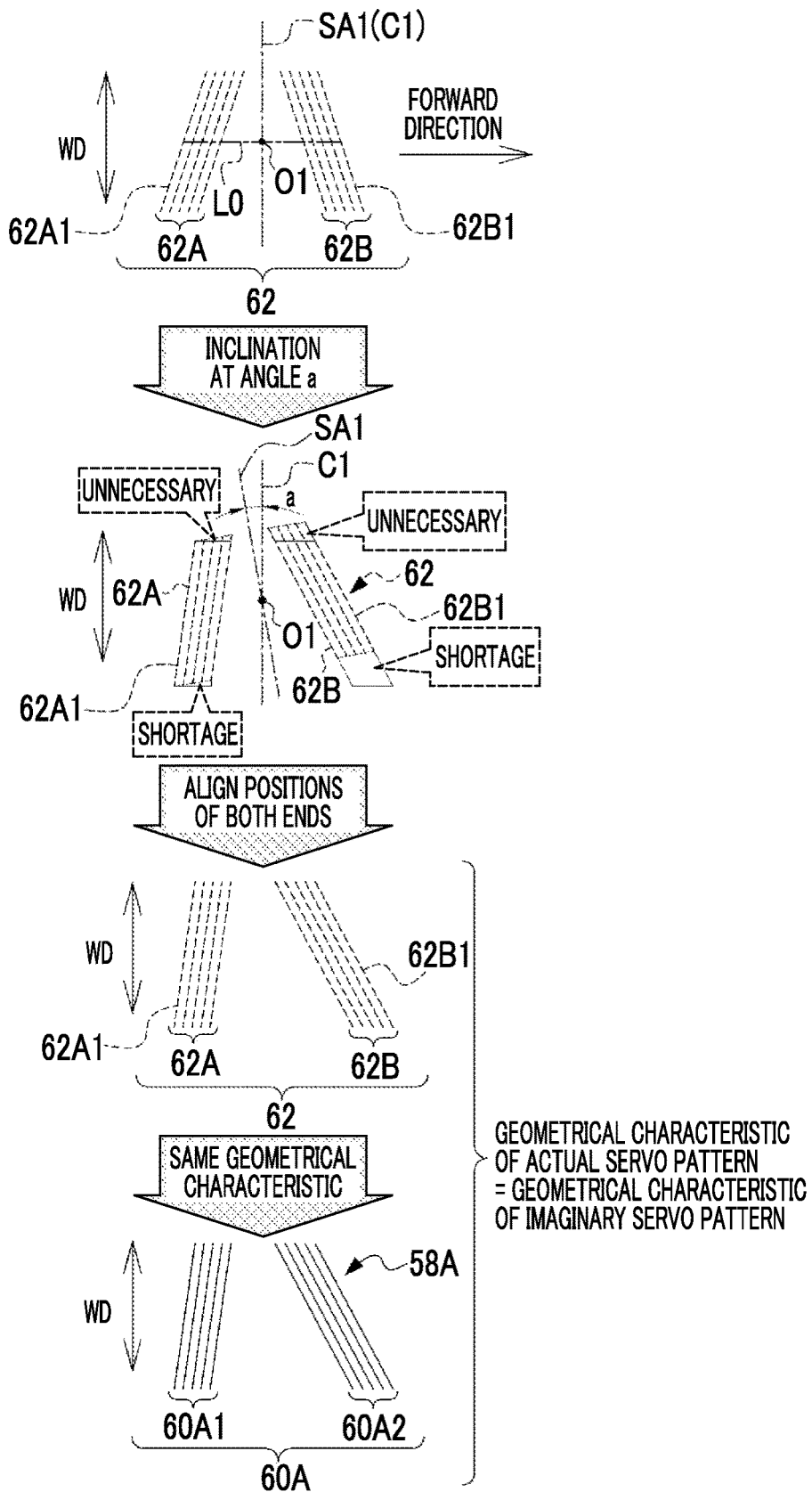
FIG. 23 is a conceptual diagram showing the fifth modification example, and is a conceptual diagram showing a relationship between a geometrical characteristic of an actual servo pattern and a geometrical characteristic of an imaginary servo pattern.

As an example, as shown in FIG. 23, the geometrical characteristic of the linear magnetization region pair 60A on the magnetic tape MT can be expressed by using an imaginary linear region pair 62. The imaginary linear region pair 62 consists of an imaginary linear region 62A and an imaginary linear region 62B. The geometrical characteristic of the linear magnetization region pair 60A on the magnetic tape MT corresponds to the geometrical characteristic based on the imaginary linear region pair 62 inclined line-symmetrically with respect to the imaginary straight line C1 in a case in which an entirety of the imaginary linear region pair 62 is inclined with respect to the imaginary straight line C1 by inclining a symmetry axis SA1 of the imaginary linear region 62A and the imaginary linear region 62B with respect to the imaginary straight line C1.

The imaginary linear region pair 62 is an imaginary linear magnetization region pair having the same geometrical characteristic as the linear magnetization region pair 54A shown in FIG. 6. The imaginary linear region pair 62 is an imaginary magnetization region used for convenience for describing the geometrical characteristic of the linear magnetization region pair 60A on the magnetic tape MT, and is not an actually present magnetization region.

The imaginary linear region 62A has the same geometrical characteristic as the linear magnetization region 54A1 shown in FIG. 6, and consists of five imaginary straight lines 62A1 corresponding to the five magnetization straight lines 54A1a shown in FIG. 6. The imaginary linear region 62B has the same geometrical characteristic as the linear magnetization region 54B1 shown in FIG. 6, and consists of five imaginary straight lines 62B1 corresponding to the five magnetization straight lines 54A2a shown in FIG. 6.

A center O1 is provided in the imaginary linear region pair 62. For example, the center O1 is a center of a line segment L0 connecting a center of the straight line 62A1 positioned on the most upstream side of the five straight lines 62A1 in the forward direction and a center of the straight line 62B1 positioned on the most downstream side of the five straight lines 62B1 in the forward direction.

Since the imaginary linear region pair 62 has the same geometrical characteristic as the linear magnetization region pair 54A shown in FIG. 6, the imaginary linear region 62A and the imaginary linear region 62B are inclined line-symmetrically with respect to the imaginary straight line C1. Here, a case will be considered in which reading by the servo reading element SR is performed tentatively with respect to the imaginary linear region pair 62 in a case in which the entirety of the imaginary linear region pair 62 is inclined with respect to the imaginary straight line C1 by inclining the symmetry axis SA1 of the imaginary linear regions 62A and 62B at an angle α (for example, 10 degrees) with respect to the imaginary straight line C1 with the center O1 as the rotation axis. In this case, in the imaginary linear region pair 62, in the width direction WD, a portion is generated in which the imaginary linear region 62A is read but the imaginary linear region 62B is not read or the imaginary linear region 62A is not read but the imaginary linear region 62B is read. That is, in each of the imaginary linear regions 62A and 62B, in a case in which reading by the servo reading element SR is performed, a shortage part and an unnecessary part are generated.

Therefore, by compensating for the shortage part and removing the unnecessary part, the positions of both ends of the imaginary linear region 62A (that is, the positions of both ends of each of the five straight lines 62A1) and the positions of both ends of the imaginary linear region 62B (that is, the positions of both ends of each of the five straight lines 62B1) are aligned in the width direction WD.

The geometrical characteristic of the imaginary linear region pair 62 (that is, the geometrical characteristic of the imaginary servo pattern) obtained as described above corresponds to the geometrical characteristic of the actual servo pattern 53A. That is, the linear magnetization region pair 60A having the geometrical characteristic corresponding to the geometrical characteristic of the imaginary linear region pair 62 obtained by aligning the positions of both ends of the imaginary linear region 62A and the positions of both ends of the imaginary linear region 62B in the width direction WD is recorded in the servo band SB.

It should be noted that the linear magnetization region pair 60B is different from the linear magnetization region pair 60A only in that the four magnetization straight lines 60B1a are provided instead of the five magnetization straight lines 60A1a and the four magnetization straight lines 60B2a are provided instead of the five magnetization straight lines 60A2a. Therefore, the linear magnetization region pair 60B having the geometrical characteristic corresponding to the geometrical characteristic of the imaginary linear region pair (not shown) obtained by aligning the positions of both ends of each of the four straight lines 62A1 and the positions of both ends of each of the four straight lines 62B1 in the width direction WD is recorded in the servo band SB.

Figure 24:
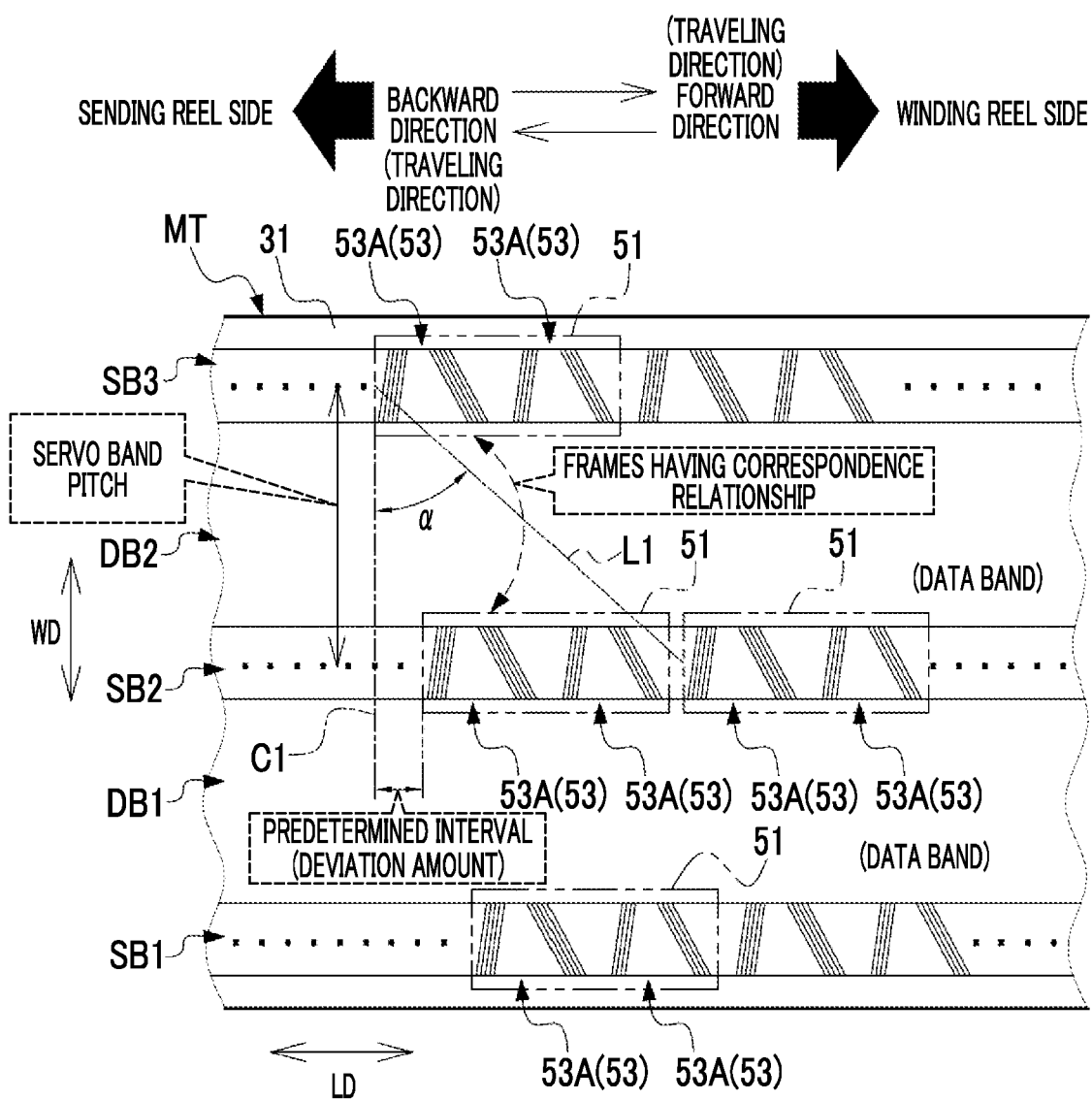
FIG. 24 is a conceptual diagram showing the fifth modification example, and is a conceptual diagram showing an example of an aspect in which a state in which the frames corresponding to each other between the servo bands adjacent to each other in the width direction of the magnetic tape deviate from each other at the predetermined interval is observed from the front surface side of the magnetic tape.

As an example, as shown in FIG. 24, the plurality of servo bands SB are formed on the magnetic tape MT in the width direction WD, and the frames 51 having a correspondence relationship between the servo bands SB deviate from each other at predetermined intervals in the longitudinal direction LD, between the servo bands SB adjacent to each other in the width direction WD of the magnetic tape MT. This means that the servo patterns 58 having a correspondence relationship between the servo bands SB deviate from each other at the predetermined interval in the longitudinal direction LD between the servo bands SB adjacent to each other in the width direction WD of the magnetic tape MT. The predetermined interval is defined by Expression (1). That is, the positional relationship between the frames 51 between the servo bands SB and the positional relationship between the servo patterns 53 between the servo bands SB are the same as those in the example shown in FIG. 12.

Figure 25:
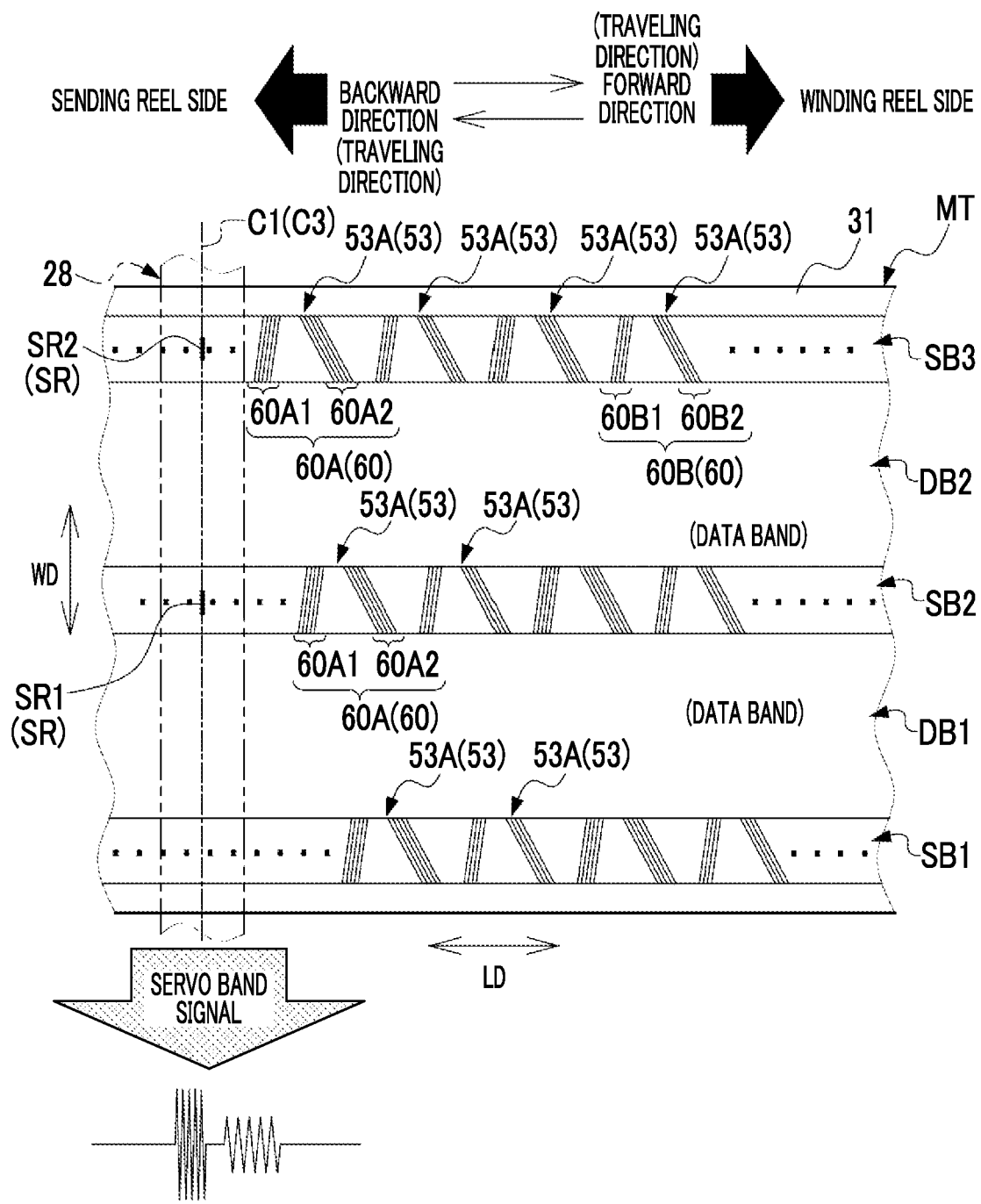
FIG. 25 is a conceptual diagram showing the fifth modification example, and is a conceptual diagram showing an example of an aspect in which a state in which the servo pattern is read by a servo reading element provided in the magnetic head that is not skewed on the magnetic tape is observed from the front surface side of the magnetic tape.

As an example, as shown in FIG. 25, in a case in which the servo pattern 53A (that is, the linear magnetization region pair 60A) is read by the servo reading element SR in a state in which the direction of the imaginary straight line C1 and the direction of the imaginary straight line C3 match (that is, a state in which the longitudinal direction of the magnetic head 28 and the width direction WD match), the variation due to the azimuth loss occurs between the servo pattern signal derived from the linear magnetization region 60A1 and the servo pattern signal derived from the linear magnetization region 60A2.

In addition, also in a case in which the servo pattern 53B (that is, the linear magnetization region pair 60B) is read by the servo reading element SR in a state in which the direction of the imaginary straight line C1 and the direction of the imaginary straight line C3 match (that is, a state in which the longitudinal direction of the magnetic head 28 and the width direction WD match), a similar phenomenon occurs.

Figure 26:
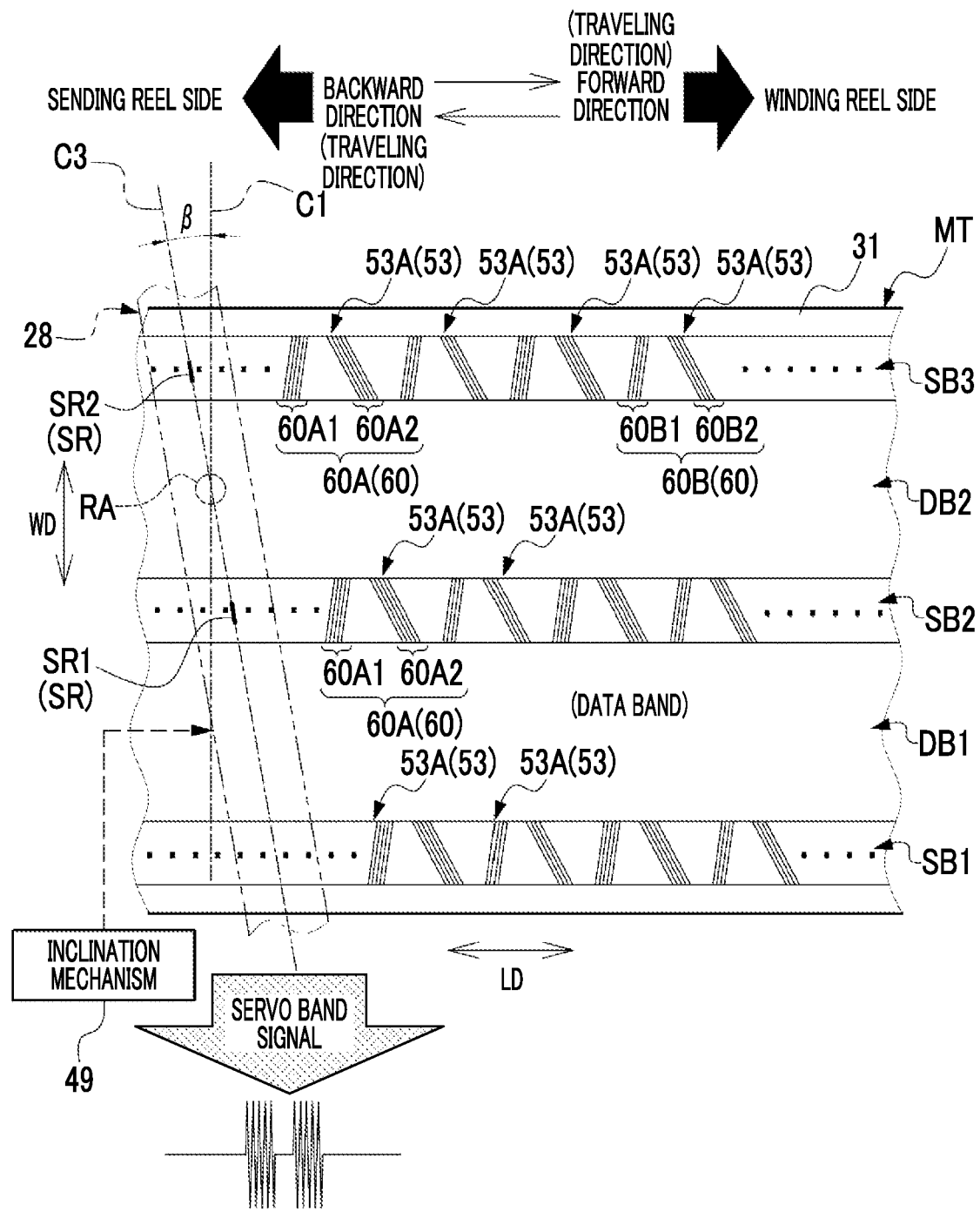
FIG. 26 is a conceptual diagram showing the fifth modification example, and is a conceptual diagram showing an example of an aspect in which a state in which the servo pattern is read by the servo reading element provided in the magnetic head that is skewed on the magnetic tape is observed from the front surface side of the magnetic tape.

Therefore, as an example, as shown in FIG. 26, the inclination mechanism 49 skews the magnetic head 28 on the magnetic tape MT around the rotation axis RA such that the imaginary straight line C3 is inclined with respect to the imaginary straight line C1 to the upstream side in the forward direction at an angle β (that is, the angle β counterclockwise as viewed from the paper surface side of FIG. 26). As described above, since the magnetic head 28 is inclined to the upstream side in the forward direction at the angle β on the magnetic tape MT, the variation due to the azimuth loss between the servo pattern signal derived from the linear magnetization region 60A1 and the servo pattern signal derived from the linear magnetization region 60A2 is smaller than that in the example shown in FIG. 25. In addition, also in a case in which the servo pattern 53B (that is, the linear magnetization region pair 60B) is read by the servo reading element SR, similarly, the variation due to the azimuth loss between the servo pattern signal derived from the linear magnetization region 60B1 and the servo pattern signal derived from the linear magnetization region 60B2 is small.

Sixth Modification Example

Figure 27:
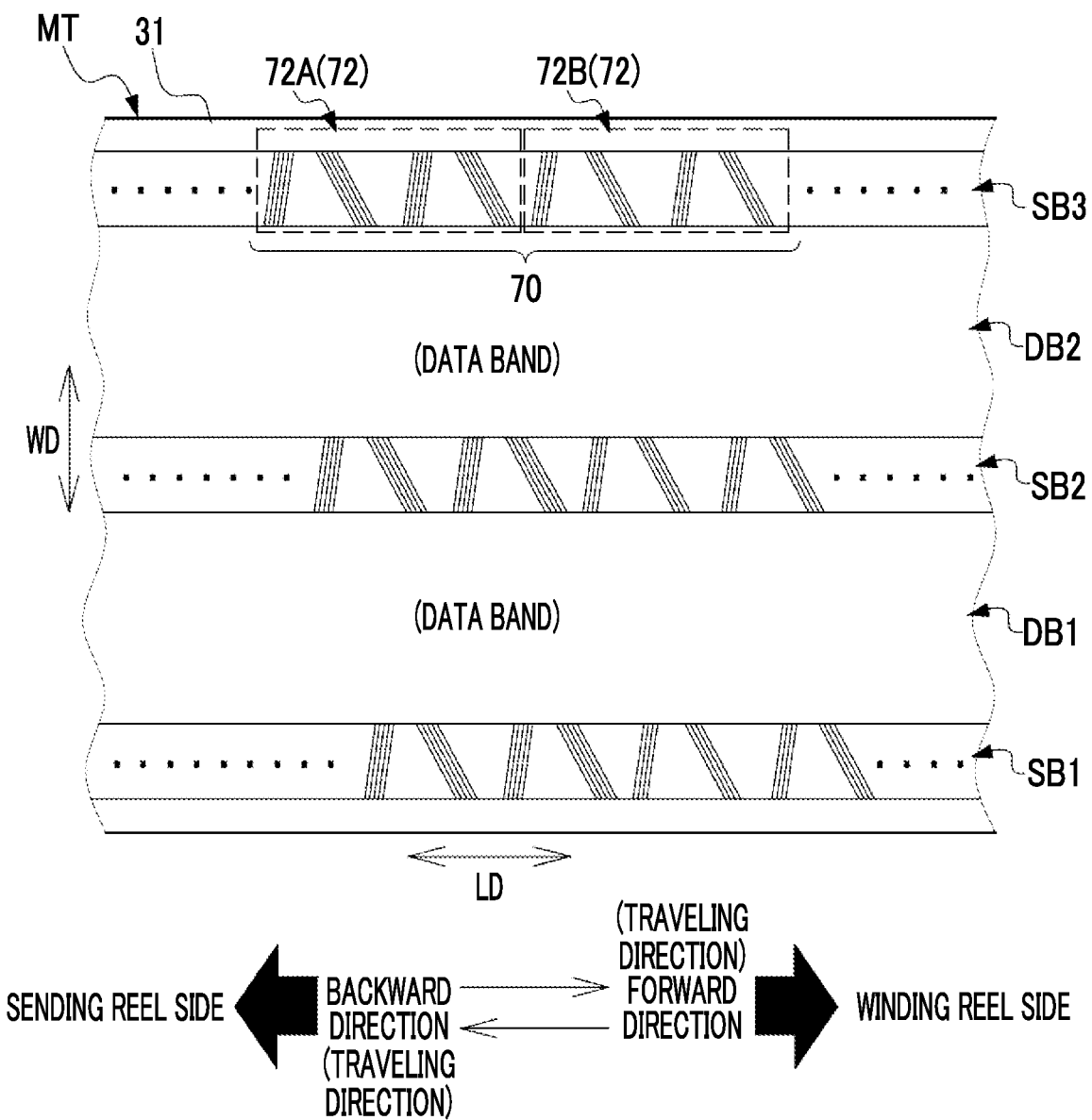
FIG. 27 is a conceptual diagram showing a sixth modification example, and is a conceptual diagram showing a modification example of the magnetic tape according to the embodiment (conceptual diagram showing an example of an aspect in which the magnetic tape is observed from the front surface side of the magnetic tape)

It should be noted that, in the fifth modification example described above, the form example has been described in which the servo band SB is divided by a plurality of frames 51 along the longitudinal direction LD of the magnetic tape MT, but the technology of the present disclosure is not limited to this. For example, as shown in FIG. 27, the servo band SB may be divided by a frame 70 along the longitudinal direction LD of the magnetic tape MT. The frame 70 is defined by a set of servo patterns 72. A plurality of servo patterns 72 are recorded in the servo band SB along the longitudinal direction LD of the magnetic tape MT. The plurality of servo patterns 72 are disposed at regular intervals along the longitudinal direction LD of the magnetic tape MT, similarly to the plurality of servo patterns 52.

In the example shown in FIG. 27, a pair of servo patterns 72A and 72B is shown as an example of the set of servo patterns 72. Each of the servo patterns 72A and 72B is an M-shaped magnetized servo pattern. The servo patterns 72A and 72B are adjacent to each other along the longitudinal direction LD of the magnetic tape MT, and the servo pattern 72A is positioned on the upstream side in the forward direction and the servo pattern 72B is positioned on the downstream side in the forward direction in the frame 70.

Figure 28:
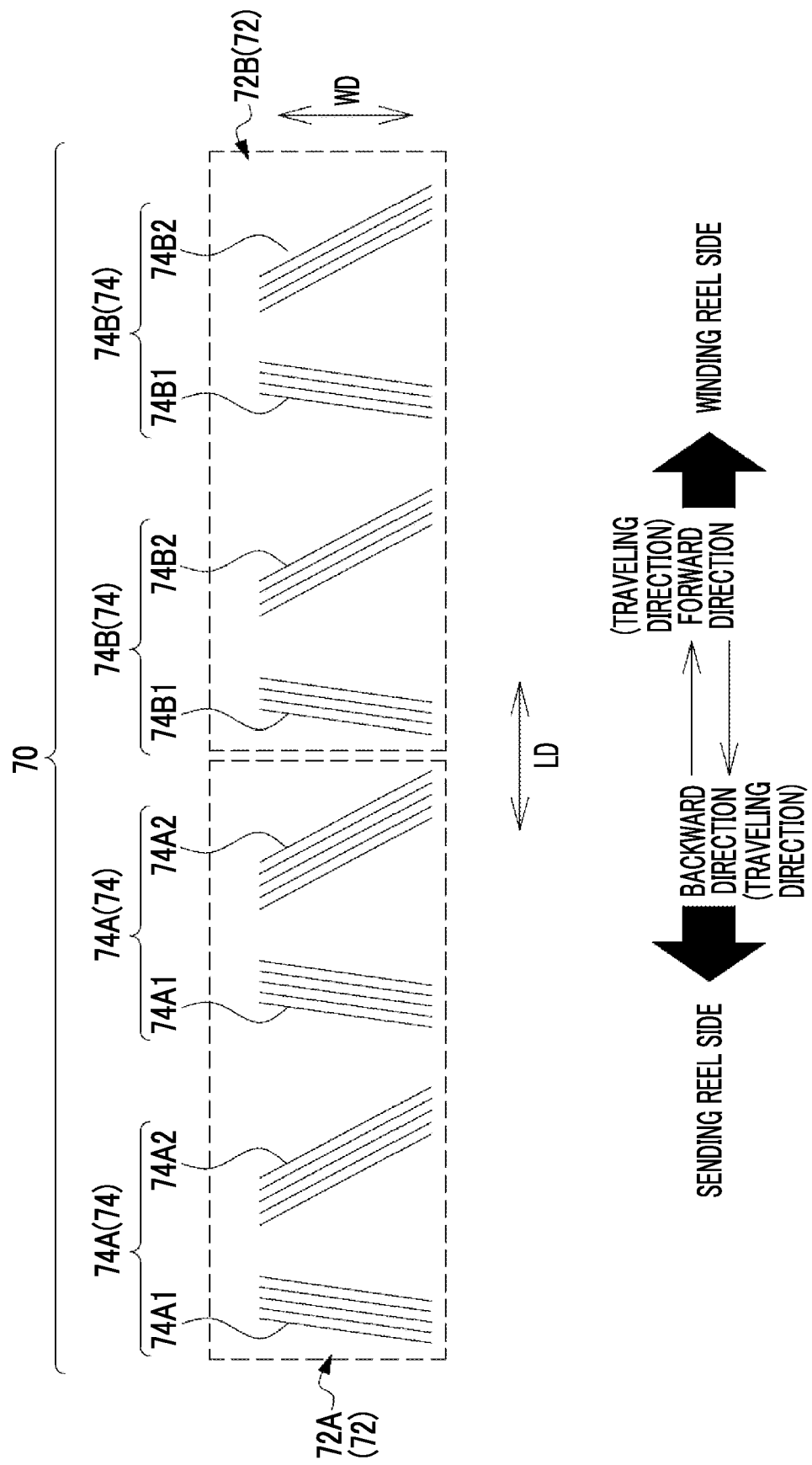
FIG. 28 is a conceptual diagram showing the sixth modification example, and is a conceptual diagram showing an example of an aspect of the servo pattern included in the magnetic tape.

As an example, as shown in FIG. 28, the servo pattern 72 consists of a linear magnetization region pair 74. The linear magnetization region pair 74 is classified into a linear magnetization region pair 74A and a linear magnetization region pair 74B.

The servo pattern 72A consists of a set of linear magnetization region pairs 74A. The set of linear magnetization region pairs 74A are disposed in a state of being adjacent to each other along the longitudinal direction LD of the magnetic tape MT.

In the example shown in FIG. 28, a pair of linear magnetization regions 74A1 and 74A2 is shown as an example of the linear magnetization region pair 74A. The linear magnetization region pair 74A is configured in the same manner as the linear magnetization region pair 60A described in the fifth modification example, and has the same geometrical characteristic as the linear magnetization region pair 60A. That is, the linear magnetization region 74A1 is configured in the same manner as the linear magnetization region 60A1 described in the fifth modification example, and has the same geometrical characteristic as the linear magnetization region 60A1, and the linear magnetization region 74A2 is configured in the same manner as the linear magnetization region 60A2 described in the fifth modification example, and has the same geometrical characteristic as the linear magnetization region 60A2.

The servo pattern 72B consists of a set of linear magnetization region pairs 74B. The set of linear magnetization region pairs 74B are disposed in a state of being adjacent to each other along the longitudinal direction LD of the magnetic tape MT.

In the example shown in FIG. 28, a pair of linear magnetization regions 74B1 and 74B2 is shown as an example of the linear magnetization region pair 74B. The linear magnetization region pair 74B is configured in the same manner as the linear magnetization region pair 60B described in the fifth modification example, and has the same geometrical characteristic as the linear magnetization region pair 60B. That is, the linear magnetization region 74B1 is configured in the same manner as the linear magnetization region 60B1 described in the fifth modification example, and has the same geometrical characteristic as the linear magnetization region 60B1, and the linear magnetization region 74B2 is configured in the same manner as the linear magnetization region 60B2 described in the fifth modification example, and has the same geometrical characteristic as the linear magnetization region 60B2.

Seventh Modification Example

Figure 29:
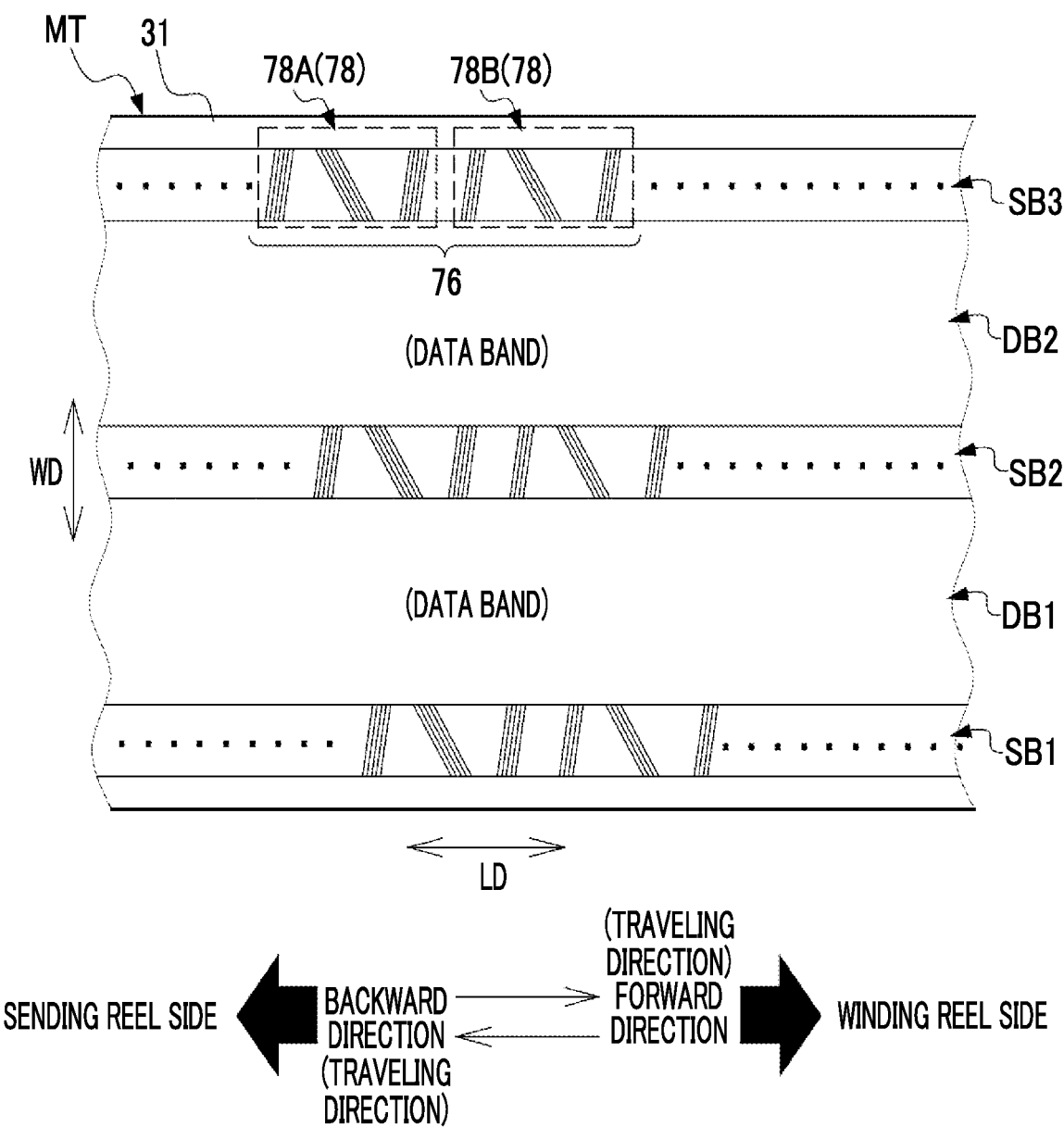
FIG. 29 is a conceptual diagram showing a seventh modification example, and is a conceptual diagram showing a modification example of the magnetic tape according to the embodiment (conceptual diagram showing an example of an aspect in which the magnetic tape is observed from the front surface side of the magnetic tape)

In the example shown in FIG. 27, the form example has been described in which the servo band SB is divided by a plurality of frames 70 along the longitudinal direction LD of the magnetic tape MT, but the technology of the present disclosure is not limited to this. For example, as shown in FIG. 29, the servo band SB may be divided by a frame 76 along the longitudinal direction LD of the magnetic tape MT. The frame 76 is defined by a set of servo patterns 78. A plurality of servo patterns 78 are recorded in the servo band SB along the longitudinal direction LD of the magnetic tape MT. Similarly to the plurality of servo patterns 72 (see FIG. 27), the plurality of servo patterns 78 are disposed at regular intervals along the longitudinal direction LD of the magnetic tape MT.

In the example shown in FIG. 29, servo patterns 78A and 78B are shown as an example of the set of servo patterns 78. Each of the servo patterns 78A and 78B is an N-shaped magnetized servo pattern. The servo patterns 78A and 78B are adjacent to each other along the longitudinal direction LD of the magnetic tape MT, and the servo pattern 78A is positioned on the upstream side in the forward direction and the servo pattern 78B is positioned on the downstream side in the forward direction in the frame 76.

Figure 30:
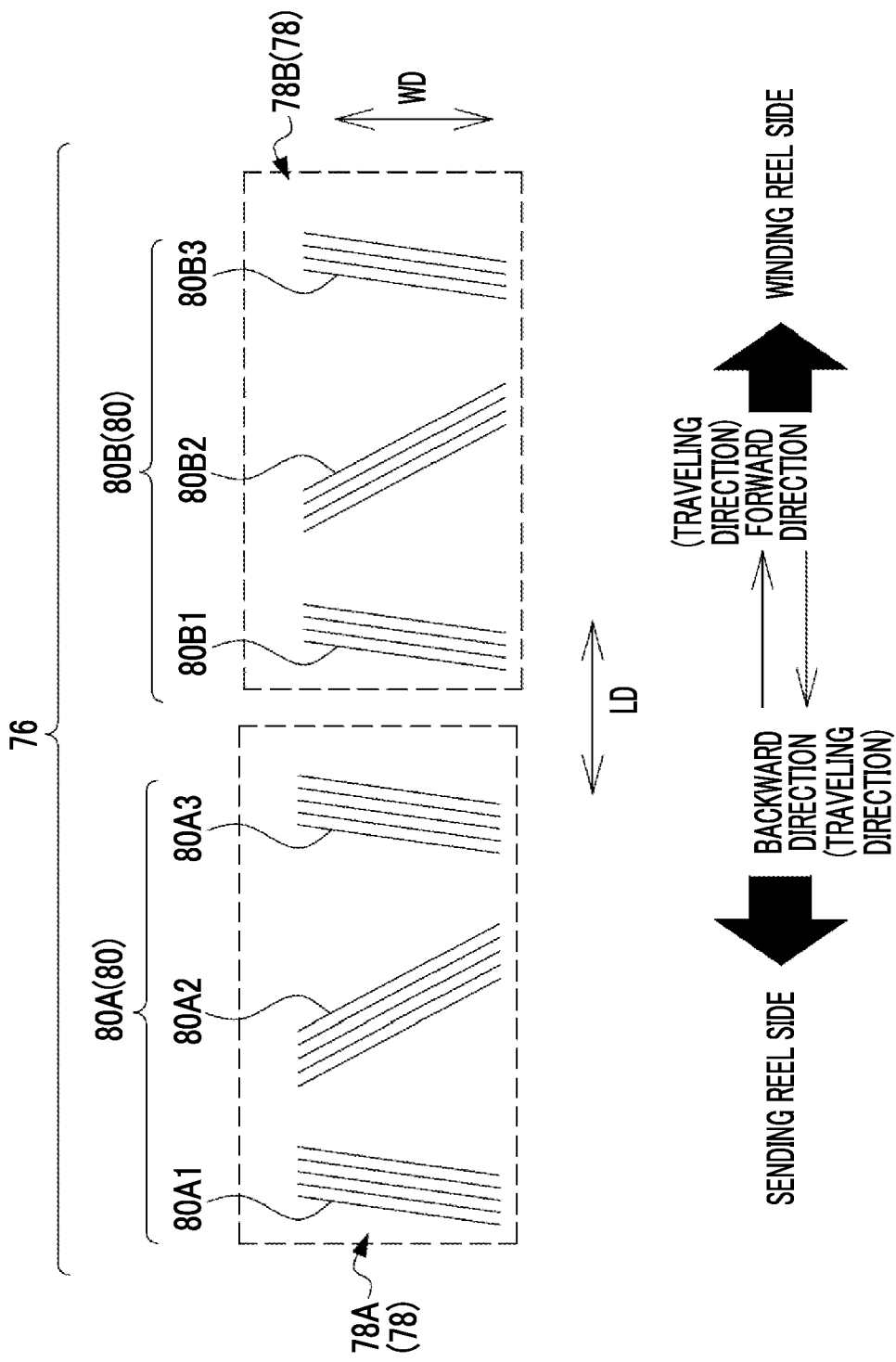
FIG. 30 is a conceptual diagram showing the seventh modification example, and is a conceptual diagram showing an example of an aspect of the servo pattern included in the magnetic tape.

As an example, as shown in FIG. 30, the servo pattern 78 consists of a linear magnetization region group 80. The linear magnetization region group 80 is classified into a linear magnetization region group 80A and a linear magnetization region group 80B.

The servo pattern 78A consists of the linear magnetization region group 80A. The linear magnetization region group 80A consists of linear magnetization regions 80A1, 80A2, and 80A3. The linear magnetization regions 80A1, 80A2, and 80A3 are disposed in a state of being adjacent to each other along the longitudinal direction LD of the magnetic tape MT. The linear magnetization regions 80A1, 80A2, and 80A3 are disposed in the order of the linear magnetization regions 80A1, 80A2, and 80A3 from the upstream side in the forward direction.

The linear magnetization regions 80A1 and 80A2 are configured in the same manner as the linear magnetization region pair 74A shown in FIG. 30, and have the same geometrical characteristics as the linear magnetization region pair 74A. That is, the linear magnetization region 80A1 is configured in the same manner as the linear magnetization region 74A1 shown in FIG. 30, and has the same geometrical characteristic as the linear magnetization region 74A1, and the linear magnetization region 80A2 is configured in the same manner as the linear magnetization region 74A2 shown in FIG. 30, and has the same geometrical characteristic as the linear magnetization region 74A2.

In addition, the linear magnetization region 80A3 is configured in the same manner as the linear magnetization region 80A1, and has the same geometrical characteristic as the linear magnetization region 80A1.

The servo pattern 78B consists of the linear magnetization region group 80B. The linear magnetization region group 80B consists of linear magnetization regions 80B1, 80B2, and 80B3. The linear magnetization regions 80B1, 80B2, and 80B3 are disposed in a state of being adjacent to each other along the longitudinal direction LD of the magnetic tape MT. The linear magnetization regions 80B1, 80B2, and 80B3 are disposed in the order of the linear magnetization regions 80B1, 80B2, and 80B3 from the upstream side in the forward direction.

The linear magnetization regions 80B1 and 80B2 are configured in the same manner as the linear magnetization region pair 74B shown in FIG. 30, and have the same geometrical characteristics as the linear magnetization region pair 74B. That is, the linear magnetization region 80B1 is configured in the same manner as the linear magnetization region 74B1 shown in FIG. 30, and has the same geometrical characteristic as the linear magnetization region 74B1, and the linear magnetization region 80B2 is configured in the same manner as the linear magnetization region 74B2 shown in FIG. 30, and has the same geometrical characteristic as the linear magnetization region 74B2.

In addition, the linear magnetization region 80B3 is configured in the same manner as the linear magnetization region 80B1, and has the same geometrical characteristic as the linear magnetization region 80B1.

Eighth Modification Example

Figure 31:
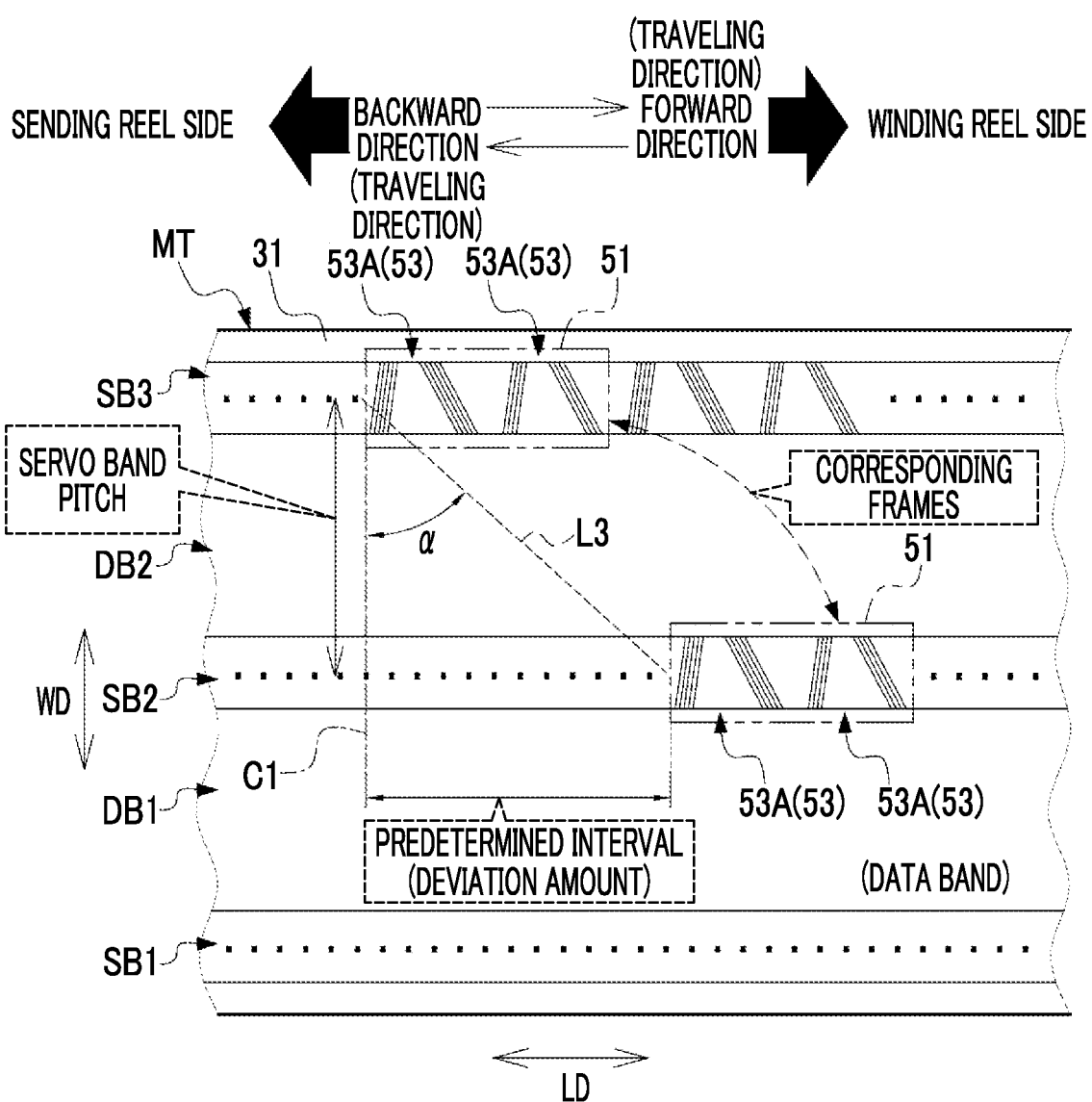
FIG. 31 is a conceptual diagram showing an eighth modification example, and is a conceptual diagram showing an example of an aspect in which a state in which the frames corresponding to each other between the servo bands adjacent to each other in the width direction of the magnetic tape according to the embodiment deviate from each other at the predetermined interval is observed from the front surface side of the magnetic tape.

In the fifth modification example described above, the form example has been described in which the predetermined interval is defined based on the angle $\alpha$, the servo band pitch, and the frame length, but the technology of the present disclosure is not limited to this, and the predetermined interval may be defined without using the frame length. For example, as shown in FIG. 31, the predetermined interval is defined based on the angle $\alpha$ formed by the interval between the frames 51 having a correspondence relationship between the servo bands SB adjacent to each other in the width direction WD (in the example shown in FIG. 31, a line segment L3) and the imaginary straight line C1, and the pitch between the servo bands SB adjacent to each other in the width direction WD (that is, the servo band pitch). In this case, for example, the predetermined interval is calculated from Expression (2).

(Predetermined interval)=(Servo band pitch)×tan $\alpha$    (2)

As described above, Expression (2) does not include the frame length. This means that the predetermined interval is calculated even in a case in which the frame length is not considered. Therefore, with the present configuration, the predetermined interval can be calculated more easily than in a case of calculating the predetermined interval from Expression (1).

Ninth Modification Example

It should be noted that, in the fifth modification example described above, the form example has been described in which the servo band SB is divided by a plurality of frames 51 along the longitudinal direction LD of the magnetic tape MT, but the technology of the present disclosure is not limited to this. For example, as shown in FIG. 32, the servo band SB may be divided by a frame 82 along the longitudinal direction LD of the magnetic tape MT.

The frame 82 is defined by a set of servo patterns 84. A plurality of servo patterns 84 are recorded in the servo band SB along the longitudinal direction LD of the magnetic tape MT.

The plurality of servo patterns 84 are disposed at regular intervals along the longitudinal direction LD of the magnetic tape MT, similarly to the plurality of servo patterns 52 (see FIG. 6) recorded in the magnetic tape MT.

Figure 32:
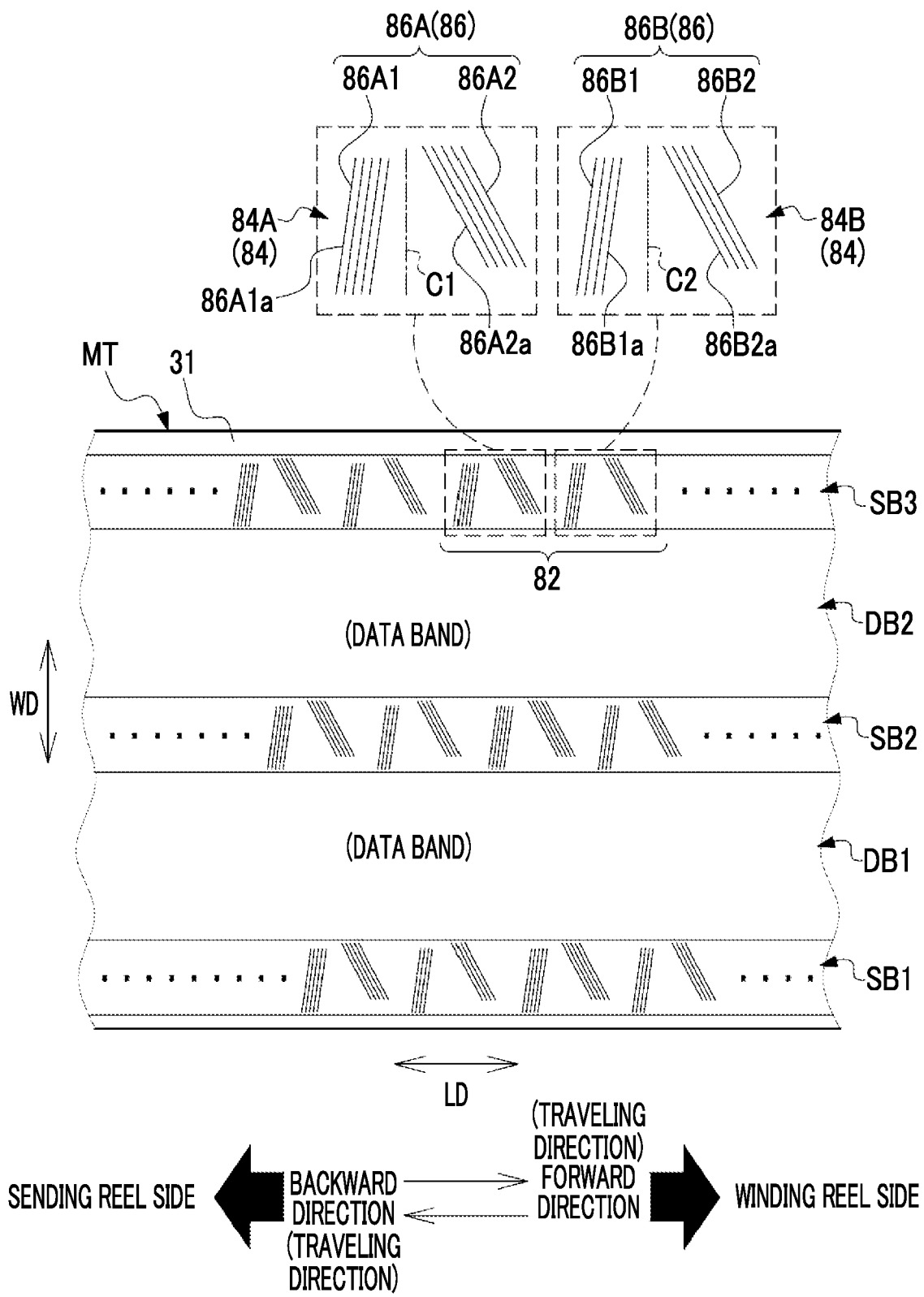
FIG. 32 is a conceptual diagram showing a ninth modification example, and is a conceptual diagram showing a modification example of the magnetic tape according to the embodiment (conceptual diagram showing an example of an aspect in which the magnetic tape is observed from the front surface side of the magnetic tape)

In the example shown in FIG. 32, servo patterns 84A and 84B are shown as an example of the set of servo patterns 84 included in the frame 82. The servo patterns 84A and 84B are adjacent to each other along the longitudinal direction LD of the magnetic tape MT, and the servo pattern 84A is positioned on the upstream side in the forward direction in the frame 82, and the servo pattern 84B is positioned on the downstream side in the forward direction.

The servo pattern 84A consists of the linear magnetization region pair 86A. In the example shown in FIG. 32, a pair of linear magnetization regions 86A1 and 86A2 is shown as an example of the linear magnetization region pair 86A. Each of the linear magnetization regions 86A1 and 86A2 is a linearly magnetized region.

The linear magnetization regions 86A1 and 86A2 are inclined in opposite directions with respect to the imaginary straight line C1. The linear magnetization regions 86A1 and 86A2 are not parallel to each other and are inclined at different angles with respect to the imaginary straight line C1. The linear magnetization region 86A1 has a steeper inclined angle with respect to the imaginary straight line C1 than the linear magnetization region 86A2. Here, "steep" means that, for example, an angle of the linear magnetization region 86A1 with respect to the imaginary straight line C1 is smaller than an angle of the linear magnetization region 86A2 with respect to the imaginary straight line C1.

In addition, the overall position of the linear magnetization region 86A1 and the overall position of the linear magnetization region 86A2 deviate from each other in the width direction WD. That is, the position of one end of the linear magnetization region 86A1 and the position of one end of the linear magnetization region 86A2 are not uniform in the width direction WD, and the position of the other end of the linear magnetization region 86A1 and the position of the other end of the linear magnetization region 86A2 are not uniform in the width direction WD.

In the servo pattern 84A, a plurality of magnetization straight lines 86A1a are included in the linear magnetization region 86A1, and a plurality of magnetization straight lines 86A2a are included in the linear magnetization region 86A2. The number of the magnetization straight lines 86A1a included in the linear magnetization region 86A1 is the same as the number of the magnetization straight lines 86A2a included in the linear magnetization region 86A2.

The linear magnetization region 86A1 is a set of magnetization straight lines 86A1a, which are five magnetized straight lines, and the linear magnetization region 86A2 is a set of magnetization straight lines 86A2a, which are five magnetized straight lines.

In the servo band SB, the position of one end of each of all the magnetization straight lines 86A1a included in the linear magnetization region 86A1 in the width direction WD is aligned, and the position of the other end of each of all the magnetization straight lines 86A1a included in the linear magnetization region 86A1 in the width direction WD is also aligned. In addition, in the servo band SB, the position of one end of each of all the magnetization straight lines 86A2a included in the linear magnetization region 86A2 in the width direction WD is aligned, and the position of the other end of each of all the magnetization straight lines 86A2a included in the linear magnetization region 86A2 in the width direction WD is also aligned.

The servo pattern 84B consists of the linear magnetization region pair 86B. In the example shown in FIG. 32, a pair of linear magnetization regions 86B1 and 86B2 is shown as an example of the linear magnetization region pair 86B. Each of the linear magnetization regions 86B1 and 86B2 is a linearly magnetized region.

The linear magnetization regions 86B1 and 86B2 are inclined in opposite directions with respect to the imaginary straight line C2. The linear magnetization regions 86B1 and 86B2 are not parallel to each other and are inclined at different angles with respect to the imaginary straight line C2. The linear magnetization region 86B1 has a steeper inclined angle with respect to the imaginary straight line C2 than the linear magnetization region 86B2. Here, "steep" means that, for example, an angle of the linear magnetization region 86B1 with respect to the imaginary straight line C2 is smaller than an angle of the linear magnetization region 86B2 with respect to the imaginary straight line C2.

In addition, the overall position of the linear magnetization region 86B1 and the overall position of the linear magnetization region 86B2 deviate from each other in the width direction WD. That is, the position of one end of the linear magnetization region 86B1 and the position of one end of the linear magnetization region 86B2 are not uniform in the width direction WD, and the position of the other end of the linear magnetization region 86B1 and the position of the other end of the linear magnetization region 86B2 are not uniform in the width direction WD.

In the servo pattern 84B, a plurality of magnetization straight lines 86B1a are included in the linear magnetization region 86B1, and a plurality of magnetization straight lines 86B2a are included in the linear magnetization region 86B2. The number of the magnetization straight lines 86B 1a included in the linear magnetization region 86B1 is the same as the number of the magnetization straight lines 86B2a included in the linear magnetization region 86B2.

The total number of the magnetization straight lines 86B 1a and 86B2a included in the servo pattern 84B is different from the total number of the magnetization straight lines 86A1a and 86A2a included in the servo pattern 84A. In the example shown in FIG. 38, the total number of the magnetization straight lines 86A1a and 86A2a included in the servo pattern 84A is ten, whereas the total number of the magnetization straight lines 86B1a and 86B2a included in the servo pattern 84B is eight.

The linear magnetization region 86B1 is a set of magnetization straight lines 86B1a, which are four magnetized straight lines, and the linear magnetization region 86B2 is a set of magnetization straight lines 86B2a, which are four magnetized straight lines.

In the servo band SB, the position of one end of each of all the magnetization straight lines 86B 1a included in the linear magnetization region 86B1 in the width direction WD is aligned, and the position of the other end of each of all the magnetization straight lines 86B1a included in the linear magnetization region 86B1 in the width direction WD is also aligned. In addition, in the servo band SB, the position of one end of each of all the magnetization straight lines 86B2a included in the linear magnetization region 86B2 in the width direction WD is aligned, and the position of the other end of each of all the magnetization straight lines 86B2a included in the linear magnetization region 86B2 in the width direction WD is also aligned.

It should be noted that, here, the set of magnetization straight lines 86A1a, which are five magnetized straight lines, is described as an example of the linear magnetization region 86A1, the set of magnetization straight lines 86A2a, which are five magnetized straight lines, is described as an example of the linear magnetization region 86A2, the set of magnetization straight lines 86B 1a, which are four magnetized straight lines, is described as an example of the linear magnetization region 86B1, and the set of magnetization straight lines 86B2a, which are four magnetized straight lines, is described as an example of the linear magnetization region 86B2, but the technology of the present disclosure is not limited thereto. For example, the linear magnetization region 86A1 need only have the number of the magnetization straight lines 86A1a that contribute to specifying the position of the magnetic head 28 on the magnetic tape MT, the linear magnetization region 86A2 need only have the number of the magnetization straight lines 86A2a that contribute to specifying the position of the magnetic head 28 on the magnetic tape MT, the linear magnetization region 86B1 need only have the number of the magnetization straight lines 86B 1a that contribute to specifying the position of the magnetic head 28 on the magnetic tape MT, and the linear magnetization region 86B2 need only have the number of the magnetization straight lines 86B2a that contribute to specifying the position of the magnetic head 28 on the magnetic tape MT.

Here, the geometrical characteristic of the linear magnetization region pair 86A on the magnetic tape MT will be described with reference to FIG. 28.

Figure 33:
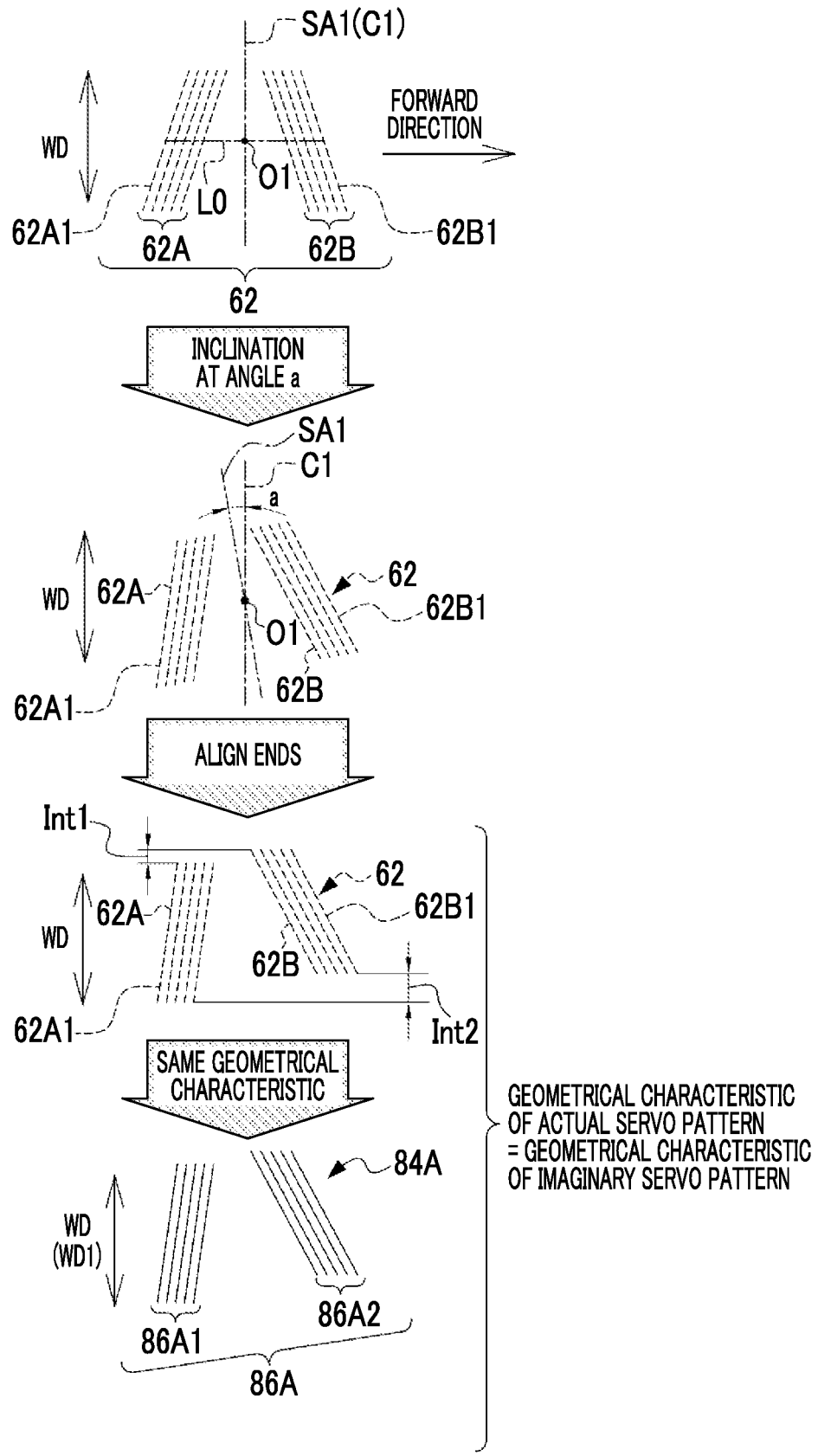
FIG. 33 is a conceptual diagram showing the ninth modification example, and is a conceptual diagram showing the relationship between the geometrical characteristic of the actual servo pattern and the geometrical characteristic of the imaginary servo pattern.

As an example, as shown in FIG. 33, the geometrical characteristic of the linear magnetization region pair 86A on the magnetic tape MT can be expressed by using an imaginary linear region pair 62. Here, the entirety of the imaginary linear region pair 62 is inclined with respect to the imaginary straight line C1 by inclining the symmetry axis SA1 of the imaginary linear regions 62A and 62B at an angle α (for example, 10 degrees) with respect to the imaginary straight line C1 with the center O1 as the rotation axis. Moreover, the position of one end of each of all the straight lines 62A1 included in the imaginary linear region 62A of the imaginary linear region pair 62 in this state in the width direction WD is aligned, and the position of the other end of each of all the straight lines 62A1 included in the imaginary linear region 62A in the width direction WD is also aligned. In addition, similarly, the position of one end of each of all the straight lines 62B1 included in the imaginary linear region 62B of the imaginary linear region pair 62 in the width direction WD is aligned, and the position of the other end of each of all the straight lines 62B1 included in the imaginary linear region 62B in the width direction WD is also aligned. As a result, the imaginary linear region 62A and the imaginary linear region 62B deviate from each other in the width direction WD.

That is, one end of the imaginary linear region 62A and one end of the imaginary linear region 62B deviate from each other in the width direction WD at a regular interval Int1, and the other end of the imaginary linear region 62A and the other end of the imaginary linear region 62B deviate from each other in the width direction WD at a regular interval Int2.

The geometrical characteristic of the imaginary linear region pair 62 (that is, the geometrical characteristic of the imaginary servo pattern) obtained as described above corresponds to the geometrical characteristic of the actual servo pattern 84A. That is, the geometrical characteristic of the linear magnetization region pair 86A on the magnetic tape MT corresponds to the geometrical characteristic based on the imaginary linear region pair 62 inclined line-symmetrically with respect to the imaginary straight line C1 in a case in which the entirety of the imaginary linear region pair 62 is inclined with respect to the imaginary straight line C1 by inclining a symmetry axis SA1 of the imaginary linear region 62A and the imaginary linear region 62B with respect to the imaginary straight line C1.

The imaginary linear region 62A corresponds to the linear magnetization region 86A1 of the servo pattern 84A, and the imaginary linear region 62B corresponds to the linear magnetization region 86A2 of the servo pattern 84A. Therefore, in the servo band SB, the servo pattern 84A consisting of the linear magnetization region pair 86A in which one end of the linear magnetization region 86A1 and one end of the linear magnetization region 86A2 deviate from each other in the width direction WD at the regular interval Int1, and the other end of the linear magnetization region 86A1 and the other end of the linear magnetization region 86A2 deviate from each other in the width direction WD at the regular interval Int2 is recorded (see FIG. 32).

It should be noted that the linear magnetization region pair 86B is different from the linear magnetization region pair 86A only in that the four magnetization straight lines 86B1a are provided instead of the five magnetization straight lines 86A1a and the four magnetization straight lines 86B2a are provided instead of the five magnetization straight lines 86A2a (see FIG. 32). Therefore, in the servo band SB, the servo pattern 84B consisting of the linear magnetization region pair 86B in which one end of the linear magnetization region 86B1 and one end of the linear magnetization region 86B2 deviate from each other in the width direction WD at the regular interval Int1, and the other end of the linear magnetization region 86B1 and the other end of the linear magnetization region 86B2 deviate from each other in the width direction WD at the regular interval Int2 is recorded (see FIG. 32).

Figure 34:
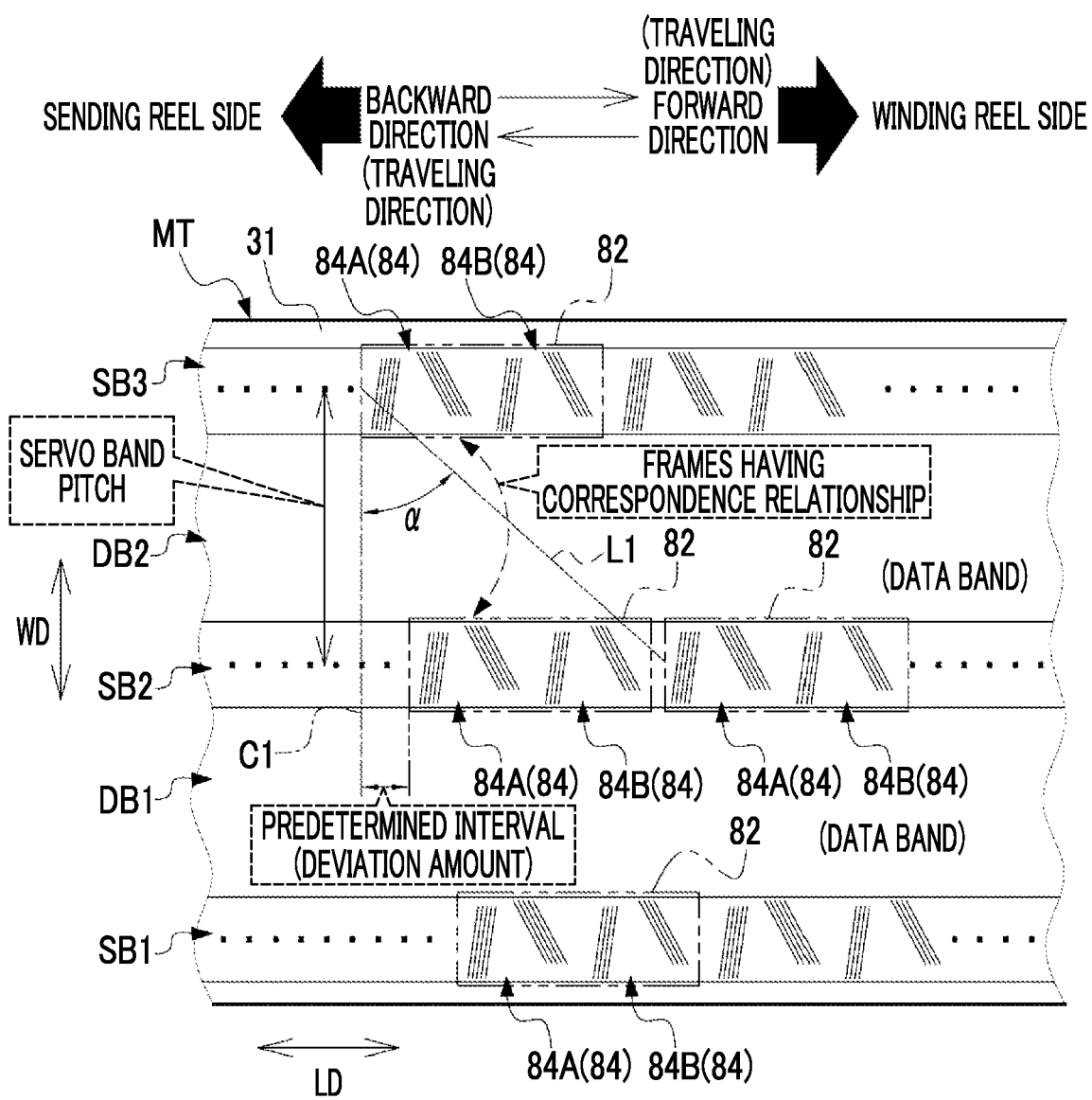
FIG. 34 is a conceptual diagram showing the ninth modification example, and is a conceptual diagram showing an example of an aspect in which a state in which the frames corresponding to each other between the servo bands adjacent to each other in the width direction of the magnetic tape deviate from each other at the predetermined interval is observed from the front surface side of the magnetic tape.

As an example, as shown in FIG. 34, the plurality of servo bands SB are formed on the magnetic tape MT in the width direction WD, and the frames 82 having a correspondence relationship between the servo bands SB deviate from each other at predetermined intervals in the longitudinal direction LD, between the servo bands SB adjacent to each other in the width direction WD of the magnetic tape MT. This means that the servo patterns 84 having a correspondence relationship between the servo bands SB deviate from each other at the predetermined interval described in the first modification example in the longitudinal direction LD between the servo bands SB adjacent to each other in the width direction WD of the magnetic tape MT. The predetermined interval is defined by Expression (1).

Figure 35:
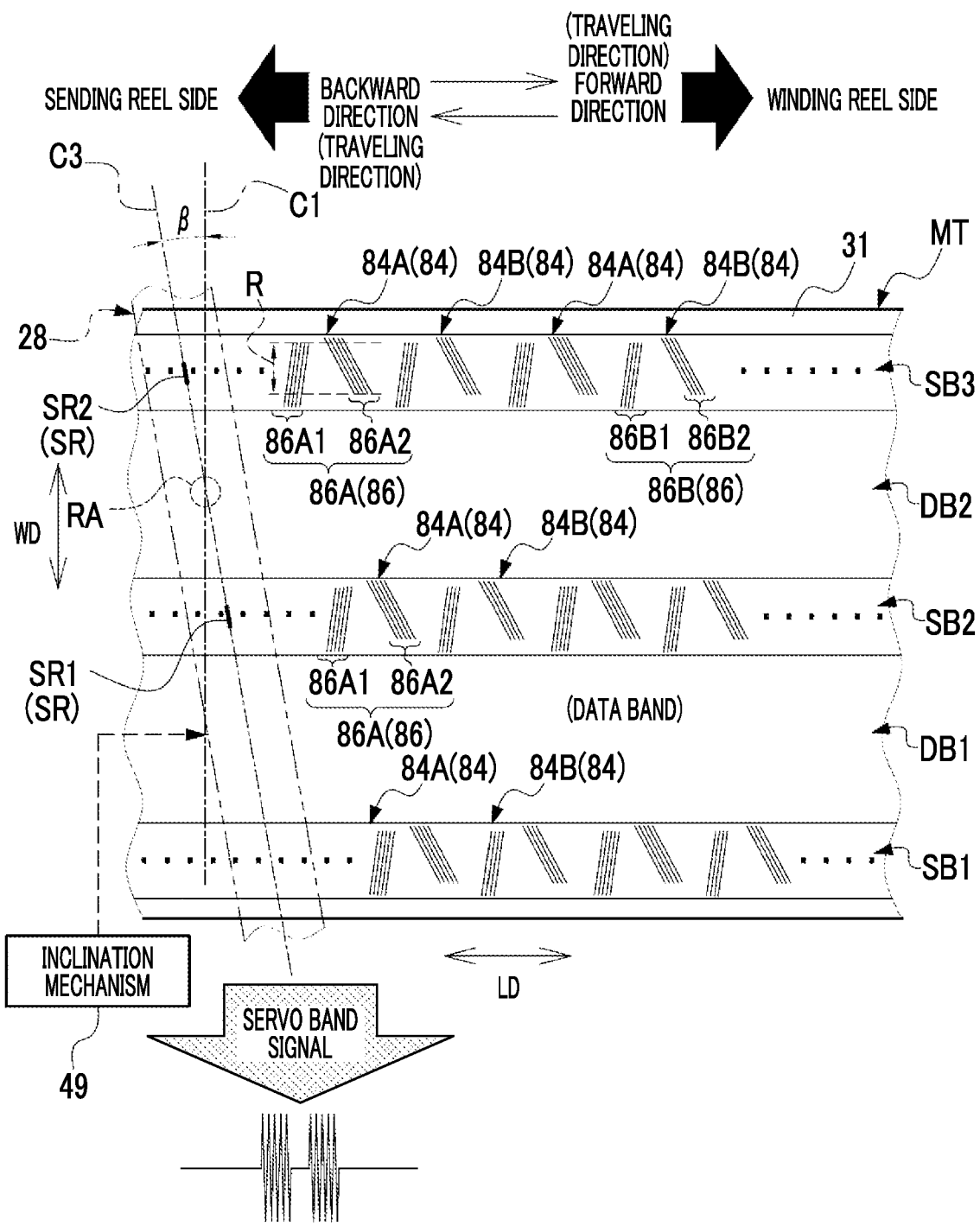
FIG. 35 is a conceptual diagram showing the ninth modification example, and is a conceptual diagram showing an example of an aspect in which a state in which the servo pattern is read by the servo reading element provided in the magnetic head that is skewed on the magnetic tape is observed from the front surface side of the magnetic tape.

Similarly to the fifth modification example described above, in the seventh modification example, as shown in FIG. 35 as an example, the inclination mechanism 49 skews the magnetic head 28 on the magnetic tape MT around the rotation axis RA such that the imaginary straight line C3 is inclined with respect to the imaginary straight line C1 to the upstream side in the forward direction at an angle β (that is, the angle β counterclockwise as viewed from the paper surface side of FIG. 35). That is, the magnetic head 28 is inclined at the angle β to the upstream side in the forward direction on the magnetic tape MT. In this state, in a case in which the servo pattern 84A is read by the servo reading element SR along the longitudinal direction LD within a range R in which the linear magnetization regions 86A1 and 86A2 overlap with each other in the width direction WD, the variation due to the azimuth loss between the servo pattern signal derived from the linear magnetization region 86A1 and the servo pattern signal derived from the linear magnetization region 86A2 is smaller than in the examples shown in FIG. 34. In addition, also in a case in which the servo pattern 84B (that is, the linear magnetization region pair 86B) is read by the servo reading element SR, similarly, the variation due to the azimuth loss between the servo pattern signal derived from the linear magnetization region 86B1 and the servo pattern signal derived from the linear magnetization region 86B2 is small.

Tenth Modification Example

Figure 36:
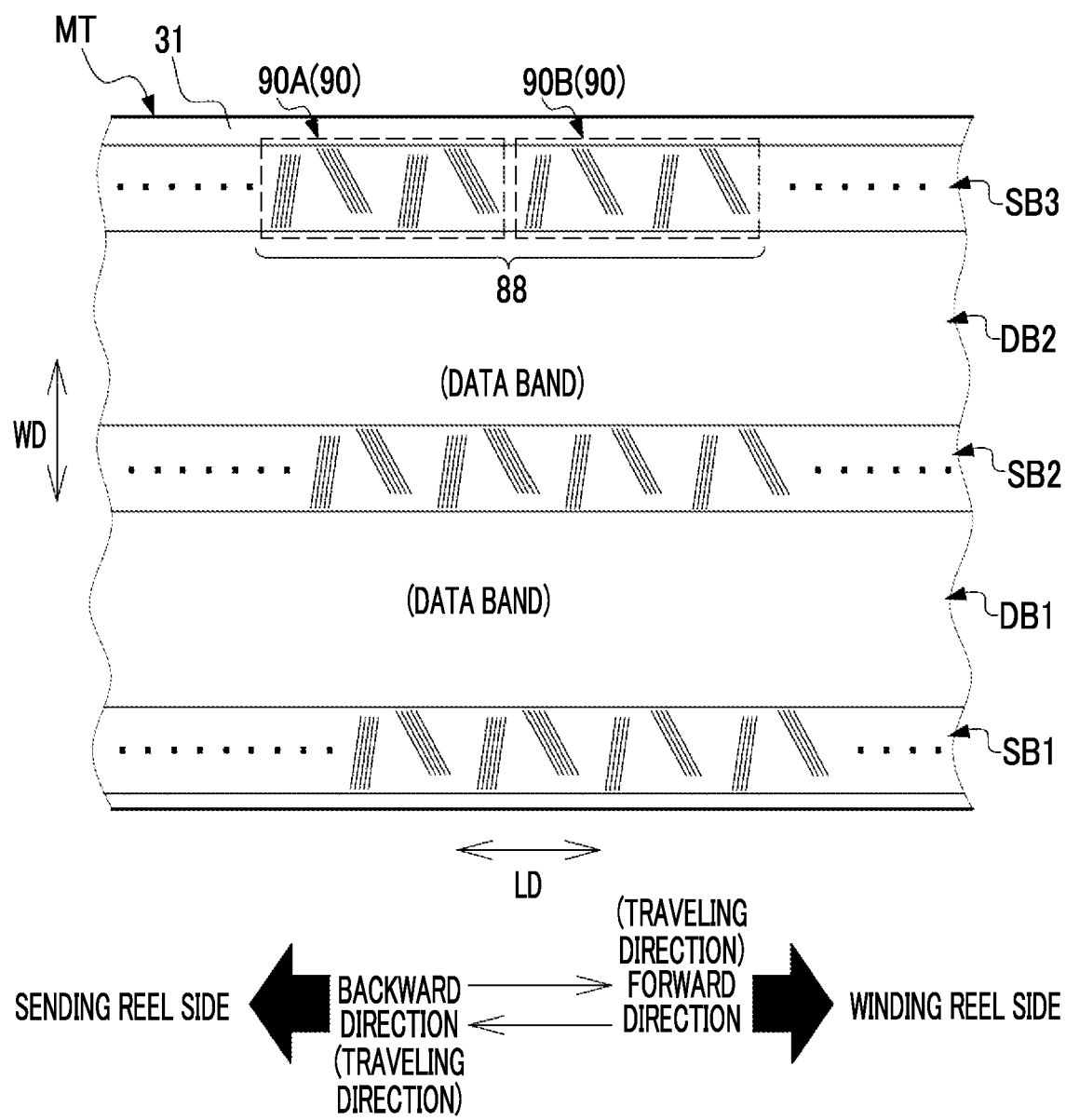
FIG. 36 is a conceptual diagram showing a tenth modification example, and is a conceptual diagram showing a modification example of the magnetic tape according to the embodiment (conceptual diagram showing an example of an aspect in which the magnetic tape is observed from the front surface side of the magnetic tape)

It should be noted that, in the ninth modification example described above, the form example has been described in which the servo band SB is divided by a plurality of frames 82 along the longitudinal direction LD of the magnetic tape MT, but the technology of the present disclosure is not limited to this. For example, as shown in FIG. 36, the servo band SB may be divided by a frame 88 along the longitudinal direction LD of the magnetic tape MT. The frame 88 is defined by a set of servo patterns 90. A plurality of servo patterns 90 are recorded in the servo band SB along the longitudinal direction LD of the magnetic tape MT. Similarly to the plurality of servo patterns 84 (see FIG. 32), the plurality of servo patterns 90 are disposed at regular intervals along the longitudinal direction LD of the magnetic tape MT.

In the example shown in FIG. 36, a pair of servo patterns 90A and 90B is shown as an example of the set of servo patterns 90. Each of the servo patterns 90A and 90B is an M-shaped magnetized servo pattern. The servo patterns 90A and 90B are adjacent to each other along the longitudinal direction LD of the magnetic tape MT, and the servo pattern 90A is positioned on the upstream side in the forward direction in the frame 88, and the servo pattern 90B is positioned on the downstream side in the forward direction.

Figure 37:
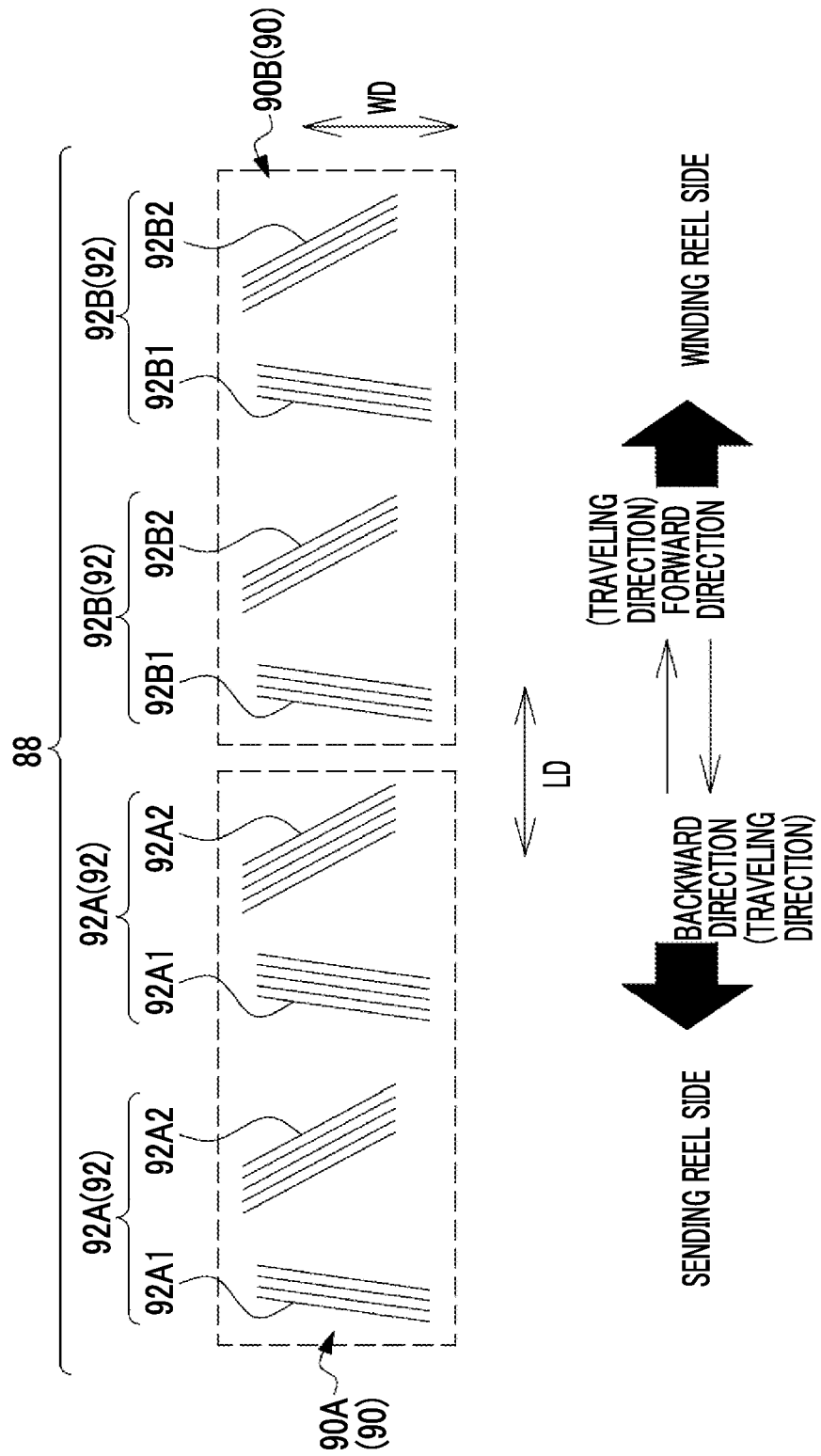
FIG. 37 is a conceptual diagram showing the tenth modification example, and is a conceptual diagram showing an example of an aspect of the servo pattern included in the magnetic tape.

As an example, as shown in FIG. 37, the servo pattern 90 consists of a linear magnetization region pair 92. The linear magnetization region pair 92 is classified into a linear magnetization region pair 92A and a linear magnetization region pair 92B.

The servo pattern 90A consists of a set of linear magnetization region pairs 92A. The set of linear magnetization region pairs 92A are disposed in a state of being adjacent to each other along the longitudinal direction LD of the magnetic tape MT.

In the example shown in FIG. 37, a pair of linear magnetization regions 92A1 and 92A2 is shown as an example of the linear magnetization region pair 92A. The linear magnetization region pair 92A is configured in the same manner as the linear magnetization region pair 86A (see FIG. 32) described in the ninth modification example, and has the same geometrical characteristic as the linear magnetization region pair 86A. That is, the linear magnetization region 92A1 is configured in the same manner as the linear magnetization region 86A1 (see FIG. 32) described in the ninth modification example and has the same geometrical characteristic as the linear magnetization region 86A1, and the linear magnetization region 92A2 is configured in the same manner as the linear magnetization region 86A2 (see FIG. 32) described in the ninth modification example and has the same geometrical characteristic as the linear magnetization region 86A2.

The servo pattern 90B consists of a set of linear magnetization region pairs 92B. The set of linear magnetization region pairs 92B are disposed in a state of being adjacent to each other along the longitudinal direction LD of the magnetic tape MT.

In the example shown in FIG. 37, a pair of linear magnetization regions 92B1 and 92B2 is shown as an example of the linear magnetization region pair 92B. The linear magnetization region pair 92B is configured in the same manner as the linear magnetization region pair 86B (see FIG. 32) described in the ninth modification example, and has the same geometrical characteristic as the linear magnetization region pair 86B. That is, the linear magnetization region 92B1 is configured in the same manner as the linear magnetization region 86B1 (see FIG. 32) described in the ninth modification example and has the same geometrical characteristic as the linear magnetization region 86B1, and the linear magnetization region 92B2 is configured in the same manner as the linear magnetization region 86B2 (see FIG. 32) described in the ninth modification example and has the same geometrical characteristic as the linear magnetization region 86B2.

Eleventh Modification Example

Figure 38:
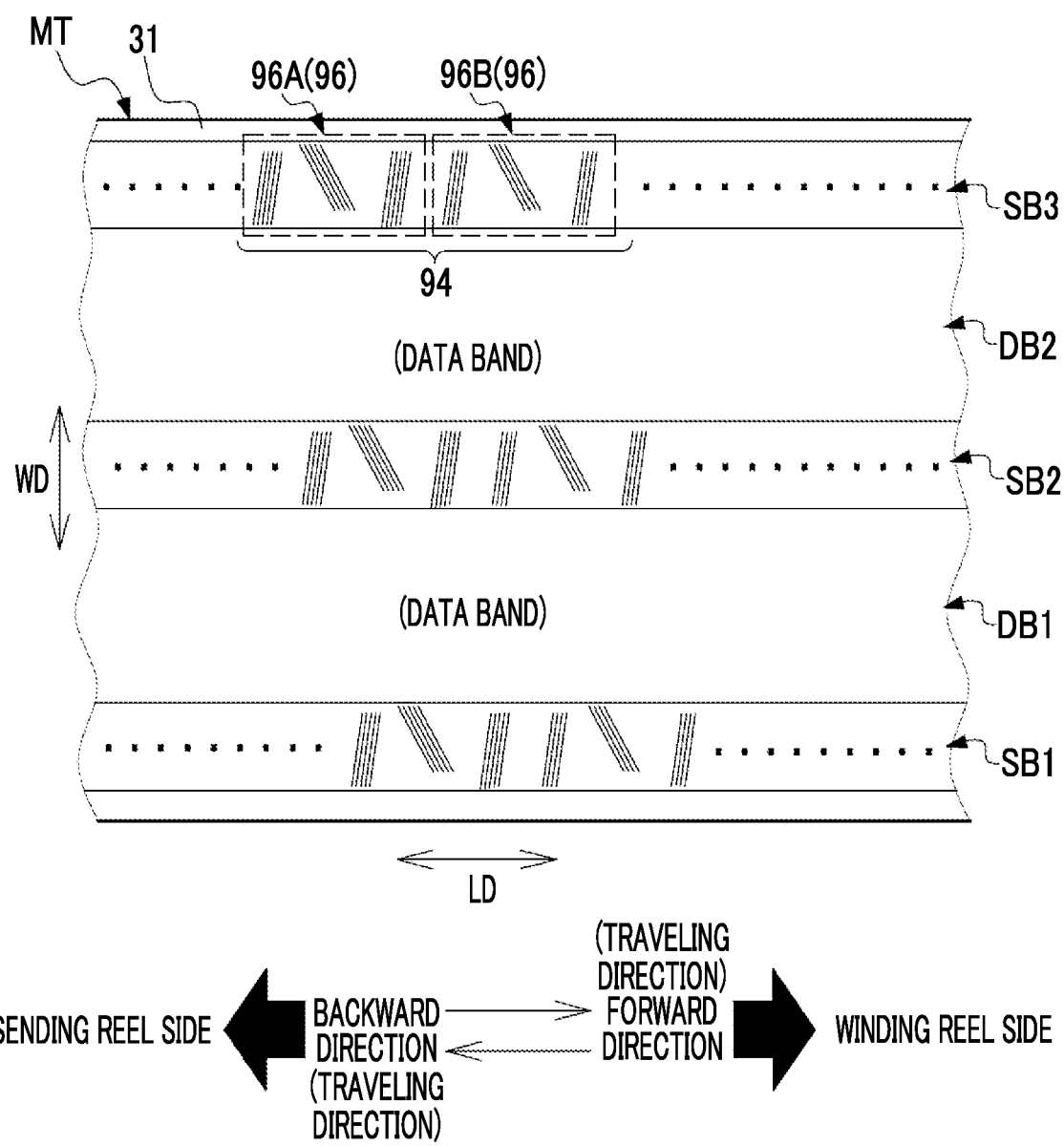
FIG. 38 is a conceptual diagram showing an eleventh modification example, and is a conceptual diagram showing a modification example of the magnetic tape according to the embodiment (conceptual diagram showing an example of an aspect in which the magnetic tape is observed from the front surface side of the magnetic tape)

In the example shown in FIG. 36, the form example has been described in which the servo band SB is divided by a plurality of frames 88 along the longitudinal direction LD of the magnetic tape MT, but the technology of the present disclosure is not limited to this. For example, as shown in FIG. 38, the servo band SB may be divided by a frame 94 along the longitudinal direction LD of the magnetic tape MT. The frame 94 is defined by a set of servo patterns 96. A plurality of servo patterns 96 are recorded in the servo band SB along the longitudinal direction LD of the magnetic tape MT. Similarly to the plurality of servo patterns 90 (see FIG. 36), the plurality of servo patterns 96 are disposed at regular intervals along the longitudinal direction LD of the magnetic tape MT.

In the example shown in FIG. 38, servo patterns 96A and 96B are shown as an example of the set of servo patterns 96. Each of the servo patterns 96A and 96B is an N-shaped magnetized servo pattern. The servo patterns 96A and 96B are adjacent to each other along the longitudinal direction LD of the magnetic tape MT, and the servo pattern 96A is positioned on the upstream side in the forward direction in the frame 94, and the servo pattern 96B is positioned on the downstream side in the forward direction.

Figure 39:
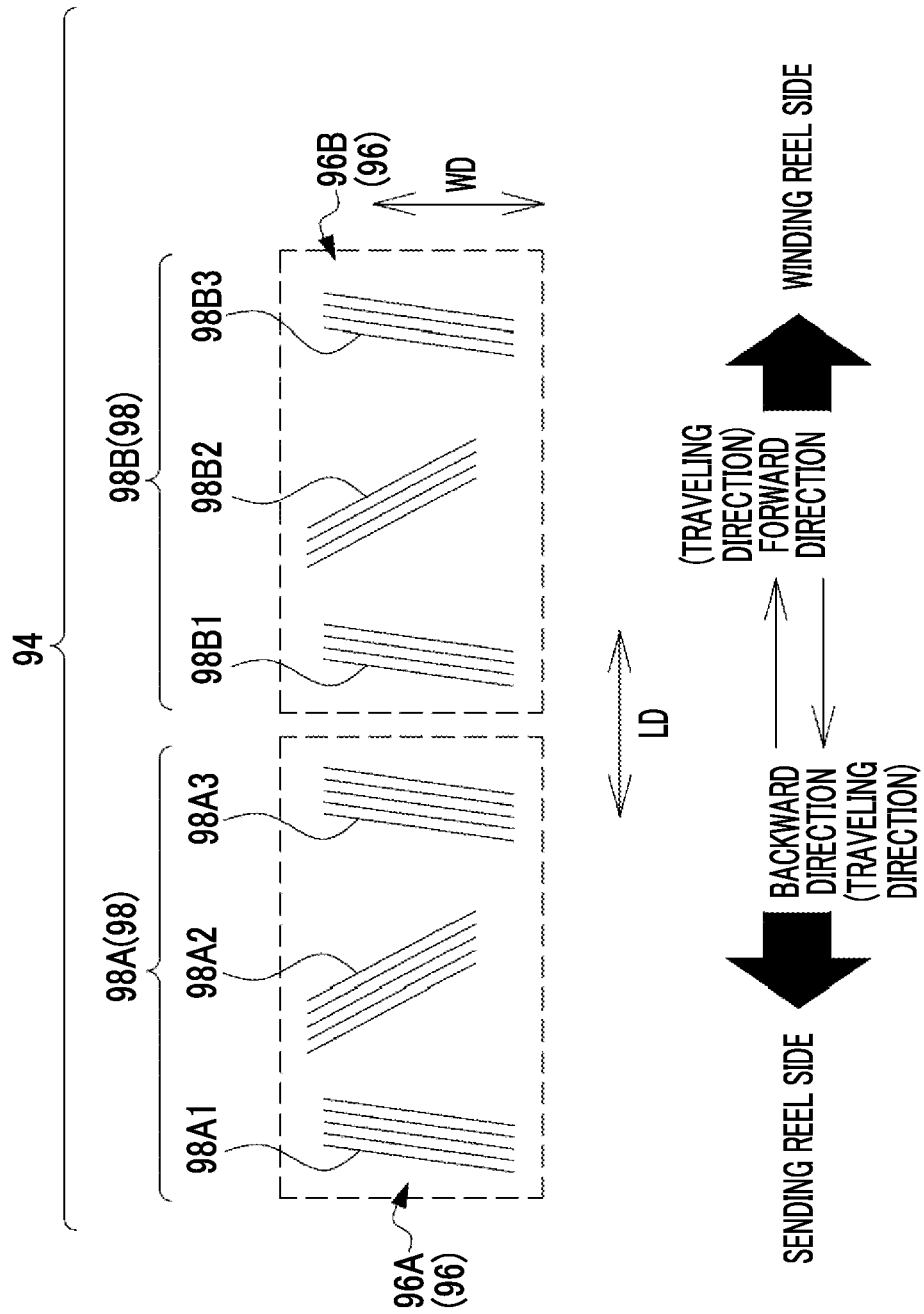
FIG. 39 is a conceptual diagram showing the eleventh modification example, and is a conceptual diagram showing an example of an aspect of the servo pattern included in the magnetic tape.

As an example, as shown in FIG. 39, the servo pattern 96 consists of a linear magnetization region group 98. The linear magnetization region group 98 is classified into a linear magnetization region group 98A and a linear magnetization region group 98B.

The servo pattern 96A consists of the linear magnetization region group 98A. The linear magnetization region group 98A consists of linear magnetization regions 98A1, 98A2, and 98A3. The linear magnetization regions 98A1, 98A2, and 98A3 are disposed in a state of being adjacent to each other along the longitudinal direction LD of the magnetic tape MT. The linear magnetization regions 98A1, 98A2, and 98A3 are disposed in the order of the linear magnetization regions 98A1, 98A2, and 98A3 from the upstream side in the forward direction.

The linear magnetization regions 98A1 and 98A2 are configured in the same manner as the linear magnetization region pair 92A shown in FIG. 37, and have the same geometrical characteristics as the linear magnetization region pair 92A. That is, the linear magnetization region 98A1 is configured in the same manner as the linear magnetization region 92A1 shown in FIG. 37, and has the same geometrical characteristic as the linear magnetization region 92A1, and the linear magnetization region 98A2 is configured in the same manner as the linear magnetization region 92A2 shown in FIG. 37, and has the same geometrical characteristic as the linear magnetization region 92A2.

In addition, the linear magnetization region 98A3 is configured in the same manner as the linear magnetization region 92A1, and has the same geometrical characteristic as the linear magnetization region 92A1.

The servo pattern 96B consists of the linear magnetization region group 98B. The linear magnetization region group 98B consists of linear magnetization regions 98B1, 98B2, and 98B3. The linear magnetization regions 98B1, 98B2, and 98B3 are disposed in a state of being adjacent to each other along the longitudinal direction LD of the magnetic tape MT. The linear magnetization regions 98B1, 98B2, and 98B3 are disposed in the order of the linear magnetization regions 98B1, 98B2, and 98B3 from the upstream side in the forward direction.

The linear magnetization regions 98B1 and 98B2 are configured in the same manner as the linear magnetization region pair 92B shown in FIG. 37, and have the same geometrical characteristics as the linear magnetization region pair 92B. That is, the linear magnetization region 98B1 is configured in the same manner as the linear magnetization region 92B1 shown in FIG. 37, and has the same geometrical characteristic as the linear magnetization region 92B1, and the linear magnetization region 98B2 is configured in the same manner as the linear magnetization region 92B2 shown in FIG. 37, and has the same geometrical characteristic as the linear magnetization region 92B2.

In addition, the linear magnetization region 98B3 is configured in the same manner as the linear magnetization region 92B1, and has the same geometrical characteristic as the linear magnetization region 92B1.

Twelfth Modification Example

Figure 40:
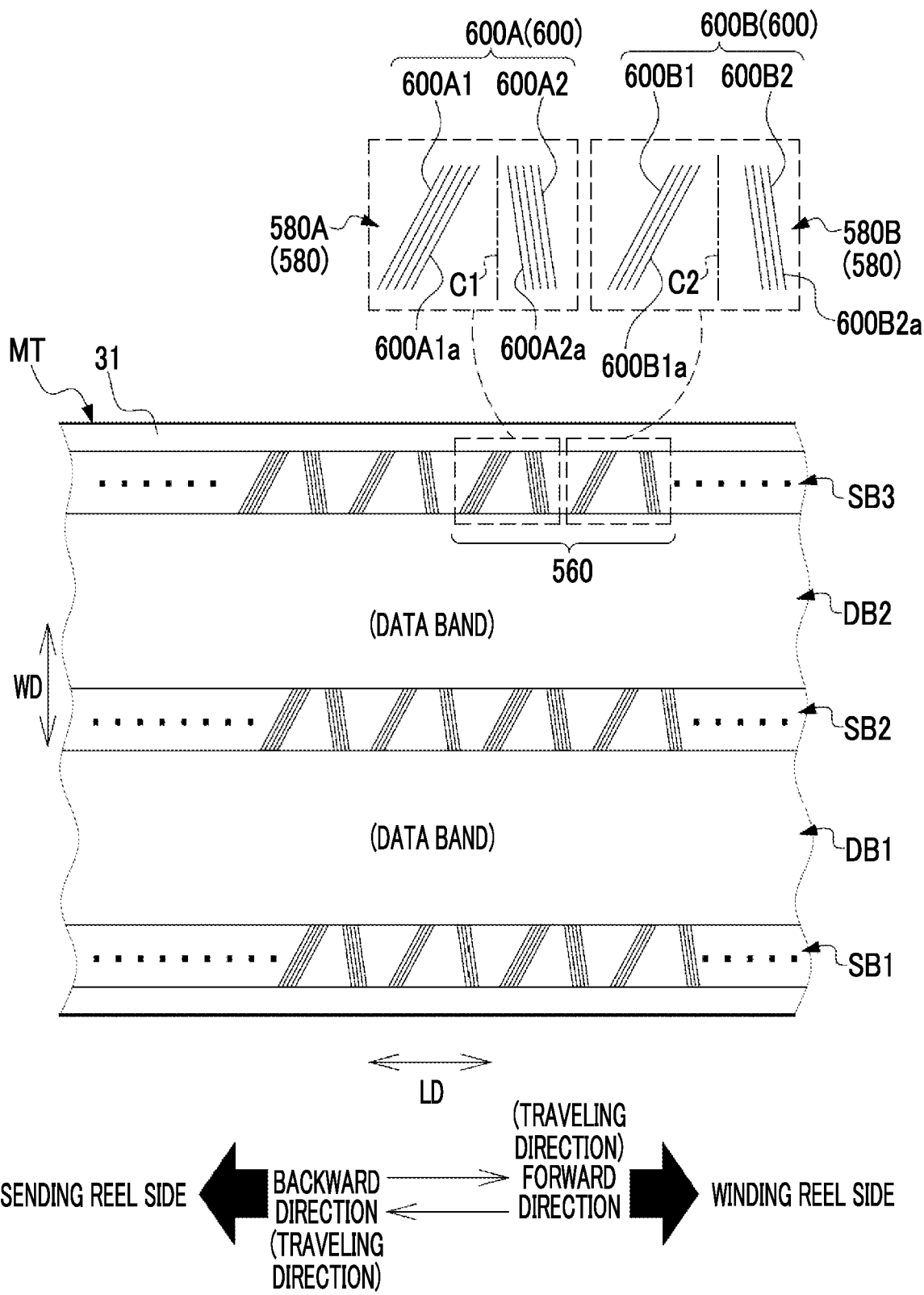
FIG. 40 is a conceptual diagram showing a twelfth modification example, and is a conceptual diagram showing a modification example of the magnetic tape according to the embodiment (conceptual diagram showing an example of an aspect in which the magnetic tape is observed from the front surface side of the magnetic tape)

It should be noted that, in the fifth modification example described above (for example, example shown in FIG. 22), the form example has been described in which the servo band SB is divided by the plurality of frames 51 along the longitudinal direction LD of the magnetic tape MT, but the technology of the present disclosure is not limited to this. For example, as shown in FIG. 40, the servo band SB may be divided by a frame 560 along the longitudinal direction LD of the magnetic tape MT. The frame 560 is defined by a set of servo patterns 580. A plurality of servo patterns 580 are recorded in the servo band SB along the longitudinal direction LD of the magnetic tape MT.

The plurality of servo patterns 580 are disposed at regular intervals along the longitudinal direction LD of the magnetic tape MT, similarly to the plurality of servo patterns 52.

The servo pattern 580 consists of a linear magnetization region pair 600. The linear magnetization region pair 600 is classified into a linear magnetization region pair 600A and a linear magnetization region pair 600B. That is, the linear magnetization region pair 600 is different from the linear magnetization region pair 60 (see FIG. 22) in that the linear magnetization region pair 600A is provided instead of the linear magnetization region pair 60A, and the linear magnetization region pair 600B is provided instead of the linear magnetization region pair 60B.

The servo pattern 580A consists of the linear magnetization region pair 600A. The linear magnetization region pair 600A is different from the linear magnetization region pair 60A in that the linear magnetization region 600A1 is provided instead of the linear magnetization region 60A1, and the linear magnetization region 600A2 is provided instead of the linear magnetization region 60A2. Each of the linear magnetization regions 600A1 and 600A2 is a linearly magnetized region.

The linear magnetization regions 600A1 and 600A2 are inclined in opposite directions with respect to the imaginary straight line C1. The linear magnetization regions 600A1 and 600A2 are not parallel to each other and are inclined at different angles with respect to the imaginary straight line C1. The linear magnetization region 600A2 has a steeper inclined angle with respect to the imaginary straight line C1 than the linear magnetization region 600A1. Here, "steep" means that, for example, an angle of the linear magnetization region 600A2 with respect to the imaginary straight line C1 is smaller than an angle of the linear magnetization region 600A1 with respect to the imaginary straight line C1. In addition, a total length of the linear magnetization region 600A2 is shorter than a total length of the linear magnetization region 600A1.

The linear magnetization region 600A1 is different from the linear magnetization region 60A1 in that a plurality of magnetization straight lines 600A1a are provided instead of the plurality of magnetization straight lines 60A1a. The linear magnetization region 600A2 is different from the linear magnetization region 60A2 in that a plurality of magnetization straight lines 600A2a are provided instead of the plurality of magnetization straight lines 60A2a.

The plurality of magnetization straight lines 600A1a are included in the linear magnetization region 600A1, and the plurality of magnetization straight lines 600A2a are included in the linear magnetization region 600A2. The number of the magnetization straight lines 600A1a included in the linear magnetization region 600A1 is the same as the number of the magnetization straight lines 600A2a included in the linear magnetization region 600A2.

The linear magnetization region 600A1 is a linear magnetization region corresponding to a first line symmetry region. The first line symmetry region refers to a region in which the linear magnetization region 60A2 (see FIG. 22) described in the fifth modification example is formed line-symmetrically with respect to the imaginary straight line C1. That is, the linear magnetization region 600A1 can be said to be a linear magnetization region formed by a geometrical characteristic of a mirror image of the linear magnetization region 60A2 (see FIG. 22) (that is, geometrical characteristic obtained by performing the mirror image with respect to the linear magnetization region 60A2 (see FIG. 22) with the imaginary straight line C1 as a line symmetry axis).

The linear magnetization region 600A2 is a linear magnetization region corresponding to a second line symmetry region. The second line symmetry region refers to a region in which the linear magnetization region 60A1 (see FIG. 22) described in the fifth modification example is formed line-symmetrically with respect to the imaginary straight line C1. That is, the linear magnetization region 600A2 can be said to be a linear magnetization region formed by a geometrical characteristic of a mirror image of the linear magnetization region 60A1 (see FIG. 22) (that is, geometrical characteristic obtained by performing the mirror image with respect to the linear magnetization region 60A1 (see FIG. 22) with the imaginary straight line C1 as a line symmetry axis).

That is, in the example shown in FIG. 23, the geometrical characteristic of the imaginary linear region pair 62 obtained by aligning the positions of both ends of the imaginary linear region 62A and the positions of both ends of the imaginary linear region 62B in a case in which the entirety of the imaginary linear region pair 62 is inclined with respect to the imaginary straight line C1 by inclining the symmetry axis SA1 of the imaginary linear regions 62A and 62B with respect to the imaginary straight line C1 at the angle α clockwise as viewed from the paper surface side of FIG. 23 with the center O1 as the rotation axis corresponds to the geometrical characteristic of the servo pattern 580A.

The servo pattern 580B consists of the linear magnetization region pair 600B. The linear magnetization region pair 600B is different from the linear magnetization region pair 60B in that the linear magnetization region 600B1 is provided instead of the linear magnetization region 60B1, and the linear magnetization region 600B2 is provided instead of the linear magnetization region 60B2. Each of the linear magnetization regions 600B1 and 600B2 is a linearly magnetized region.

The linear magnetization regions 600B1 and 600B2 are inclined in opposite directions with respect to the imaginary straight line C2. The linear magnetization regions 600B1 and 600B2 are not parallel to each other and are inclined at different angles with respect to the imaginary straight line C2. The linear magnetization region 600B2 has a steeper inclined angle with respect to the imaginary straight line C2 than the linear magnetization region 600B1. Here, "steep" means that, for example, an angle of the linear magnetization region 600B2 with respect to the imaginary straight line C2 is smaller than an angle of the linear magnetization region 600B1 with respect to the imaginary straight line C2.

The plurality of magnetization straight lines 600B1a are included in the linear magnetization region 600B1, and the plurality of magnetization straight lines 600B2a are included in the linear magnetization region 600B2. The number of the magnetization straight lines 600E 1a included in the linear magnetization region 600B1 is the same as the number of the magnetization straight lines 600B2a included in the linear magnetization region 600B2.

The total number of the magnetization straight lines 600E 1a and 600B2a included in the servo pattern 580B is different from the total number of the magnetization straight lines 600A1a and 600A2a included in the servo pattern 580A. In the example shown in FIG. 40, the total number of the magnetization straight lines 600A1a and 600A2a included in the servo pattern 580A is ten, whereas the total number of the magnetization straight lines 600B1a and 600B2a included in the servo pattern 580B is eight.

The linear magnetization region 600B1 is a set of magnetization straight lines 600B1a, which are four magnetized straight lines, and the linear magnetization region 600B2 is a set of magnetization straight lines 600B2a, which are four magnetized straight lines. In the servo band SB, the positions of both ends of the linear magnetization region 600B1 (that is, the positions of both ends of each of the four magnetization straight lines 600B1a) and the positions of both ends of the linear magnetization region 600B2 (that is, the positions of both ends of each of the four magnetization straight lines 600B2a) are aligned in the width direction WD.

As described above, the geometrical characteristic of the servo pattern 580A corresponds to the geometrical characteristic of the mirror image of the linear magnetization region 60A2 (see FIG. 22) and the geometrical characteristic of the mirror image of the linear magnetization region 60A2 (see FIG. 22) (that is, geometrical characteristic of the mirror image of the servo pattern 53A shown in FIG. 22), and the geometrical characteristic of the servo pattern 580B corresponds to the geometrical characteristic of the mirror image of the linear magnetization region 60B2 (see FIG. 22) and the geometrical characteristic of the mirror image of the linear magnetization region 60B2 (see FIG. 22) (that is, geometrical characteristic of the mirror image of the servo pattern 53B shown in FIG. 22). However, this is merely an example, and instead of the servo pattern 580, the servo pattern formed by the geometrical characteristic of the mirror image of the servo pattern 72 shown in FIG. 27, the geometrical characteristic of the mirror image of the servo pattern 78 shown in FIG. 29, the geometrical characteristic of the mirror image of the servo pattern 84 shown in FIG. 32, the geometrical characteristic of the mirror image of the servo pattern 90 shown in FIG. 36, or the geometrical characteristic of the mirror image of the servo pattern 96 shown in FIG. 38 may be applied.

It should be noted that, even in a case in which the geometrical characteristic of the servo pattern is changed in this way, the inclination mechanism 49 changes the direction of the inclination (that is, azimuth) of the imaginary straight line C3 with respect to the imaginary straight line C4 and the inclined angle (for example, angle R shown in FIG. 26) in accordance with the geometrical characteristic of the servo pattern. That is, even in a case in which the geometrical characteristic of the servo pattern is changed, in the same manner as in the example shown in FIG. 26, the inclination mechanism 49 rotates, under the control of the control device 30, the magnetic head 28 around the rotation axis RA on the front surface 31 of the magnetic tape MT to change the direction of the inclination of the imaginary straight line C3 with respect to the imaginary straight line C4 (that is, azimuth) and the inclined angle (for example, angle shown in FIG. 26) such that the variation in the servo pattern signal is reduced.

OTHER MODIFICATION EXAMPLES

In the embodiment described above, the form example has been described in which the front surface 31 of the magnetic tape MT is subjected to the magnetic processing by the magnetic head 28, but the technology of the present disclosure is not limited to this. For example, the back surface 33 of the magnetic tape MT may be formed of the surface of the magnetic layer, and the back surface 33 may be subjected to the magnetic processing by the magnetic head 28.

In the embodiment described above, the magnetic tape system 10 has been described in which the magnetic tape cartridge 12 can be inserted and removed with respect to the magnetic tape drive 14, but the technology of the present disclosure is not limited to this. For example, even in a case of the magnetic tape system in which at least one magnetic tape cartridge 12 is loaded in advance into the magnetic tape drive 14 (that is, the magnetic tape system in which at least one magnetic tape cartridge 12 and the magnetic tape drive 14 or the magnetic tape MT are integrated in advance (for example, before the data is recorded in the data band DB)), the technology of the present disclosure is established.

In the embodiment described above, the single magnetic head 28 has been described, but the technology of the present disclosure is not limited to this. For example, a plurality of magnetic heads 28 may be disposed on the magnetic tape MT. For example, the magnetic head 28 for reading and at least one magnetic head 28 for writing may be disposed on the magnetic tape MT. The magnetic head 28 for reading may be used for verifying the data recorded in the data band DB by the magnetic head 28 for writing. In addition, one magnetic head on which the magnetic element unit 42 for reading and at least one magnetic element unit 42 for writing are mounted may be disposed on the magnetic tape MT.

Figure 41:
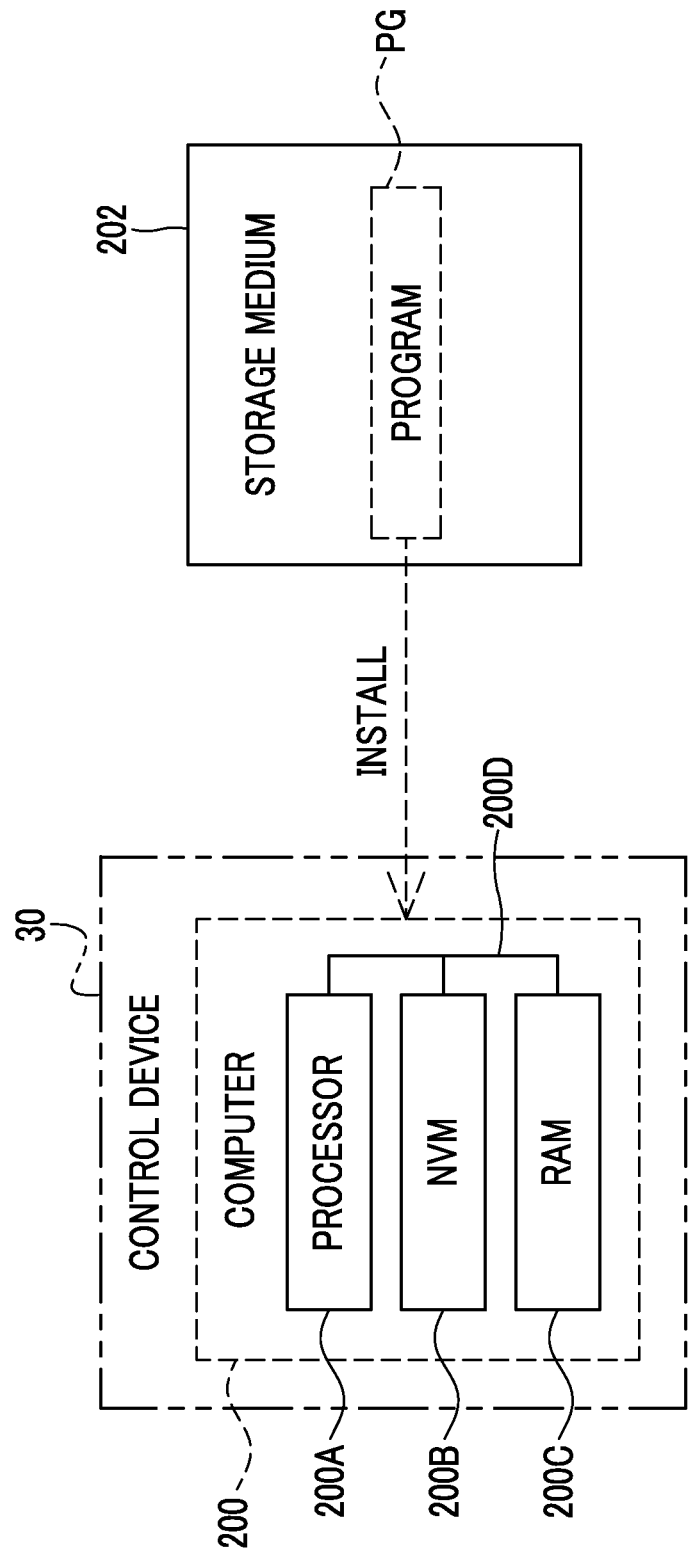
FIG. 41 is a conceptual diagram showing an example of an aspect in which a program stored in a storage medium is installed in a computer of the control device.

In the embodiment described above, the form example has been described in which the control device 30 (see FIG. 3) is realized by the ASIC, but the technology of the present disclosure is not limited to this, and the control device 30 may be realized by the software configuration. In addition, only the control device 30 and the position detection device 30B may be realized by the software configuration. In a case in which the control device 30 and the position detection device 30B are realized by the software configuration, for example, as shown in FIG. 41, the control device 30 comprises a computer 200. The computer 200 includes a processor 200A (for example, a single CPU or a plurality of CPUs), an NVM 200B, and a RAM 200C. The processor 200A, the NVM 200B, and the RAM 200C are connected to a bus 200D. A program PG is stored in a portable storage medium 202 (for example, an SSD or a USB memory) which is a computer-readable non-transitory storage medium.

The program PG stored in the storage medium 202 is installed in the computer 200. The processor 200A executes the control processing (see FIG. 17) in accordance with the program PG.

In addition, the program PG may be stored in a storage device of another computer or server device connected to the computer 200 via a communication network (not shown), and the program PG may be downloaded in response to a request from the control device 30 and installed in the computer 200. It should be noted that the program PG is an example of a "program" according to the technology of the present disclosure, and the computer 200 is an example of a "computer" according to the technology of the present disclosure.

In the example shown in FIG. 41, although the computer 200 has been described as an example, the technology of the present disclosure is not limited to this, and a device including an ASIC, an FPGA, and/or a PLC may be applied instead of the computer 200. In addition, instead of the computer 200, a hardware configuration and the software configuration may be used in combination.

As the hardware resource for executing the processing of the control device 30 (see FIG. 3), various processors shown below can be used. Examples of the processor include the CPU which is a general-purpose processor functioning as the hardware resource for executing the processing by executing software, that is, a program. In addition, examples of the processor include a dedicated electronic circuit which is a processor having a circuit configuration designed to be dedicated to executing specific processing, such as an FPGA, a PLC, or an ASIC described as an example. A memory is built in or connected to any processor, and any processor executes the processing by using the memory.

The hardware resource for executing the processing of the control device 30 and/or the servo writer controller SW5 may be composed of one of those various processors or may be composed of a combination of two or more processors of the same type or different types (for example, a combination of a plurality of FPGAs or a combination of a CPU and an FPGA). In addition, the hardware resource for executing the processing of the control device 30 and/or the servo writer controller SW5 may be one processor.

As a configuring example of one processor, first, there is a form in which one processor is composed of a combination of one or more CPUs and software and the processor functions as the hardware resource for executing the processing. Secondly, as represented by SoC, there is a form in which a processor that realizes the functions of the entire system including a plurality of hardware resources for executing the processing with one IC chip is used. As described above, the processing of the control device 30 and/or the servo writer controller SW5 is realized by using one or more of the various processors described above as the hardware resource.

Further, as the hardware structure of these various processors, more specifically, it is possible to use an electronic circuit in which circuit elements, such as semiconductor elements, are combined. In addition, the processing of the control device 30 and/or the servo writer controller SW5 is merely an example.

Therefore, it is needless to say that unnecessary steps may be deleted, new steps may be added, or the processing order may be changed within a range that does not deviate from the gist.

The description contents and the shown contents above are the detailed description of the parts according to the technology of the present disclosure, and are merely examples of the technology of the present disclosure. For example, the description of the configuration, the function, the action, and the effect above are the description of examples of the configuration, the function, the action, and the effect of the parts according to the technology of the present disclosure. Accordingly, it is needless to say that unnecessary parts may be deleted, new elements may be added, or replacements may be made with respect to the contents described and shown above within a range that does not deviate from the gist of the technology of the present disclosure. In addition, in order to avoid complications and facilitate understanding of the parts according to the technology of the present disclosure, in the description contents and the shown contents above, the description of common technical knowledge and the like that do not particularly require description for enabling the implementation of the technology of the present disclosure are omitted.

In the present specification, "A and/or B" is synonymous with "at least one of A or B". That is, "A and/or B" means that it may be only A, only B, or a combination of A and B. In addition, in the present specification, in a case in which three or more matters are associated and expressed by "and/or", the same concept as "A and/or B" is applied.

All documents, patent applications, and technical standards described in the present specification are incorporated into the present specification by reference to the same extent as in a case in which the individual documents, patent applications, and technical standards are specifically and individually stated to be described by reference.

What is claimed is:

1. A signal processing device comprising:
a processor that acquires data read by a magnetic head from a magnetic tape including a plurality of servo bands formed therein, to process the acquired data,
wherein the plurality of servo bands are disposed at intervals in a width direction of the magnetic tape,
a plurality of servo patterns are formed in each of the plurality of servo bands along a longitudinal direction of the magnetic tape,
the magnetic head includes a pair of servo reading elements corresponding to a pair of servo bands adjacent to each other in the width direction among the plurality of servo bands, and
the processor
acquires a first signal based on a first result obtained by reading a servo pattern in a first servo band included in the pair of servo bands by a first servo reading element included in the pair of servo reading elements,
acquires a second signal based on a second result obtained by reading the servo pattern in a second servo band included in the pair of servo bands by a second servo reading element included in the pair of servo reading elements, and
acquires a deviation amount in time between the first signal and the second signal,
wherein each of the plurality of servo patterns includes at least one linear magnetization region pair, the linear magnetization region pair includes a first linear magnetization region, which is linearly magnetized, and a second linear magnetization region, which is linearly magnetized, the first linear magnetization region and the second linear magnetization region are inclined in opposite directions with respect to a first imaginary straight line along a width direction of the magnetic tape, and the first linear magnetization region has a steeper inclined angle with respect to the first imaginary straight line than the second linear magnetization region, and
wherein the pair of servo reading elements are arranged along a longitudinal direction of the magnetic head, and the magnetic head is disposed in a posture in which a third imaginary straight line along the longitudinal direction of the magnetic head is inclined with respect to a traveling direction of the magnetic tape.

2. The signal processing device according to claim 1, wherein the first result is a result obtained by reading the servo pattern in the first servo band by the first servo reading element while the first servo reading element is positioned on a BOT region of the magnetic tape, and
the second result is a result obtained by reading the servo pattern in the second servo band by the second servo reading element while the second servo reading element is positioned on the BOT region.

3. The signal processing device according to claim 1,
wherein the servo pattern is a set of a plurality of linear magnetization regions,
the linear magnetization regions comprise a set of a plurality of magnetization straight lines,
the first result is a first pulse signal group corresponding to the plurality of linear magnetization regions,
the second result is a second pulse signal group corresponding to the plurality of linear magnetization regions, and
in a case in which N is a natural number having the number of magnetization straight lines included in the plurality of linear magnetization regions as an upper limit value,
the first signal is a signal corresponding to a designated Nth pulse signal included in the first pulse signal group, and
the second signal is a signal corresponding to the Nth pulse signal included in the second pulse signal group.

4. The signal processing device according to claim 3, wherein the Nth is the first.

5. The signal processing device according to claim 1, wherein the servo pattern is a set of a plurality of linear magnetization regions,
the first result is a first pulse signal group corresponding to the plurality of linear magnetization regions,
the second result is a second pulse signal group corresponding to the plurality of linear magnetization regions,
the first signal is a plurality of signals corresponding to a plurality of pulse signals included in the first pulse signal group, and
the second signal is a plurality of signals corresponding to a plurality of pulse signals included in the second pulse signal group.

6. The signal processing device according to claim 5, wherein the deviation amount is defined based on an average value, a median value, a most frequent value, a maximum value, or a minimum value of time differences between the plurality of signals corresponding to the plurality of pulse signals included in the first pulse signal group and the plurality of signals corresponding to the plurality of pulse signals included in the second pulse signal group.

7. The signal processing device according to claim 1, wherein the deviation amount is a statistic value of time differences between a plurality of first signals obtained for a plurality of the servo patterns in the first servo band and a plurality of second signals obtained for a plurality of the servo patterns in the second servo band.

8. The signal processing device according to claim 1, wherein the processor executes specific processing in accordance with the deviation amount.

9. The signal processing device according to claim 8, wherein the processor controls a skew mechanism that skews the magnetic head, and
the specific processing includes skew processing of causing the skew mechanism to skew the magnetic head at an angle based on the deviation amount.

10. The signal processing device according to claim 1, wherein the processor stores a signal corresponding to the deviation amount in a storage medium.

11. The signal processing device according to claim 10, wherein the magnetic tape is accommodated in a magnetic tape cartridge,
the magnetic tape cartridge is provided with a noncontact storage medium that is able to perform communication in a noncontact manner, and
the storage medium includes the noncontact storage medium.

12. The signal processing device according to claim 10, wherein the storage medium includes a partial region of the magnetic tape.

13. A magnetic tape drive that executes processing in accordance with the deviation amount obtained from the signal processing device according to claim 1.

14. A magnetic tape comprising:
a plurality of servo bands formed therein,
wherein the plurality of servo bands are disposed at intervals in a width direction of the magnetic tape,
a plurality of servo patterns are formed in each of the plurality of servo bands along a longitudinal direction of the magnetic tape, and
a deviation amount between the servo patterns having corresponding positions in the longitudinal direction of the magnetic tape between a pair of servo bands adjacent to each other in the width direction among the plurality of servo bands corresponds to the deviation amount obtained from the signal processing device according to claim 1.

15. The magnetic tape according to claim 14,
wherein a signal corresponding to the deviation amount is stored in a partial region of the magnetic tape.

16. A magnetic tape cartridge comprising:
the magnetic tape according to claim 14 accommodated therein.

17. The magnetic tape cartridge according to claim 16, further comprising:
a noncontact storage medium that is able to perform communication in a noncontact manner,
wherein a signal corresponding to the deviation amount obtained from the signal processing device according to claim 1 is stored in the noncontact storage medium.

18. A signal processing method comprising:
acquiring data read by a magnetic head from a magnetic tape including a plurality of servo bands formed therein, to process the acquired data,
wherein the plurality of servo bands are disposed at intervals in a width direction of the magnetic tape,
a plurality of servo patterns are formed in each of the plurality of servo bands along a longitudinal direction of the magnetic tape,
the magnetic head includes a pair of servo reading elements corresponding to a pair of servo bands adjacent to each other in the width direction among the plurality of servo bands, and
the signal processing method further includes
acquiring a first signal based on a result obtained by reading the servo pattern in a first servo band included in the pair of servo bands by a first servo reading element included in the pair of servo reading elements,
acquiring a second signal based on a result obtained by reading the servo pattern in a second servo band included in the pair of servo bands by a second servo reading element included in the pair of servo reading elements, and
acquiring a deviation amount in time between the first signal and the second signal,
wherein each of the plurality of servo patterns includes at least one linear magnetization region pair, the linear magnetization region pair includes a first linear magnetization region, which is linearly magnetized, and a second linear magnetization region, which is linearly magnetized, the first linear magnetization region and the second linear magnetization region are inclined in opposite directions with respect to a first imaginary straight line along a width direction of the magnetic tape, and the first linear magnetization region has a steeper inclined angle with respect to the first imaginary straight line than the second linear magnetization region, and
wherein the pair of servo reading elements are arranged along a longitudinal direction of the magnetic head, and the magnetic head is disposed in a posture in which a third imaginary straight line along the longitudinal direction of the magnetic head is inclined with respect to a traveling direction of the magnetic tape.

19. A magnetic tape manufacturing method comprising:
recording a servo pattern in accordance with the deviation amount obtained from the signal processing device according to claim 1.

20. A magnetic tape in which a servo pattern is recorded in accordance with the deviation amount obtained by using the signal processing method according to claim 18.

21. A magnetic tape manufacturing method comprising:
recording a servo pattern in a magnetic tape in accordance with the deviation amount obtained by using the signal processing method according to claim 18.

22. A non-transitory computer-readable storage medium storing a program executable by a computer to perform signal processing comprising:
acquiring data read by a magnetic head from a magnetic tape including a plurality of servo bands formed therein, to process the acquired data,
wherein the plurality of servo bands are disposed at intervals in a width direction of the magnetic tape,
a plurality of servo patterns are formed in each of the plurality of servo bands along a longitudinal direction of the magnetic tape,
the magnetic head includes a pair of servo reading elements corresponding to a pair of servo bands adjacent to each other in the width direction among the plurality of servo bands, and
the signal processing further includes
acquiring a first signal based on a result obtained by reading the servo pattern in a first servo band included in the pair of servo bands by a first servo reading element included in the pair of servo reading elements,
acquiring a second signal based on a result obtained by reading the servo pattern in a second servo band included in the pair of servo bands by a second servo reading element included in the pair of servo reading elements, and
acquiring a deviation amount in time between the first signal and the second signal,
wherein each of the plurality of servo patterns includes at least one linear magnetization region pair, the linear magnetization region pair includes a first linear magnetization region, which is linearly magnetized, and a second linear magnetization region, which is linearly magnetized, the first linear magnetization region and the second linear magnetization region are inclined in opposite directions with respect to a first imaginary straight line along a width direction of the magnetic tape, and the first linear magnetization region has a steeper inclined angle with respect to the first imaginary straight line than the second linear magnetization region, and
wherein the pair of servo reading elements are arranged along a longitudinal direction of the magnetic head, and the magnetic head is disposed in a posture in which a third imaginary straight line along the longitudinal direction of the magnetic head is inclined with respect to a traveling direction of the magnetic tape.

* * * * *